United States Patent [19]

Yamane

[11] Patent Number: 5,163,009

[45] Date of Patent: Nov. 10, 1992

[54] METHOD OF MACHINING CYLINDRICAL WORKPIECES BY USING A BI-SPINDLE NUMERICALLY CONTROLLED MACHINE TOOL

[75] Inventor: Tatsuo Yamane, Fukuoka, Japan

[73] Assignee: Seibu Electric Machinery Co., Ltd., Fukuoka, Japan

[21] Appl. No.: 348,619

[22] Filed: May 8, 1989

[30] Foreign Application Priority Data

May 9, 1988 [JP] Japan ............................. 63-111998
Jun. 24, 1988 [JP] Japan ............................. 63-157757
Sep. 22, 1988 [JP] Japan ............................. 63-238527

[51] Int. Cl.$^5$ ..................... B23B 3/34; G06F 15/46
[52] U.S. Cl. ................... 364/474.11; 82/129; 29/36; 364/474.34
[58] Field of Search .......... 364/474.01–474.02, 364/474.11, 474.16, 474.17, 474.21, 474.34; 82/124, 129, 137, 138; 29/564, 568, 36, 563, 52, 54, 33 Q, 41; 318/572

[56] References Cited

U.S. PATENT DOCUMENTS

| | | | |
|---|---|---|---|
| 3,754,178 | 8/1973 | Dormehl et al. | 318/572 |
| 3,974,721 | 8/1976 | Schalles et al. | 82/129 |
| 3,990,133 | 11/1976 | Schalles et al. | 82/124 |
| 4,424,569 | 1/1984 | Imazeki et al. | 364/474.28 |
| 4,442,493 | 4/1984 | Wakai et al. | 364/474.17 |
| 4,452,109 | 6/1984 | Ballach et al. | 29/36 |
| 4,457,193 | 7/1984 | Matthey | 82/129 |
| 4,597,155 | 7/1986 | Garnett et al. | 29/36 |
| 4,612,690 | 9/1986 | Baker | 82/124 |
| 4,612,832 | 9/1986 | Ushigue et al. | 82/129 |
| 4,620,281 | 10/1986 | Thompson et al. | 364/474.18 |
| 4,700,594 | 10/1987 | Heinen | 82/129 |
| 4,738,171 | 4/1988 | Link et al. | 82/124 |
| 4,982,634 | 1/1991 | Nagel et al. | 92/129 |
| 4,987,807 | 1/1991 | Simon | 82/129 |

Primary Examiner—Jerry Smith
Assistant Examiner—Jim Trammell
Attorney, Agent, or Firm—Finnegan, Henderson, Farabow, Garrett & Dunner

[57] ABSTRACT

A method of machining cylindrical workpieces, mainly cylindrical metallic workpieces such as cylindrical separate metallic workpieces and sequentially fed bar-like workpieces, into cylindrical products such as bearing outer and inner races and valve spools, by employing a bi-spindle numerically controlled machine tool provided with two parallel spindles capable of holding and rotating workpieces, respectively, and a single tool block unit capable of moving in two mutually orthogonal directions under the control of a numerical controller in accordance with a numerical control program, to precisely feed two separate groups of cutting tools mounted thereon and thereby accurately cut the rotating workpieces on the two parallel spindles alternately or simultaneously at a high production rate. A numerically controlled highly effective machining system performing a precision machining of small workpieces supplied by a sequential workpiece supply system and held on two parallel spindles of a bi-spindle numerically controlled machine tool which has a single tool block for mounting thereon two separate groups of cutting tools and moved under the control of a numerical controller in accordance with a numerical control program.

25 Claims, 53 Drawing Sheets

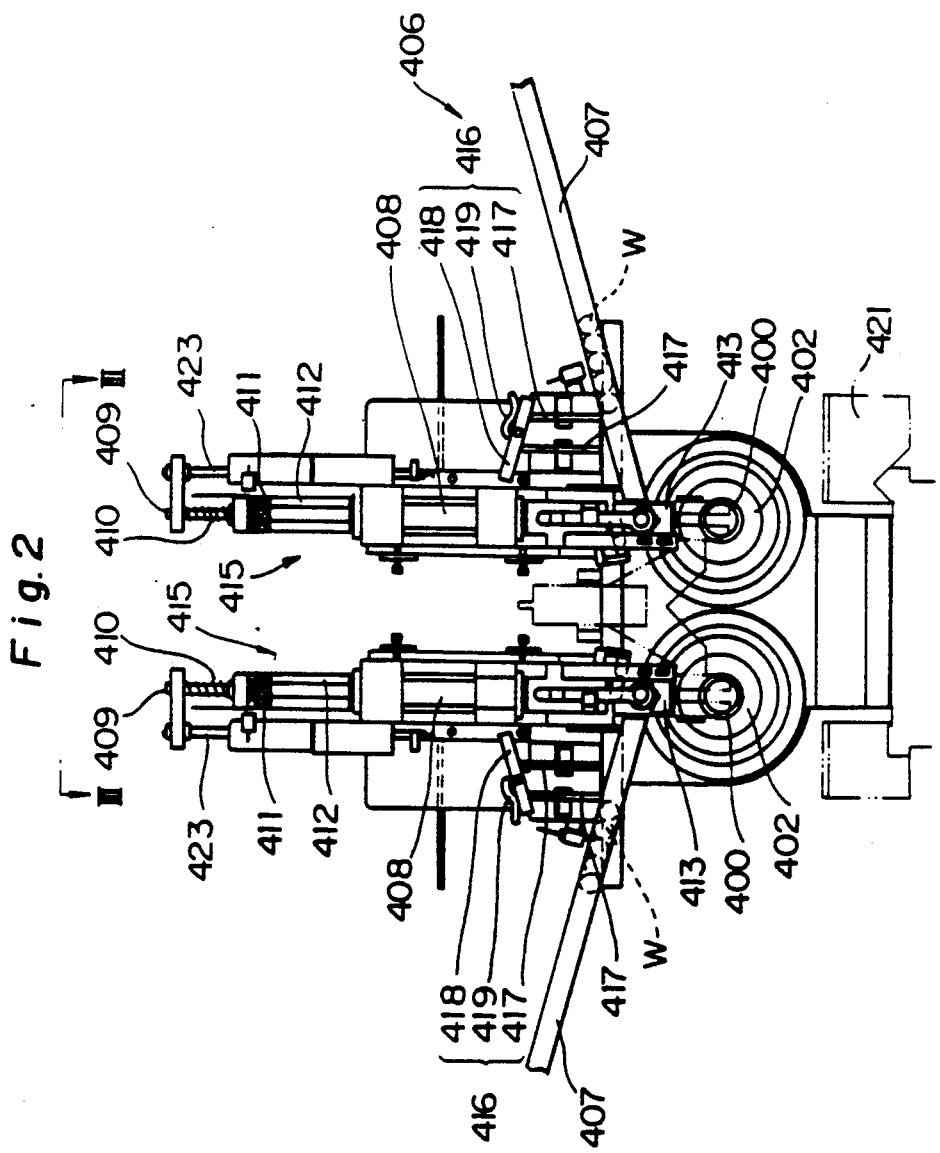

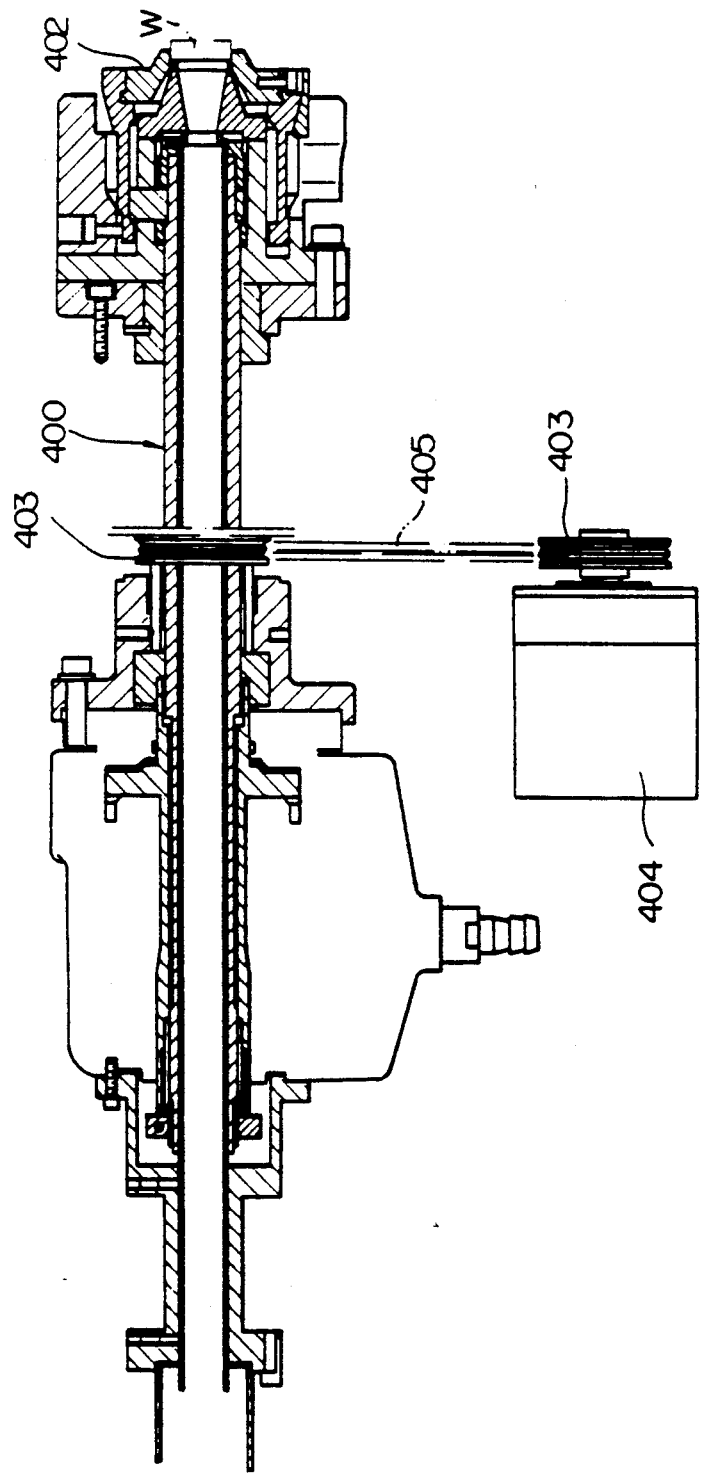

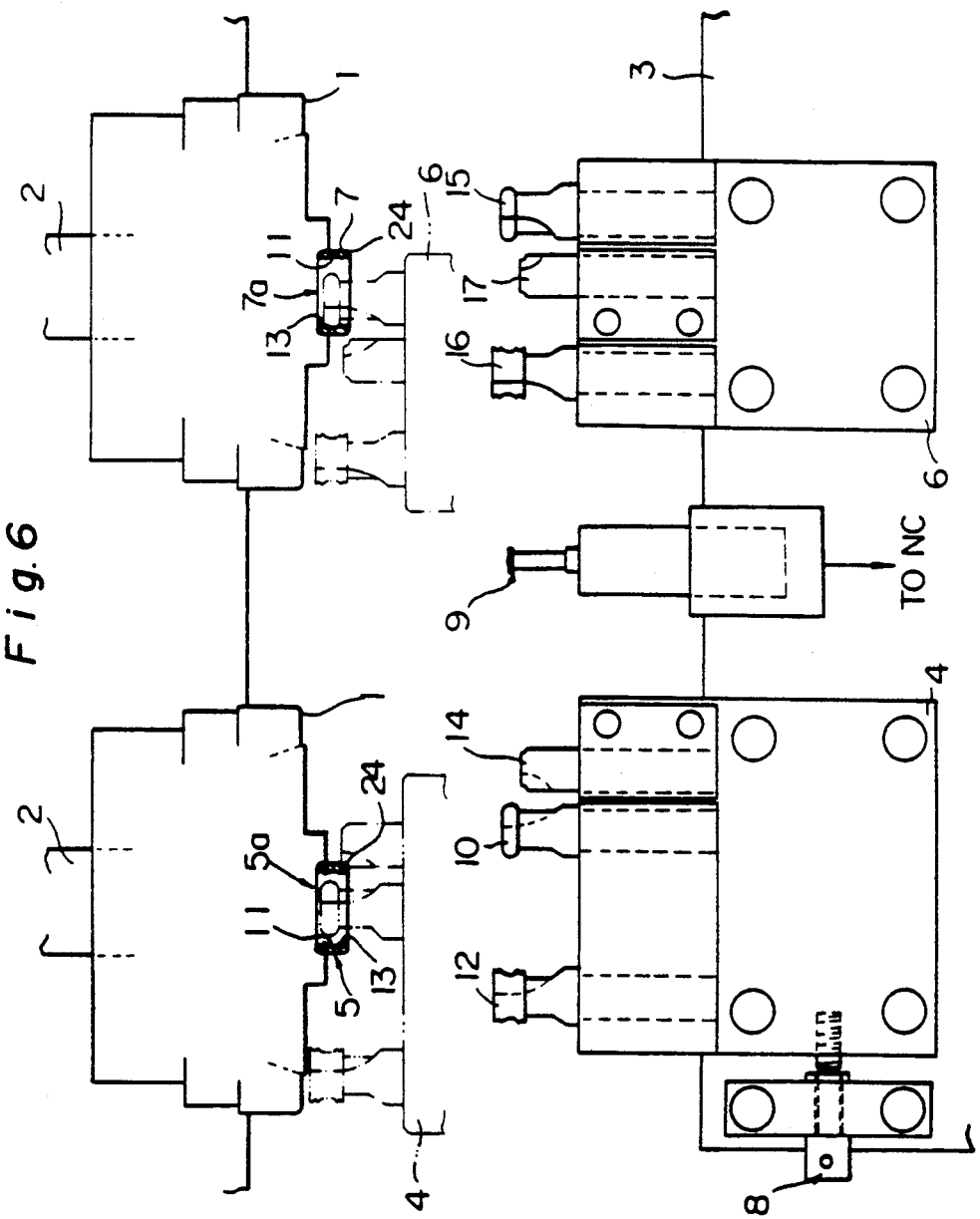

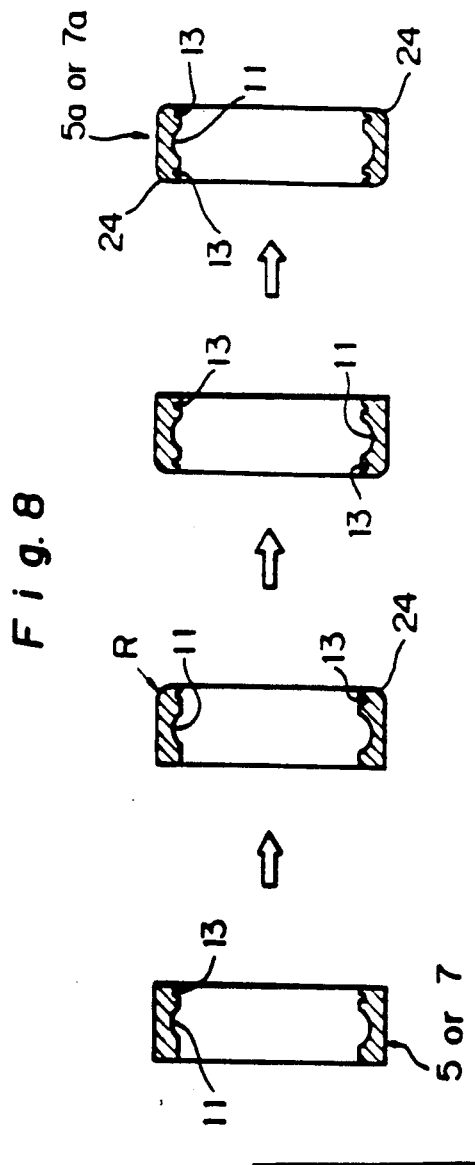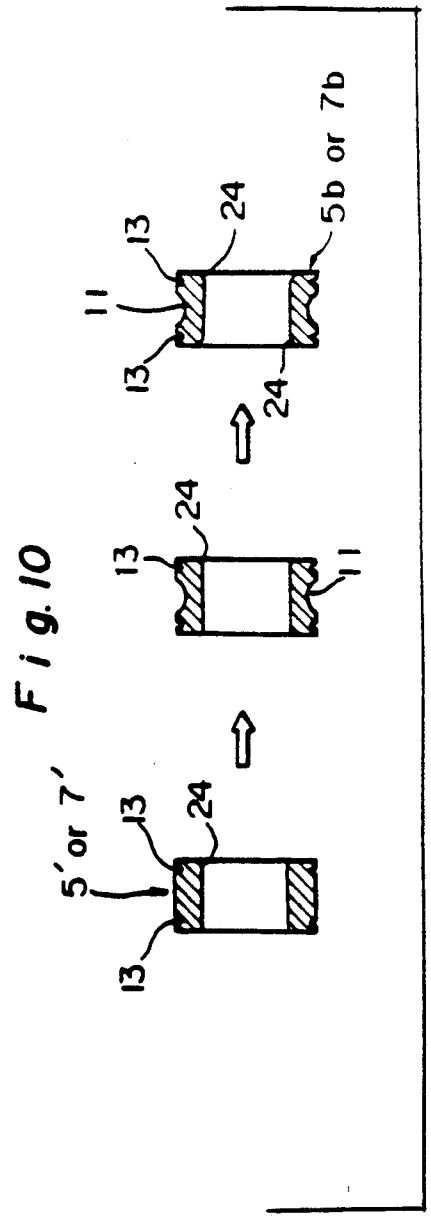

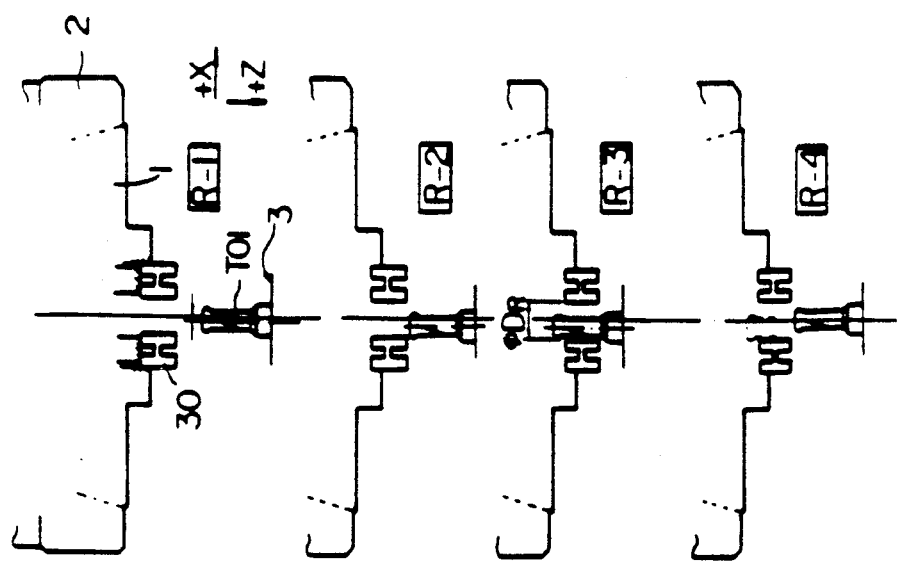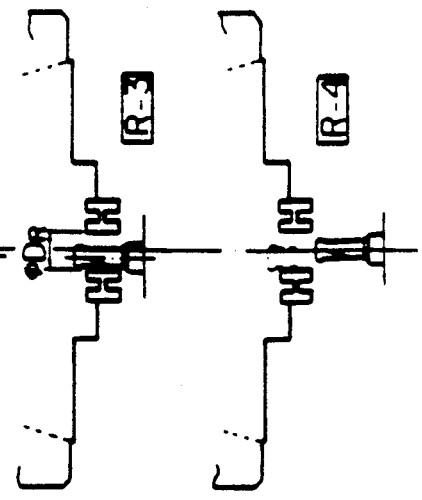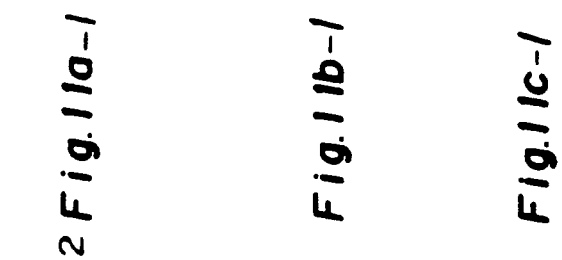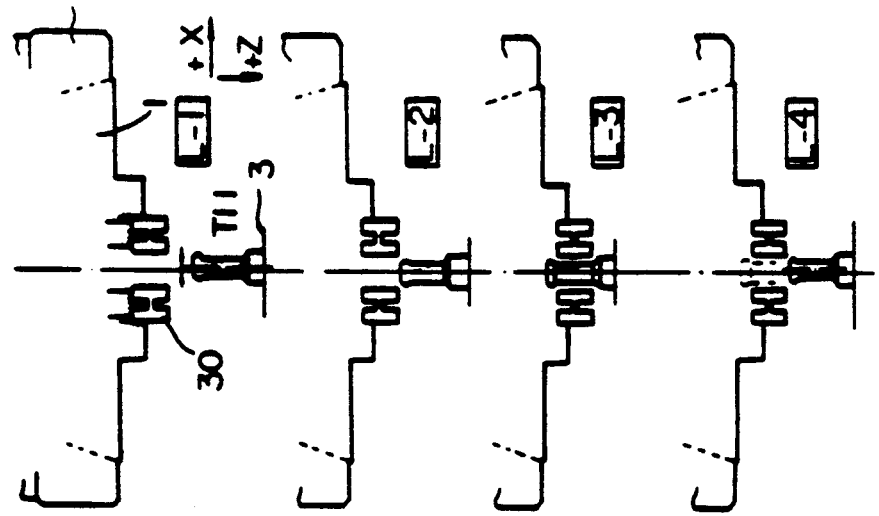

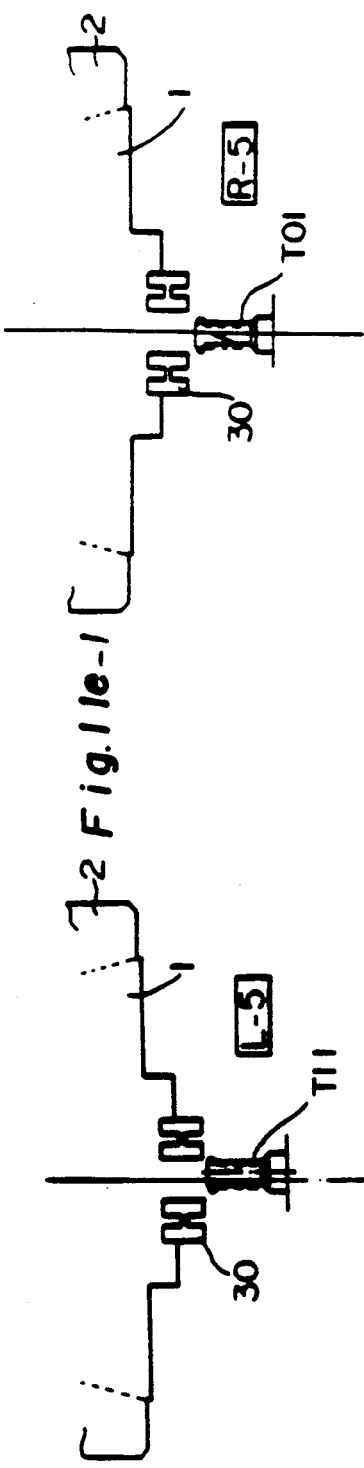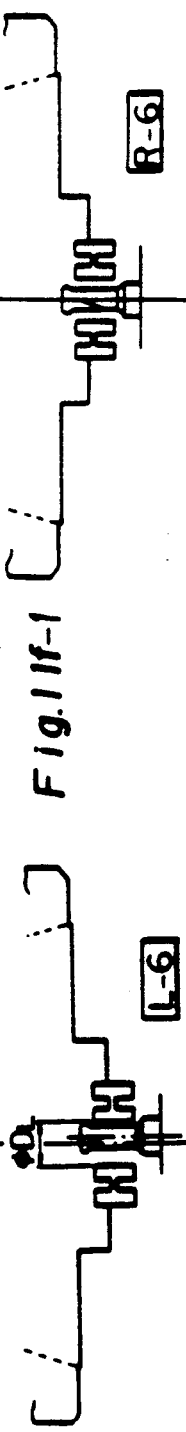

Fig.12    Fig.12-1
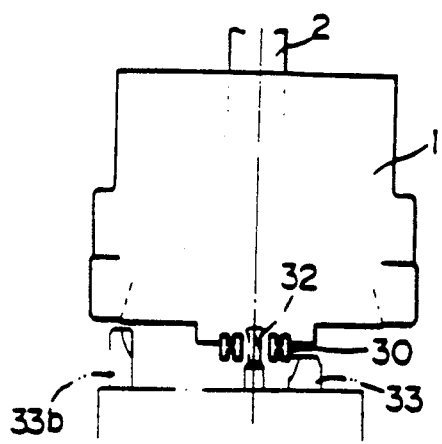
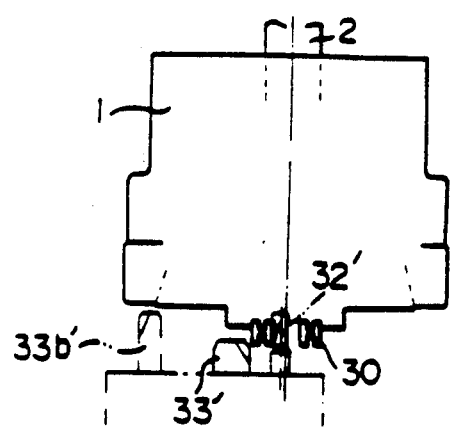
Fig.12-2
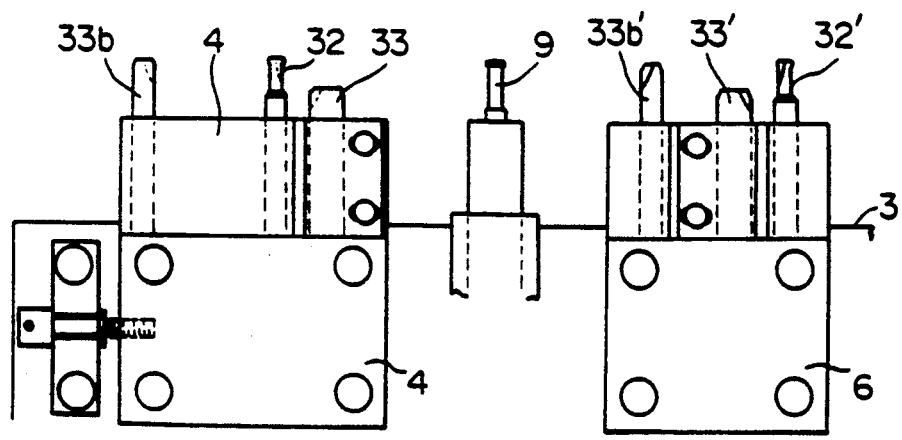

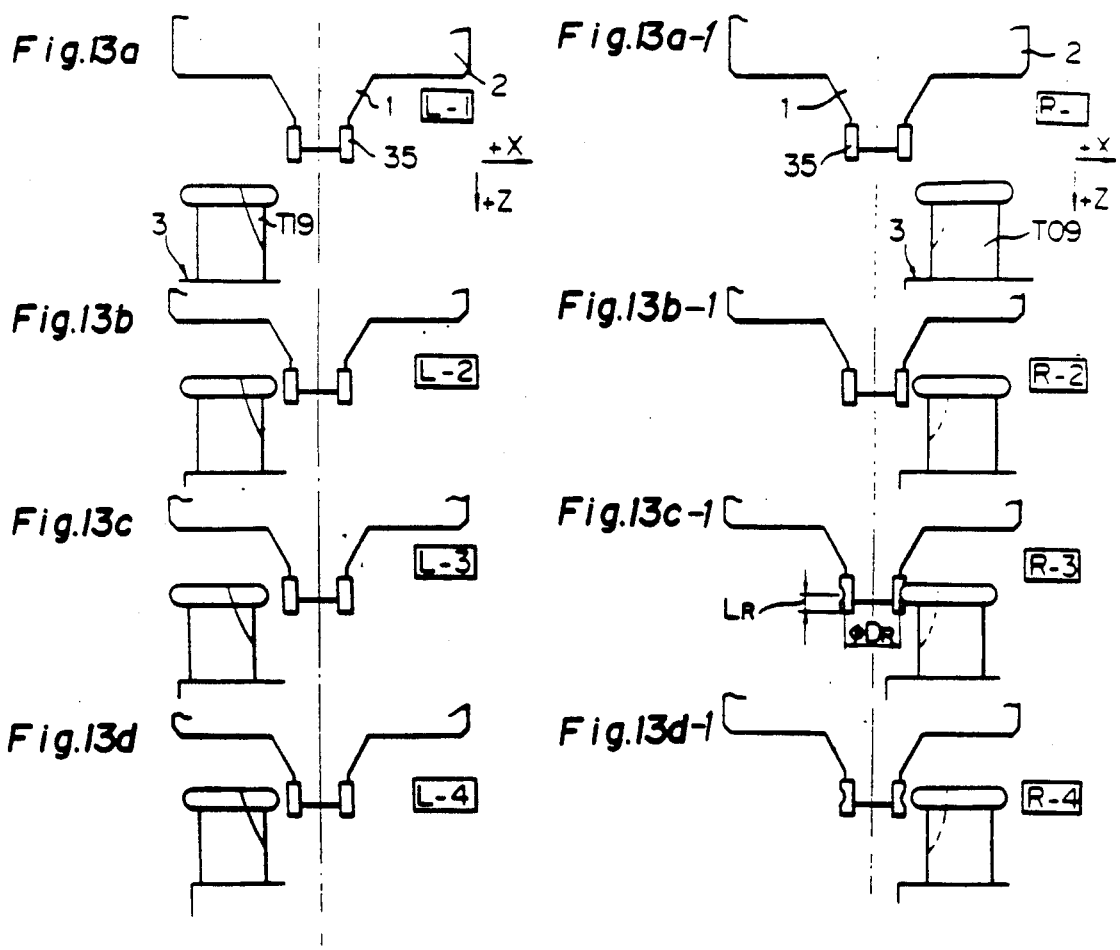

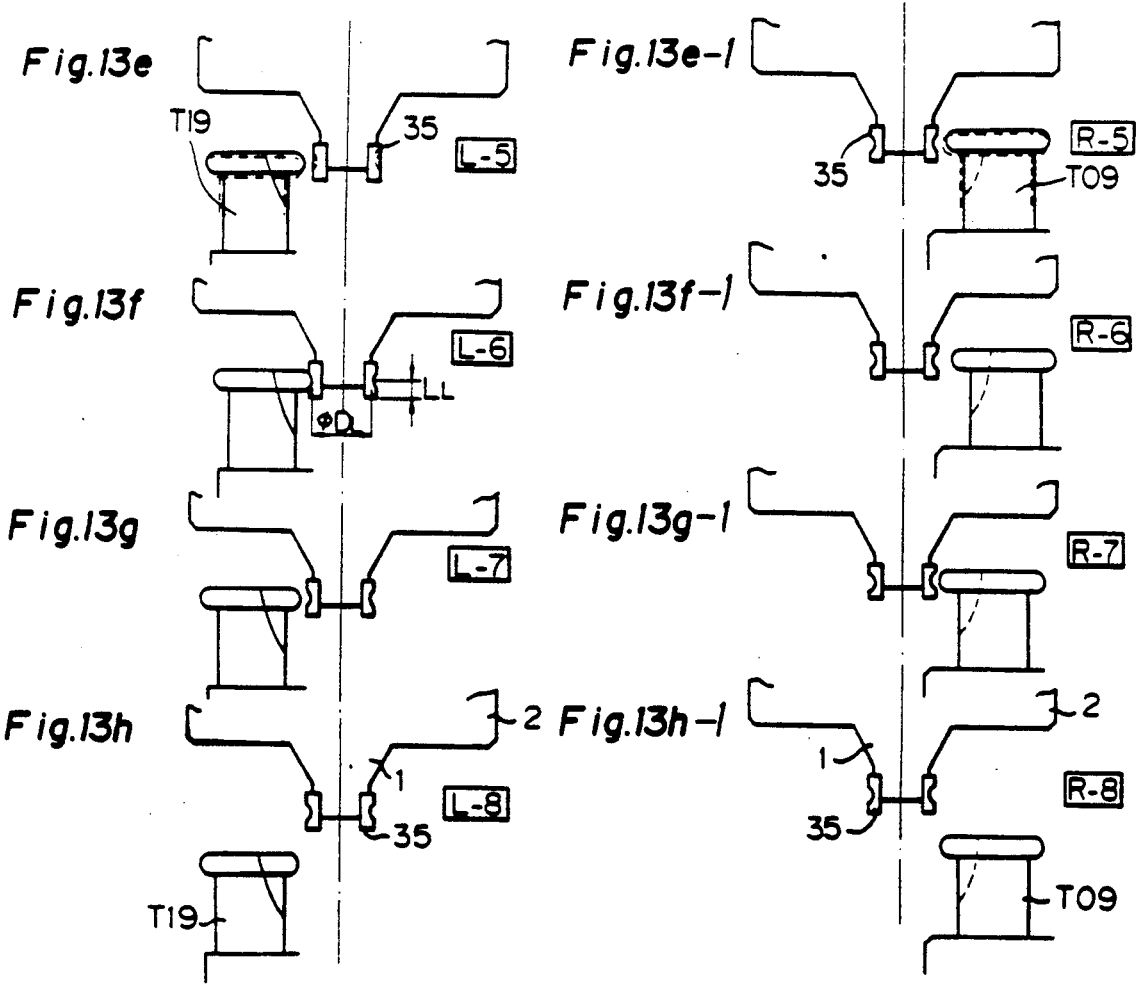

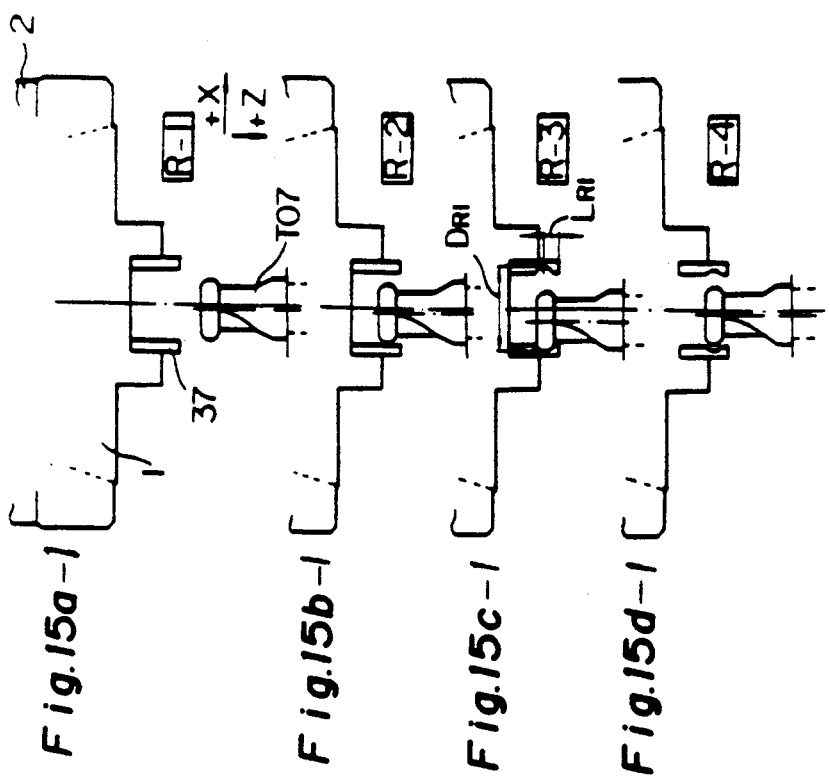
Fig.15a-1
Fig.15b-1
Fig.15c-1
Fig.15d-1
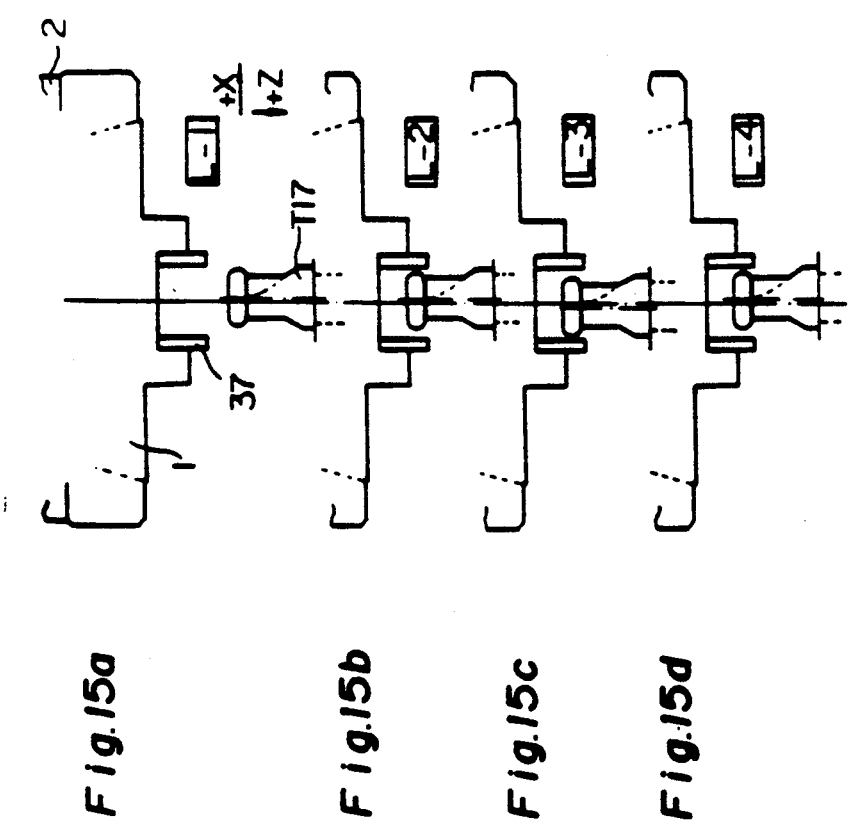
Fig.15a
Fig.15b
Fig.15c
Fig.15d

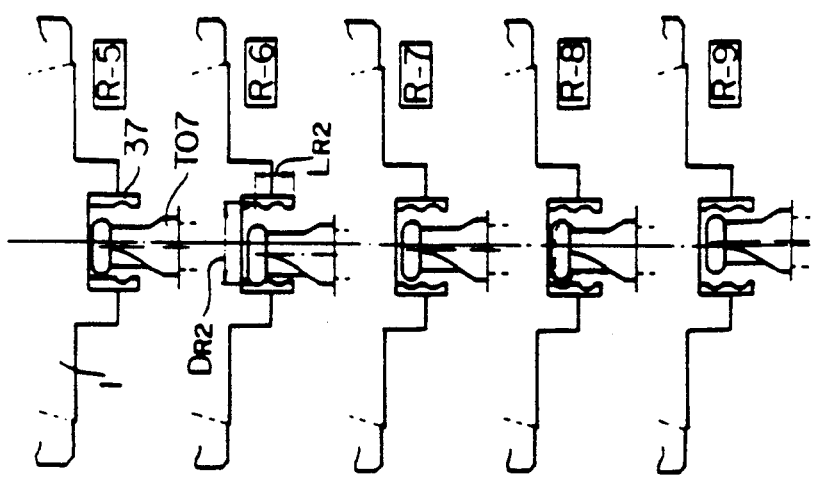
Fig.15e-1
Fig.15f-1
Fig.15g-1
Fig.15h-1
Fig.15i-1
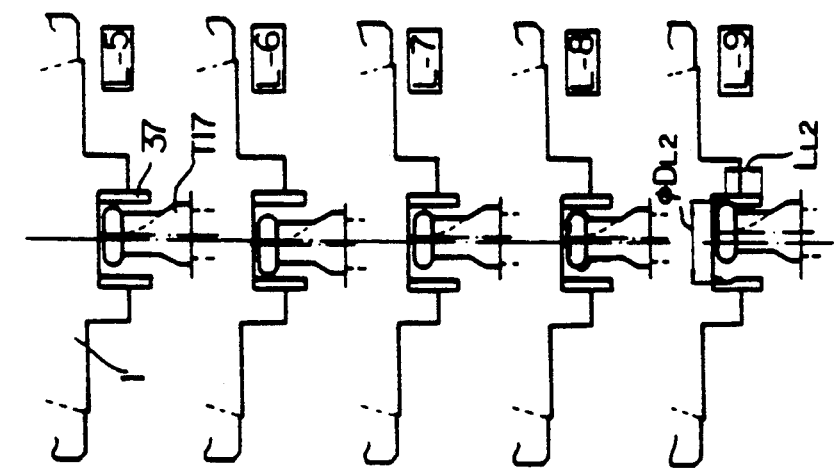
Fig.15e
Fig.15f
Fig.15g
Fig.15h
Fig.15i

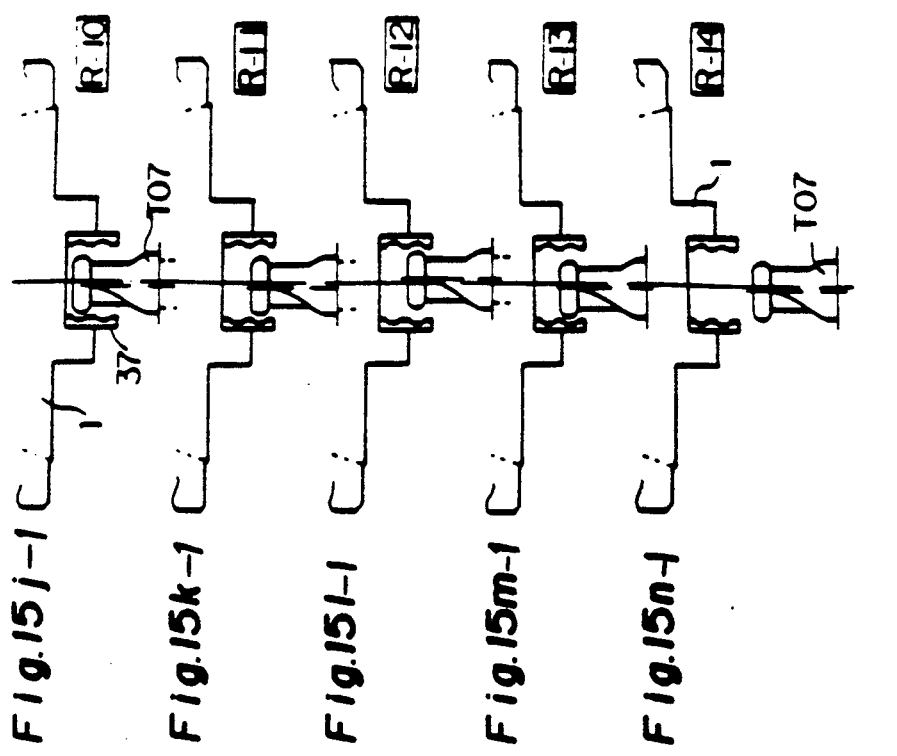
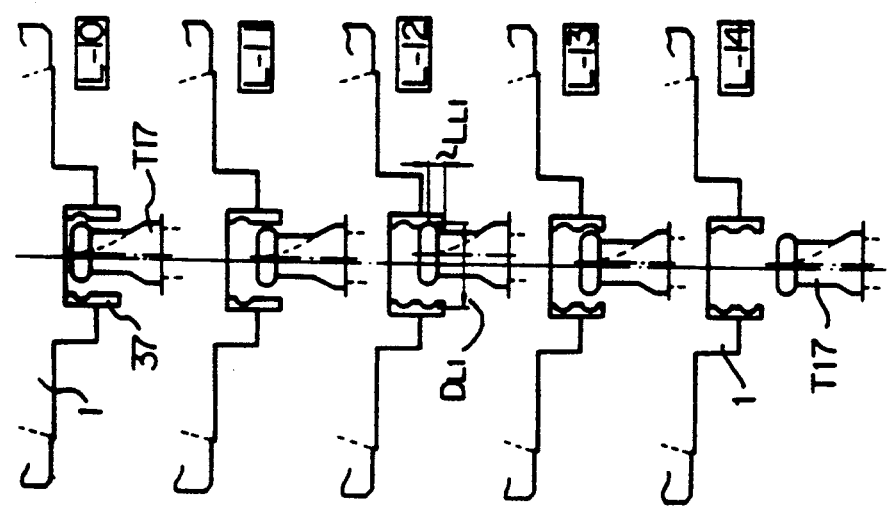

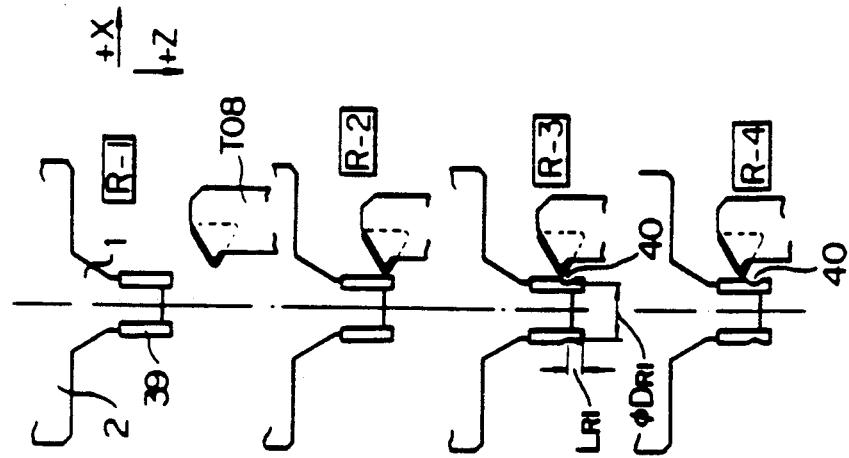
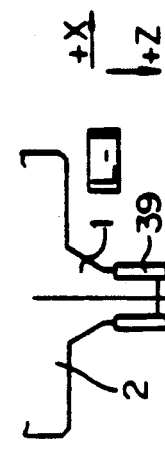
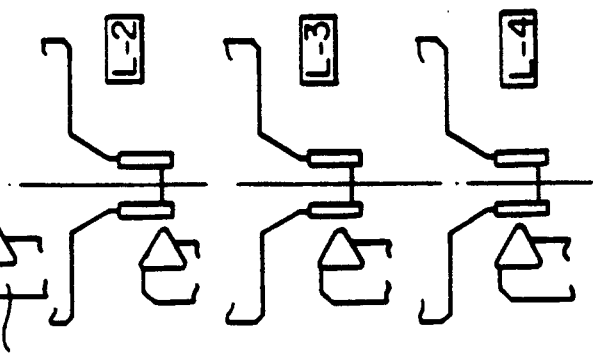
Fig.16a-1  Fig.16b-1  Fig.16c-1  Fig.16d-1
Fig.16a  Fig.16b  Fig.16c  Fig.16d

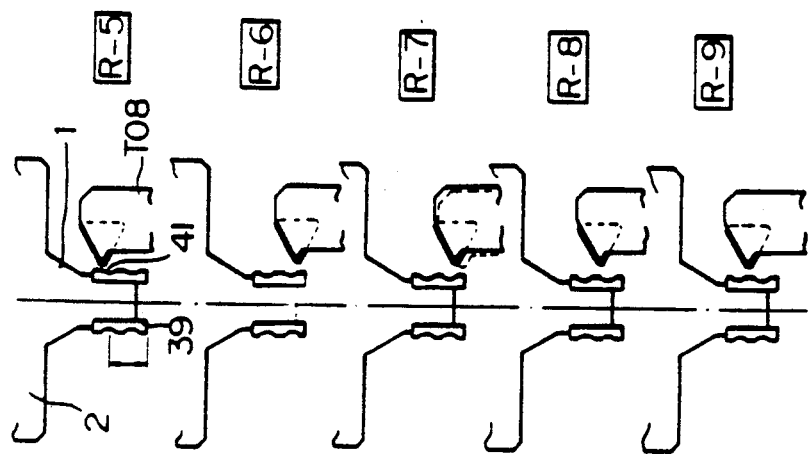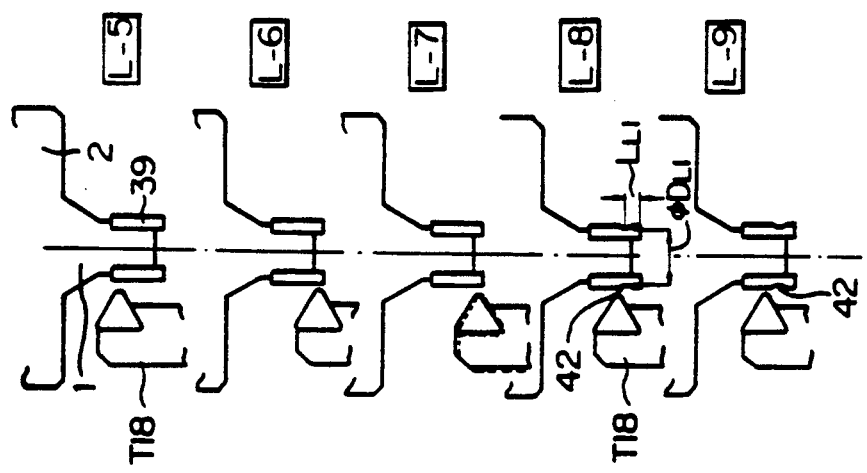

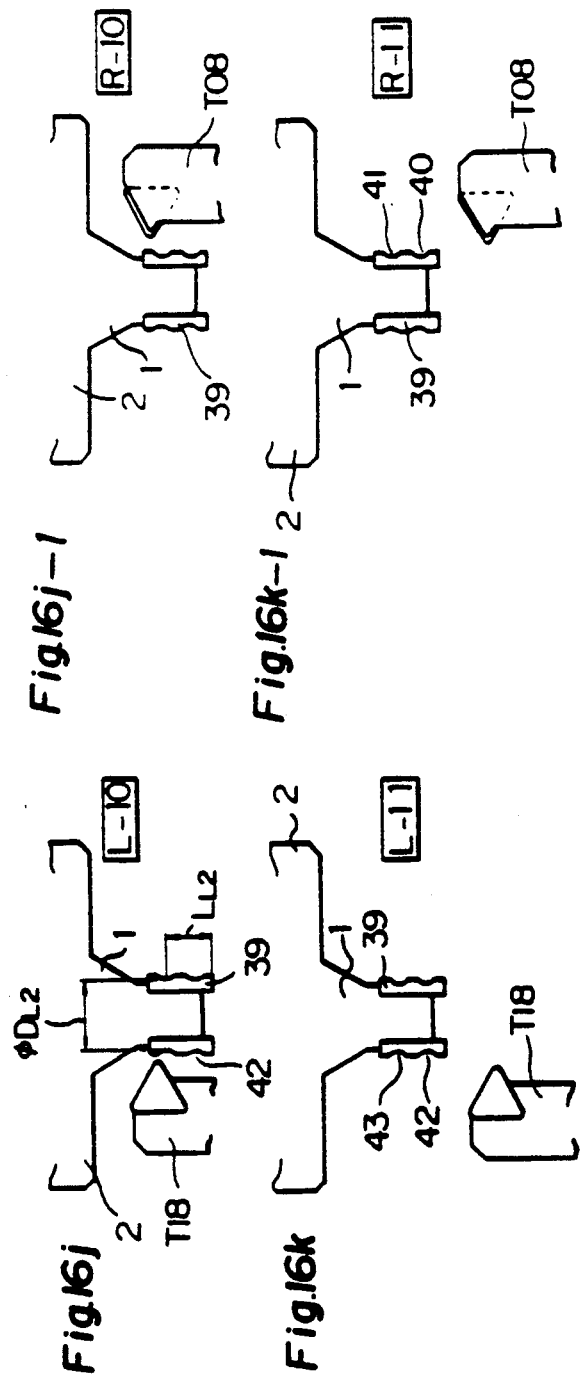

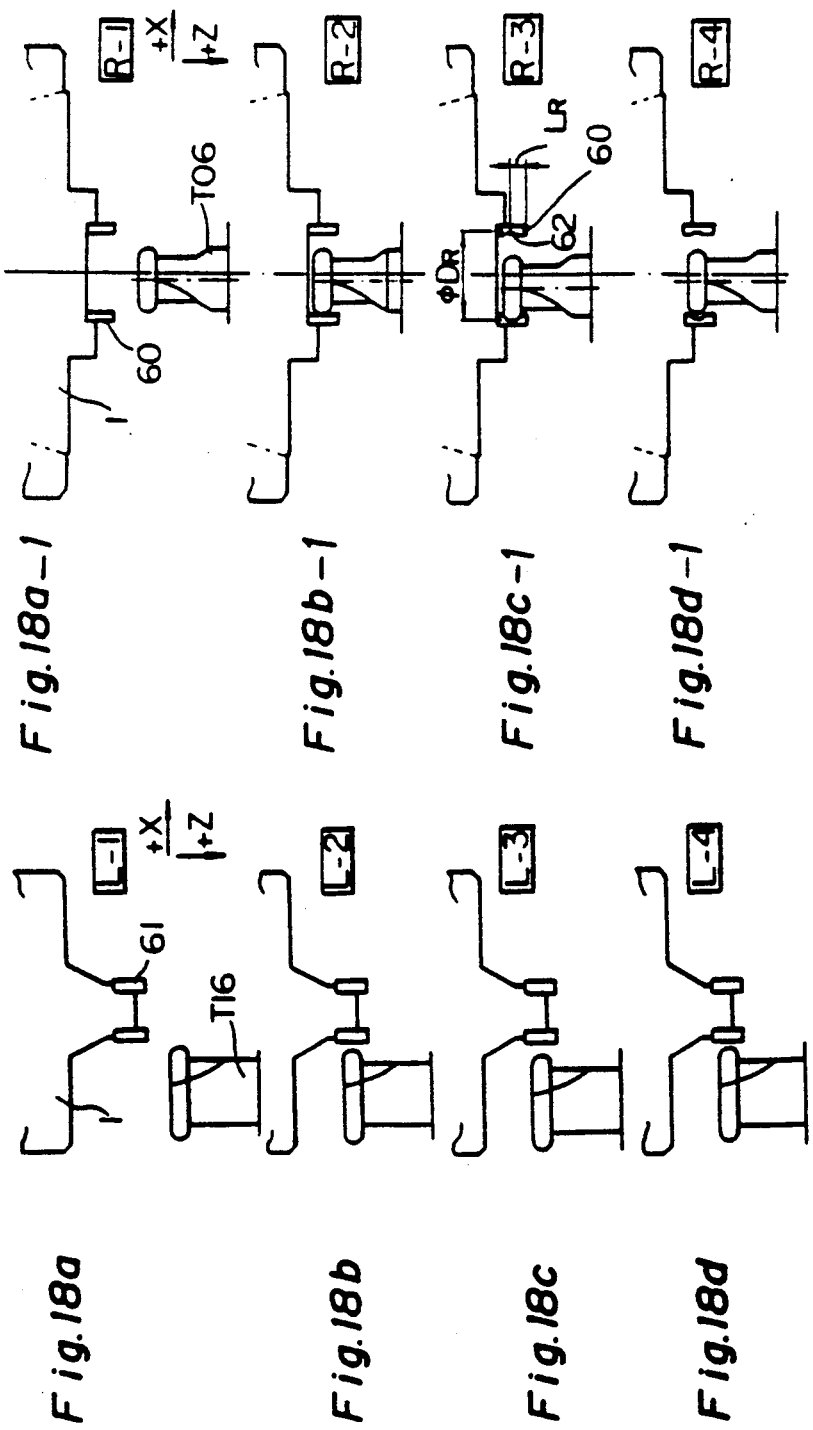

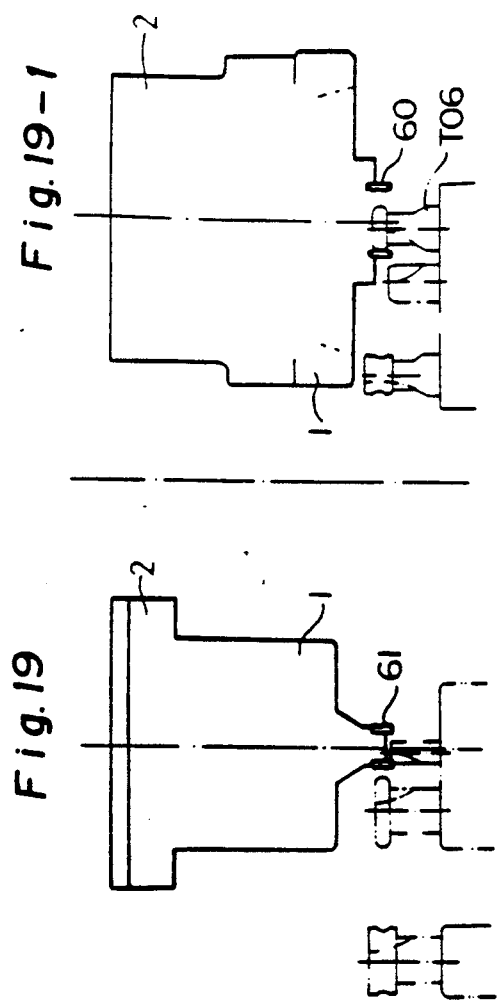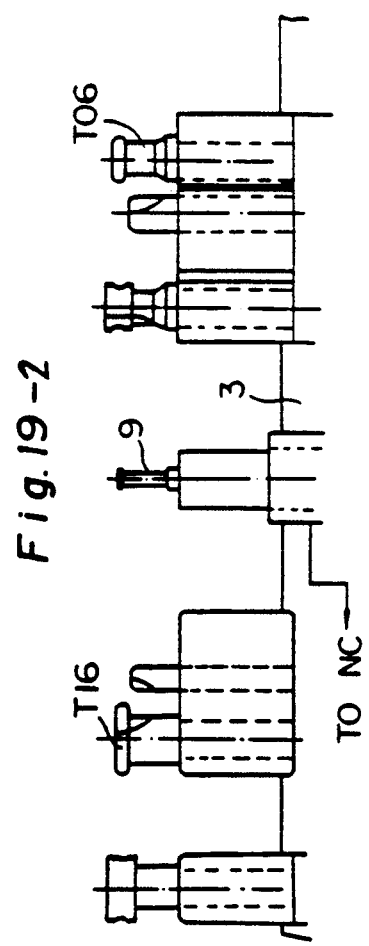

Fig.24s 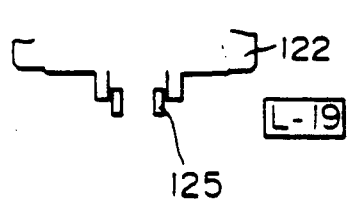 Fig.24s-1 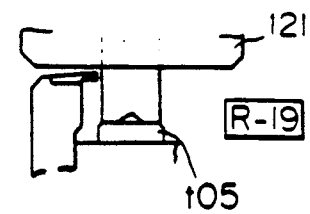
Fig.24t 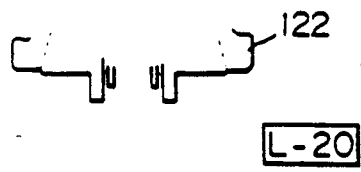 Fig.24t-1 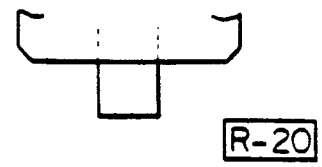
 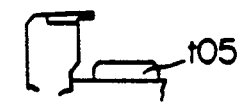
Fig.24u 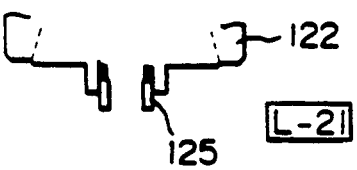 Fig.24u-1 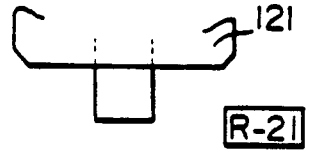
  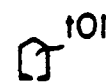

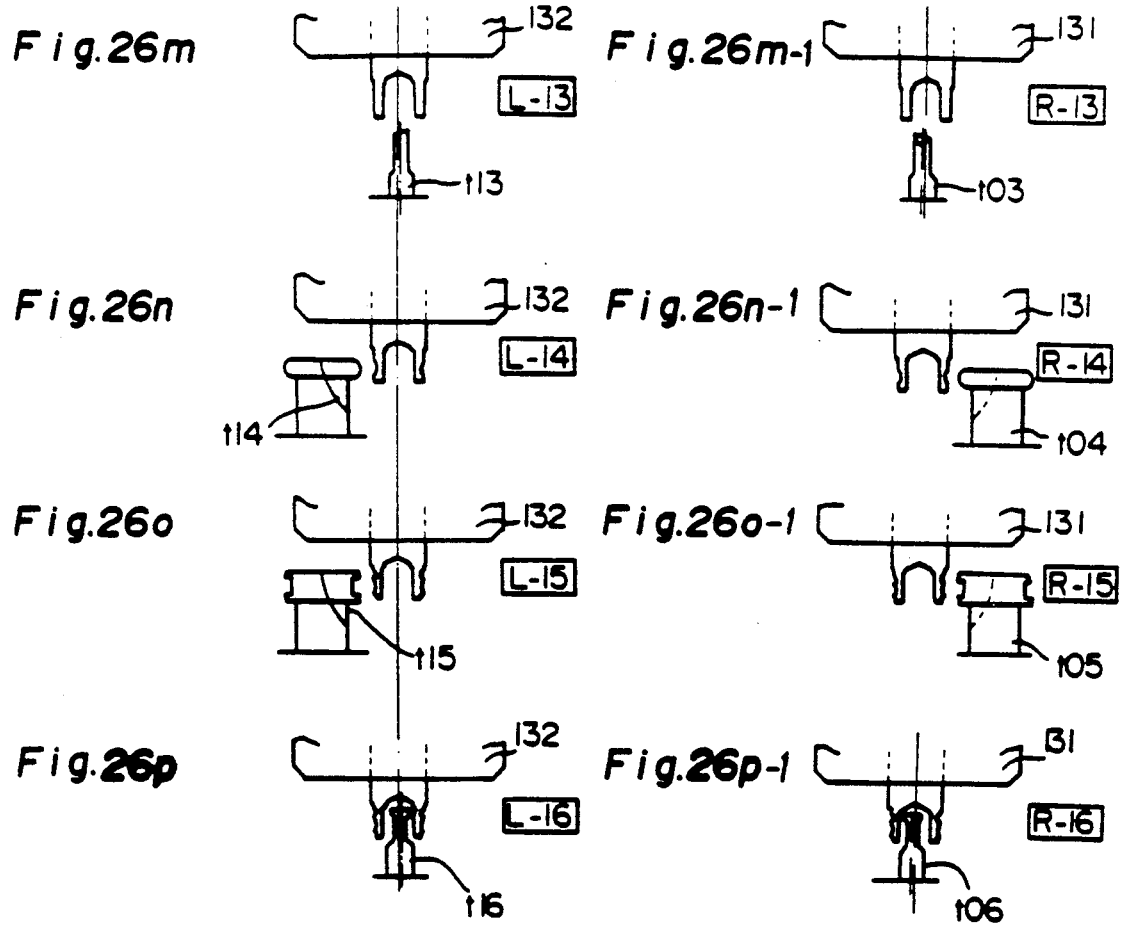

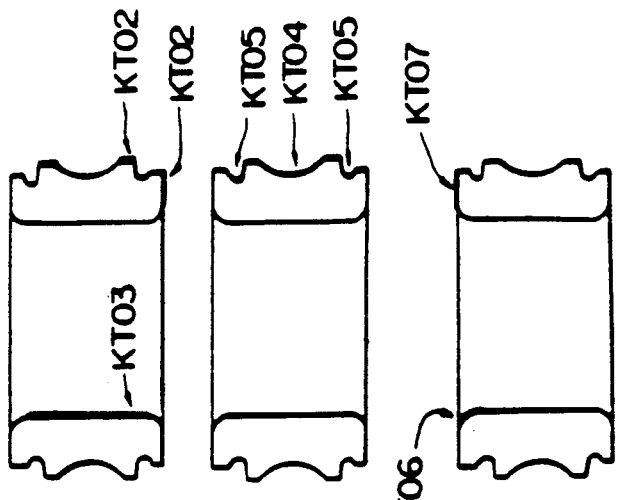
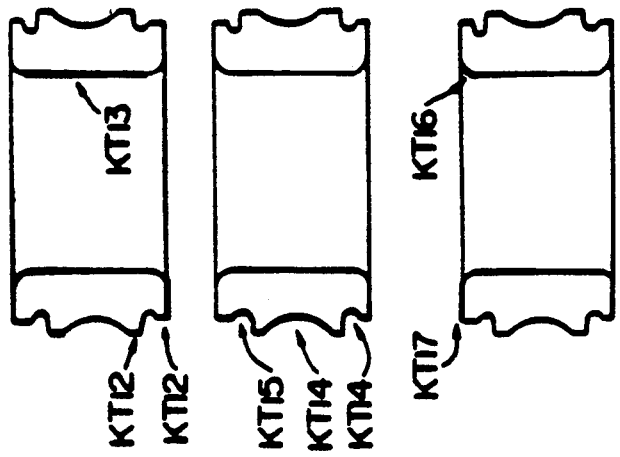

ME THOD OF MACHINING CYLINDRICAL WORKPIECES BY USING A BI-SPINDLE NUMERICALLY CONTROLLED MACHINE TOOL

BACKGROUND OF THE INVENTION

1. Field of the Invention

The present invention relates to a method of producing small cylindrical products, especially metallic products such as bearing races and valve spool elements, from cylindrical bar-like and individual workpieces held on two separate rotatable spindles of a bi-spindle machine tool, by employing two separate groups of cutting tools mounted on a single tool block unit, the movement of which is controlled by a numerical controller in accordance with a numerical control program. The present invention also relates to a bi-spindle numerically controlled machine tool used for carrying out the above method.

2. Description of the Related Art

Generally, there are two methods of producing small cylindrical metallic products such as inner and outer races of bearings and valve spools from cylindrical workpieces.

In the first method, separate manufacturing processes used in the machining of each product are performed by employing individual specific mono-functional machine tools, and therefore, a number of such specific mono-functional machine tools must be prepared to produce one product; which requires a large floor space in a factory for the installation of the many machine tools, and many operators to control the operations of the separate mono-functional machine tools, and as a result, the manufacturing costs for each product become very high. Further, it is difficult to maintain a high accuracy when machining the products, due to the employment of many mono-functional machine tools, and accordingly, the production yield of accurate products is low. Consequently, a strict and expensive quality control of the products during the machining thereof by each of the mono-functional machine tools is necessitated. Moreover, loading and unloading the workpieces when moving the workpieces among the respective mono-functional machine tools often causes damage to the products.

In the second method, many numerically controlled machine tools, each capable of accomplishing a plurality of machining processes necessary for producing each of such products, are employed to carry out a mass production of identical products.

In connection with the second method, the assignee company of the present application (Seibu Denki Co., Ltd. of Japan) has developed a numerically controlled lathe provided with a single spindle having a chucking device for chucking a workpiece and capable of rotating at a high speed, and a single tool block capable of moving left and right and back and forth with respect to the rotating spindle, to cut the workpiece by using a plurality of cutting tools mounted on the tool block. The movement of the tool block is controlled by a numerical controller in accordance with a numerical control program, and thus the numerically controlled lathe is able to continuously machine each workpiece in accordance with the numerical control program until a complete product is automatically obtained.

The same assignee company has also developed a bar feeder capable of feeding a long cylindrical workpiece (a bar-shape workpiece) in the spindle of the numerically controlled lathe. The bar-shape workpiece is held by the front end of the spindle without using the chucking device and formed into a product having a desired shape and size by cutting tools mounted on the tool block. After completion of the machining process, the product is cut from an end of the bar-shape workpiece by a cutting-off tool provided on the tool block. Nevertheless, since each product must be machined from the beginning to the end by one numerically controlled lathe, it takes a long time to obtain each completed product, and therefore, a plurality of identical numerically controlled machines must be arranged for producing many products during a unit of time, and accordingly, a wide floor area is required for a factory for the installation of the many numerically controlled machines, which is very expensive. Consequently, an effective reduction in manufacturing cost for each product cannot be achieved.

On the other hand, when both front and rear sides of a small workpiece must be sequentially machined during the production of a small metallic product by conventional machine tools such as conventional engine lathes, a pair of machine tools arranged in a face to face relationship are employed so that each machine tool cuts one of the front or rear sides of the workpiece. In this case, a complicated handling device must be always provided between the pair of machine tools, to move each workpiece from one to the other of the machine tools. This brings drawbacks such that a sufficient floor space must be prepared for the installation of the pair of machine tools and the workpiece handling device, and that the cost of manufacturing one product by using these machine tools and the complicated handling device is necessarily high.

To obviate these drawbacks, a single lathe having a pair of confronting spindles and a workpiece handling device able to be moved between the spindles to carry a workpiece from one to the other spindle, and vice versa, has been developed. FIG. 36 illustrates an important portion of the developed lathe, which is provided with two axially confronting spindles Ha and Hb capable of holding a workpiece W, respectively, and a handling device for moving the workpiece W from one spindle to the other spindle. The handling device has two independent rotatable arms Aa and Ab mounted on an axial slide E slidably movable between two conveyers Ca and Cb. The arms Aa and Ab catch a workpiece W before machining from the conveyer Ca, attach the workpiece W before machining to one of the spindles (the spindle Ha), move the workpiece W after machining at the spindle Ha to the other spindle Hb, remove the workpiece W from the spindle Hb after completion of the machining at the spindle Hb, and return the machined workpiece W to the other conveyor Cb. Nevertheless, a drawback arises in that, since the starting and finishing times for machining of a workpiece on the spindle Ha are often different from those for machining of the workpiece on the spindle Hb, a complicated sequential control program must be prepared to determine the operations of the spindles, tool carriages, and the handling device. Moreover, the complicated sequential control program must be changed in response to a change in products, and this is very inconvenient.

SUMMARY OF THE INVENTION

Therefore, an object of the present invention is to provide a method of producing small cylindrical products, especially metallic products, from workpieces by using a small number of machine tools, at a high production rate and at a low manufacturing cost.

Another object of the present invention is to provide a method of accurately machining small cylindrical metallic products such as the inner and outer races of bearings and valve spools, from cylindrical bar-like workpieces or small individual workpieces by using a bi-spindle numerically controlled machine tool, particularly by using a bi-spindle numerically controlled lathe, to thereby enhance the production rate per one machine tool.

A further object of the present invention is to provide a method of effectively and accurately machining inner and outer bearing races of a high quality.

A still further object of the present invention is to provide a bi-spindle numerically controlled machine tool by which small metallic products may be machined at a high production rate and a low production cost.

A further object of the present invention is to provide a numerically controlled precision machining system with a bi-spindle numerically controlled machine tool and an unmanned workpiece loading and unloading unit, whereby small and high quality metallic products such as precision inner and outer bearing races and valve spools may be produced at a high production rate and a low production cost.

To accomplish the above objects, the present invention provides a method of effectively machining workpieces into desired products by employing a numerically controlled bi-spindle machine tool provided with two spindles arranged in parallel with one another for holding thereon the workpieces to be machined, and a tool block capable of mounting thereon two separate groups of cutting tools and moved by numerically controlled prime movers in two mutually orthogonal directions in a plane the same as or in parallel with a plane on which the axes of the parallel spindles lie, to thereby carry out an alternate or simultaneous cutting of the workpieces during a high speed rotation of the two spindles. The workpieces are automatically and sequentially supplied to the bi-spindle machine tool by a workpiece supply unit such as a bar feeder, or a combination of workpiece handling units and workpiece conveying units.

More specifically, in accordance with the present invention, there is provided a method of machining substantially cylindrical workpieces held by the chucking devices of two parallel spindles of a bi-spindle machine tool controlled by a numerical controller, which method comprises the steps of:

providing two separate groups of cutting tools on a single tool block means in such a manner that each of the two groups of cutting tools is able to cut each of the workpieces on said two parallel spindles, the tool block means being moved by a prime mover in two mutually orthogonal directions along a plane which is the same as or in parallel with a plane on which the axes of the two spindles lie; and;

controlling the motion of the single tool block means in the two mutually orthogonal directions by the numerical controller, via the prime mover, to thereby bring at least two cutting tools of each of the two groups of cutting tools to respective positions suitable for effecting an alternate or simultaneous cutting of the substantially cylindrical workpieces held on the two parallel spindles, to form cut products having predetermined shapes and sizes, in accordance with a numerical control program.

In accordance with the present invention, there is also provided a method of producing bearing outer races from hollow cylindrical workpieces held by the respective chucking devices of two parallel spindles of a bi-spindle machine tool controlled by a numerical controller, which method comprises the steps of:

mounting a pair of form tools on a single tool block means in such a manner that each of the pair of form tools is able to form a grooved track in an inner cylindrical face of each of the hollow cylindrical workpieces held on the two parallel spindles, and that the centers of the pair of form tools are separated by a distance less than that existing between the axes of the two parallel spindles, the tool block being moved by a prime mover in two mutually orthogonal directions along a plane which is the same as or in parallel with a plane on which the axes of the two spindles lie; and controlling the motion of the single tool block means by the numerical controller to provide the pair of form tools with predetermined sequential operations, in accordance with a numerical control program, comprising;

positioning the centers of the pair of form tools substantially in front of the two parallel spindles;

bringing a front cutting end of each of the form tools into each of the hollow cylindrical workpieces while adjusting the positions of the front cutting ends of the form tools inside the respective hollow cylindrical workpieces;

gradually advancing the pair of form tools to cut the grooved track in the inner cylindrical face of one of the hollow cylindrical workpieces held on the two parallel spindles by one of the pair of form tools, while maintaining the other of the form tools idle inside the other of the hollow cylindrical workpieces;

withdrawing the form tools to a predetermined non-cutting position thereof after cutting the grooved track in the inner cylindrical face of one of the hollow cylindrical workpiece by one of the pair of form tools;

re-adjusting a position of the front cutting end of the other of the pair of form tools inside the other of the hollow cylindrical workpieces;

advancing the pair of form tools to cut a grooved track in the inner cylindrical face of the other of the hollow cylindrical workpieces held on the two parallel spindles by the other of the pair of form tools, while maintaining the other of the form tools at an idle position inside one of the hollow cylindrical workpieces;

withdrawing both form tools to a predetermined non-cutting position thereof after cutting the grooved track in the inner cylindrical face of the other of the hollow cylindrical workpieces with the other of the pair of form tools; and retracting the pair of form tools from inside the cut hollow cylindrical workpieces held on the two parallel spindles.

In accordance with the present invention, there is further provided a method of producing bearing inner races from hollow cylindrical workpieces held by respective chucking devices of two parallel spindles of a bi-spindle machine tool controlled by a numerical controller, which comprises the steps of:

mounting a pair of form tools on a single tool block unit in such a manner that each of the pair of form tools can form a grooved track in an outer cylindrical face of each of the hollow cylindrical workpieces held on the two parallel spindles, and that the pair of form tools are separated from one another by a distance larger than a maximum distance between the outer faces of the hollow cylindrical workpieces held on the two parallel spindles, the tool block unit being moved by prime mover in two mutually orthogonal directions along a plane which is the same as or in parallel with a plane on which the axes of said two spindles lie; and controlling the motion of the single tool block unit by the numerical controller to provide the pair of form tools with predetermined sequential operations, in accordance with a numerical control program, which comprises;

positioning the pair of form tools substantially in front of the two parallel spindles while maintaining the pair of form tools at positions remote from the outer faces of the hollow cylindrical workpieces held on the two parallel spindles;

advancing the pair of form tools in a direction parallel with the axes of the two spindles to be positioned alongside the outer faces of the hollow cylindrical workpieces;

bringing one of the pair of form tools into a position to start cutting the grooved track in the outer face of one of the hollow cylindrical workpieces while finely adjusting a position of one of the form tools;

gradually advancing the pair of form tools toward a position at which one of the pair of form tools is in contact with the outer face of one of the hollow cylindrical workpieces, to thereby cut the grooved track in the outer face of one of the hollow cylindrical workpieces held on the two parallel spindles while allowing the other of the pair of form tools to be idle;

returning the pair of form tools to a predetermined non-cutting position thereof determined in accordance with a numerical control program after cutting the grooved track in the outer face of one of the hollow cylindrical workpieces with one of the pair of form tools;

bringing the other of the pair of form tools into a position to start cutting a grooved track in the outer face of the other of the hollow cylindrical workpieces held on the two parallel spindles while finely adjusting a position of the other of the pair of form tools;

gradually advancing the pair of form tools so that the other of the form tools is in contact with the outer face of the other of the hollow cylindrical workpieces, to thereby cut the grooved track in the outer face of the other of the hollow cylindrical workpieces held on the two parallel spindles while allowing one of the pair of form tools to be idle;

returning the pair of form tools to a predetermined non-cutting position thereof after cutting the grooved track in the outer face of the other of the hollow cylindrical workpieces with the other of the pair of form tools; and simultaneously retracting the pair of form tools from the predetermined non-cutting positions thereof to positions located alongside the hollow cylindrical workpieces after cutting the grooved tracks in the outer faces of the hollow cylindrical workpieces held on the two parallel spindles.

In accordance with another aspect of the present invention, there is provided a bi-spindle machine tool for sequentially machining cylindrical workpieces, which comprises:

first and second parallel spindles driven by a common rotative drive source;

first and second workpiece holding devices provided for the first and second spindles, respectively, for grasping the cylindrical workpieces;

a single tool block unit able to be moved in at least two mutually orthogonal directions on a plane which is the same as or in parallel with a plane on which the axes of the first and second parallel spindles lie;

a prime mover for moving the single tool block unit in the mutually orthogonal directions;

a numerical controller for controlling the operation of the prime mover, to thereby move the single tool block in accordance with a numerical control program;

first and second groups of cutting tools commonly mounted on the single tool block means for cutting the cylindrical workpieces when the workpieces are held on and rotated by the first and second parallel spindles; and a unit for automatically supplying the cylindrical workpieces to the first and second parallel spindles in accordance with a numerical control program stored in the numerical controller.

In accordance with a further aspect of the present invention, there is provided a numerically controlled machining system for sequentially producing cylindrical products from automatically supplied individual cylindrical workpieces, which system comprises:

a bi-spindle machine tool provided with:

first and second parallel spindles mounted on a single headstock and driven by a common rotative drive source;

first and second workpiece holding devices provided for the first and second spindles, respectively, for grasping the cylindrical workpieces;

a single tool block means mounted on a reciprocatively movable carriage via a cross slide moved in at least two mutually orthogonal directions on a plane which is the same as or in parallel with a plane on which the axes of the first and second parallel spindles lie;

a prime mover for moving the single tool block means in the mutually orthogonal directions;

a numerical controller for controlling the operation of the prime mover, to thereby move the single tool block in accordance with a numerical control program; and first and second groups of cutting tools commonly mounted on the single tool block means for simultaneously cutting the individual cylindrical workpieces when the workpieces are held on and rotated by the first and second parallel spindles;

and;

first and second supply chutes for supplying the individual cylindrical workpieces to predetermined positions adjacent to the first and second workpiece holding devices of the first and second parallel spindles;

first and second workpiece handling devices for inserting the individual cylindrical workpieces one by one from the predetermined positions adjacent to the first and second workpiece holding devices of the first and second parallel spindles, into the first and second workpiece holding devices of the first and second parallel spindles, respectively;

a conveyer for conveying the individual cylindrical workpieces, after machining by the first spindle, toward the second spindle; and a turning device for turning each of the workpieces through 180 degrees to thereby reverse the end face of each of the workpieces while conveying the individual cylindrical workpieces by the conveyer.

In accordance with the above-mentioned machining system with one bi-spindle numerically controlled machine tool, the cutting of the workpieces on the two parallel spindles of the machine tool is implemented alternately or simultaneously by the two separate groups of cutting tools in accordance with a numerical control program, and therefore, a highly effective and a very precise production of cylindrical products can be achieved without requiring an extensive floor area for installation of the machining system.

The above and other objects, features and advantages of the present invention will become more apparent from the ensuing description of the embodiments of the present invention, taken in conjunction with the attached drawings.

BRIEF DESCRIPTION OF THE DRAWINGS

FIG. 2 is a front elevational view of the bi-spindle numerically controlled machine tool taken along the line II—II of FIG. 1;

FIG. 5 is a cross-sectional view of one of the spindles of the bi-spindle numerically controlled machine tool of FIG. 1;

FIG. 6 is an explanatory plan view illustrating the method of machining a grooved inner track of an outer race of a ball bearing by employing the bi-spindle numerically controlled machine tool of FIGS. 1 through 5;

FIG. 8 is an explanatory cross-sectional view of an outer race of a ball bearing, illustrating how to sequentially machine an outer race of a ball bearing by employing the bi-spindle numerically controlled machine tool according to the present invention;

FIG. 10 is an explanatory cross-sectional view of an inner race of a ball bearing, illustrating how to sequentially machine an outer race of a ball bearing by employing the bi-spindle numerically controlled machine tool according to the present invention;

FIGS. 11a through 11g and 11a-1 through 11g-1 are explanatory views illustrating the sequential processes for machining an inner bore of a workpiece to be used for producing a pair of inner and outer races of a bearing according to the present invention;

FIGS. 12 and 12-1 through 12-2 are an explanatory plan view illustrating the simultaneous machining of unseparated workpieces for a pair of inner and outer bearing races by employing the bi-spindle numerically controlled machine tool and two different cutting tools according to the present invention;

FIGS. 13a through 13h and 13a-1 through 13h-1 are explanatory plan views of the two spindles and cutting tools, illustrating the sequential processes for alternately cutting grooved inner race tracks in workpieces for a bearing, held on the two spindles of a bi-spindle numerically controlled machine tool according to the present invention;

FIGS. 14 and 14-1-14-2 are plan views of the bi-spindle machine tool according to the present invention, by which the bearing inner races are produced;

FIGS. 15a through 15n and 15a-1 through 15n-1 are explanatory plan views of the two spindles and cutting tools of a bi-spindle numerically controlled machine tool, illustrating the sequential processes for alternately cutting grooved double tracks in the workpieces for bearing outer races, held on the two spindles according to the present invention;

FIGS. 16a through 16k and 16a-1 through 16k-1 are explanatory plan views of the two spindles and cutting tools of a bi-spindle numerically controlled machine tool, illustrating the sequential processes for alternately cutting grooved double tracks in the workpieces for bearing inner races, held on the two spindles according to the present invention;

FIGS. 17 and 17-1-17-2 are plan views of the two spindles and cutting tools of a bi-spindle numerically controlled machine tool, illustrating the machining process for producing a single bearing outer race by the alternate use of the two spindles according to the present invention;

FIGS. 18a through 18h and 18a-1 through 18h-1 are explanatory plan views of the two spindles and cutting tools, illustrating the method of simultaneously machining inner and outer bearing races from workpieces held on the two spindles of a bi-spindle numerically controlled machine tool according to the present invention;

FIGS. 19 and 19-1 and 19-2 are plan views of the bi-spindle numerically controlled machine tool used for carrying out the machining processes of FIGS. 18a through 18h;

FIGS. 20a through 20h and 20a-1 through 20h-1 are explanatory plan views of the spindles and cutting tools of a bi-spindle numerically controlled machine tool, illustrating the method of alternately machining workpieces on the two spindles to produce bearing inner races, according to the present invention;

FIGS. 21 and 21-1 and 21-2 are plan views of a bi-spindle numerically controlled machine tool with bar feeders for feeding workpieces in the spindles, according to the present invention;

FIGS. 22a through 22v and 22a-a–22v-1 are explanatory plan views of two parallel spindles and cutting tools of a bi-spindle numerically controlled machine tool, illustrating the method of machining workpieces fed in the two spindles while cutting the machined products by using cutting-off tools;

FIGS. 23 and 23-1 and 23-2 are plan views of the two spindles and cutting tools of a bi-spindle numerically controlled machine tool, in which one of the spindle has a bar feeder and the other has a workpiece chucking device, according to the present invention;

FIGS. 24a through 24u and 24a-1–24u-1 are explanatory plan views of the two spindles and cutting tools of a bi-spindle numerically controlled machine tool, illustrating the method of cutting an individual workpiece held on one of the spindles and cutting a bar-like workpiece held on the other spindle of the machine tool in accordance with a numerical control program;

FIGS. 25 and 25-1 and 25-2 are plan views of a bi-spindle numerically controlled machine tool provided with a tool block unit having a turret tool holder, according to the present invention;

FIGS. 26a through 26u and 26a-1–26u-1 are explanatory plan views of the two spindles and cutting tools, illustrating the method of simultaneously cutting workpieces held on the two parallel spindles of a bi-spindle numerically controlled machine tool, according to the present invention;

FIGS. 27a through 27c and 27a-1–27c-1 are cross-sectional views of a machined product, illustrating the contour of the product machined by the cutting tools of the machine tools according to the present invention;

DESCRIPTION OF THE PREFERRED EMBODIMENTS

First, a description of the various methods of machining workpieces held by the chucking devices of two parallel spindles of a bi-spindle numerically controlled machine tool according to the present invention will be provided hereinbelow, with reference to FIGS. 1 through 20h.

Figure 4:
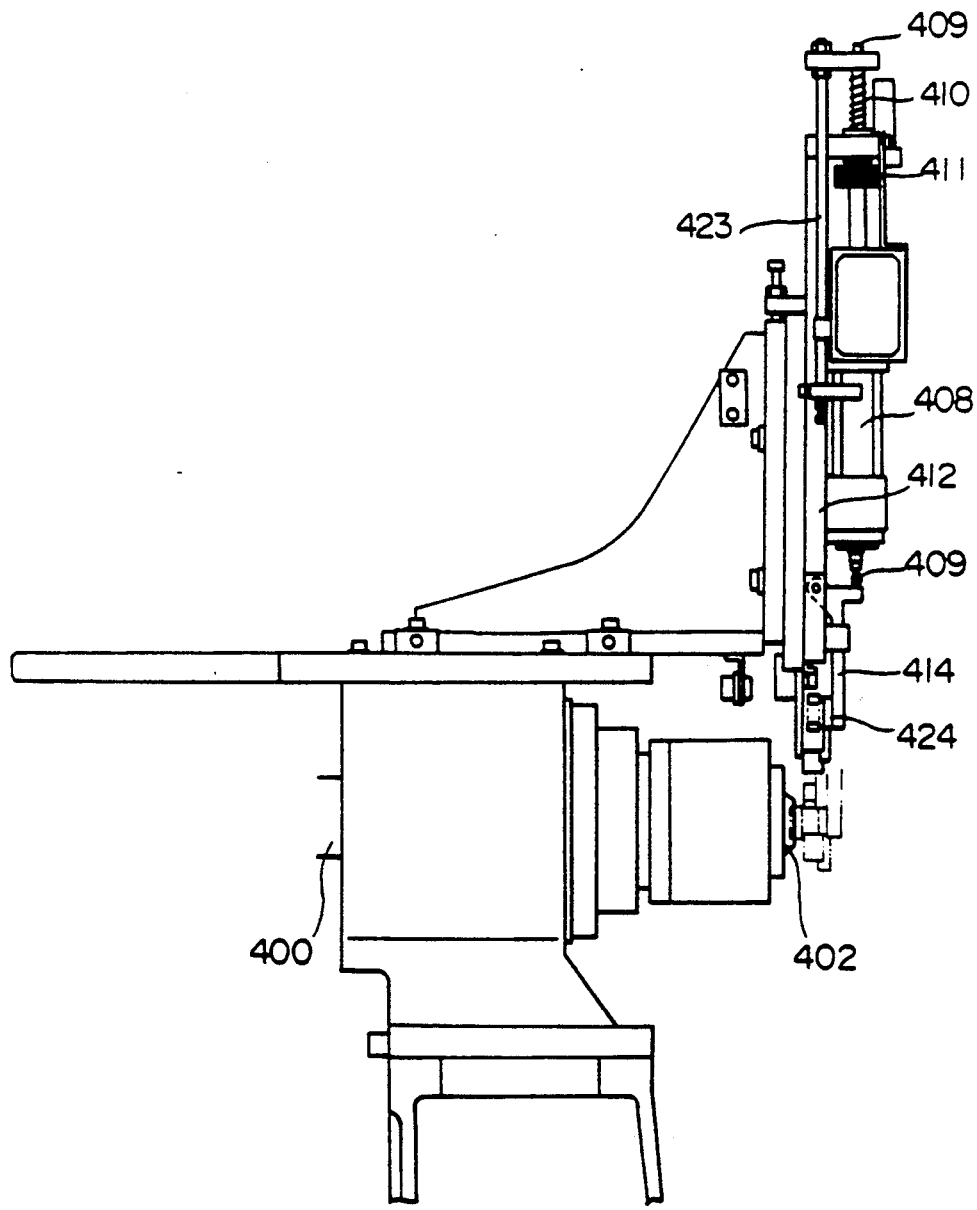
FIG. 4 is a side view of a portion of the spindles of the bi-spindle numerically controlled machine tool of FIG. 1.
Figures 1, 14:
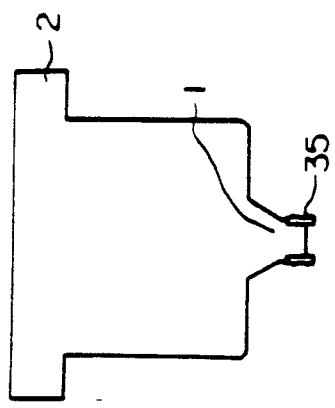
Figure 14:
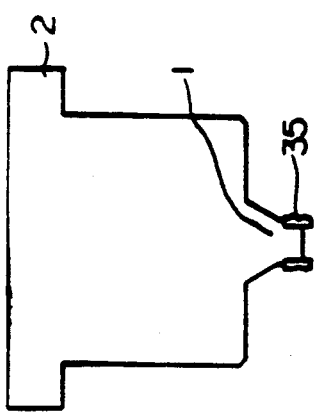
Figures 2, 14:
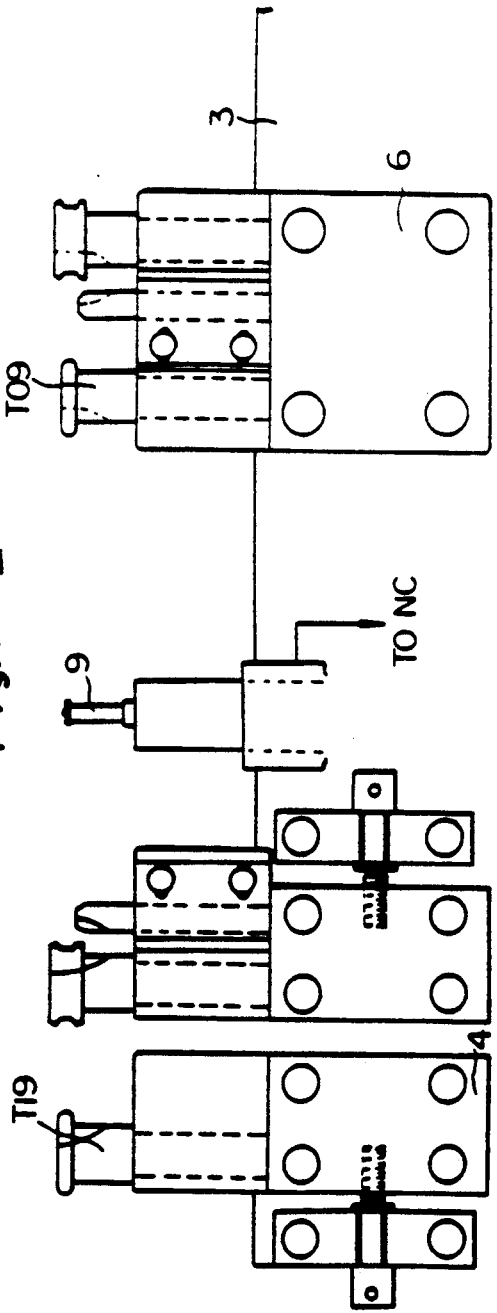

Referring first to FIGS. 1 through 5, the bi-spindle numerically controlled machine tool, i.e., a bi-spindle numerically controlled lathe, has a pair of right and left spindles 400 arranged in parallel with each other on a headstock 401. Each of the two spindles 400 has a chucking device 402 for holding workpieces W on the front ends of respective spindles 400. The two spindles have, on the respective rear sides thereof, pulleys 403 connected to a single drive motor 404 via belt 405 so that the two spindles 400 are rotated together at a high speed. The bi-spindle numerically controlled lathe is provided with a pair of workpiece supply devices 406, i.e., a left and right workpiece supply device, located above the front ends of the respective spindles 400. As best illustrated in FIG. 2, each workpiece supply device 406 includes a supply chute 407 descending from the side of the lathe toward one of the spindle 400, a handling device 415, and an intermittent work sending device 416 arranged in the supply chute 407 to intermittently feed workpieces one after the other toward the spindle 400. The handling device 415 includes a vertically slidable loading slide 412 having an upper end thereof located between a spring 410 wound around a vertical piston 409 of a vertically arranged cylinder device 408 and a fixedly arranged stop ring 411, a V-rest 413 arranged at the lowermost end of the loading slide 412, and a swingably arranged pusher lever 414 (FIG. 4). The intermittent work sending device 416 includes a pair of stop rods 417 having lower ends thereof for stopping the workpiece W in the supply chute 407, a rocking lever 418 arranged to rock about a middle point thereof and alternately giving a vertical motion to the two stop rods 417 pivoted respectively to the lever 418, and a leaf spring 419 engaged with the rocking lever 418 to exert a spring force urging the outer stop rod 417 to be moved down via the rocking lever 418. A pushing rod 423 having an upper end thereof connected to the uppermost end of the piston 409 is provided to be moved together with the piston 409 of the cylinder 408. When the pushing rod 423 is moved down, the rocking lever 418 is turned about the middle point thereof against the spring force of the spring 419, and therefore, the outer stop rod 417 is moved upward to allow one workpiece to roll down in the supply chute 407 until it is stopped by the inner stop rod 417. When the pushing rod 423 is then lifted up by the actuation of the cylinder 408, the rocking lever 418 is returned to its original position by the spring force of the spring 419, and as a result, the inner stop rod 417 is retracted upward to allow the workpiece stopped by that inner stop rod 417 to roll down toward the end of the supply chute 407, i.e., one workpiece W is fed to a predetermined position adjacent to the spindle 400.

In the bi-spindle numerically controlled lathe of FIGS. 1 through 5, a number of workpieces W are sequentially supplied by each of the descending supply chutes 407 of the respective workpiece supply devices 406 to the corresponding intermittent work sending device 416 by which workpieces W are fed toward the spindle 400 one by one, and each workpiece W rides on the V-rest 413 attached to the lowermost end of the loading slide 412. The loading slide 412 per se is moved up and down by the movement of the piston 409 of the cylinder 408. Therefore, when the piston 409 is moved down, the workpiece W riding on the V-rest 413 can be positioned at the above-mentioned predetermined position in front of and suitable for being caught by the spindle 400. While the piston 409 of the cylinder 408 moves further downward, while pressing against the spring 410, the piston 409 presses against the pusher lever 414 to cause the lever 414 to turn about a pivot thereof (FIG. 4), and as result, a pusher plate 424 of the pusher lever 414 is moved toward a chucking device 402 of the spindle 400. Consequently, the workpiece W on the V-rest 413 is inserted into the chucking device 402 by which the workpiece W is tightly chucked.

On the other hand, while the piston 409 moves down to cause the above-mentioned chucking of the workpiece W by the chucking device 402, the pushing rod 423 connected to the piston 409 is also moved downward, and as a result, the intermittent workpiece sending device 416 is operated to allow a subsequent workpiece to be fed toward the spindle 400 in the supply chute 407. Then, when the piston 409 of the cylinder 408 moves upward after chucking the former workpiece W, the loading slide 412 is also moved upward until the empty V-rest 413 attached to the lowermost end of the loading slide 412 is lifted to a position adjacent to the end of the supply chute 407 and suitable for receiving the subsequent workpiece W fed by the intermittent workpiece sending device. The upward movement of the piston 409 also causes an upward movement of the pushing rod 423 which, in turn, causes the rocking lever 417 to rock, and as a result, the subsequent workpiece W rolls down in the supply chute 407 until it rides on the V-rest 413.

Figure 1:
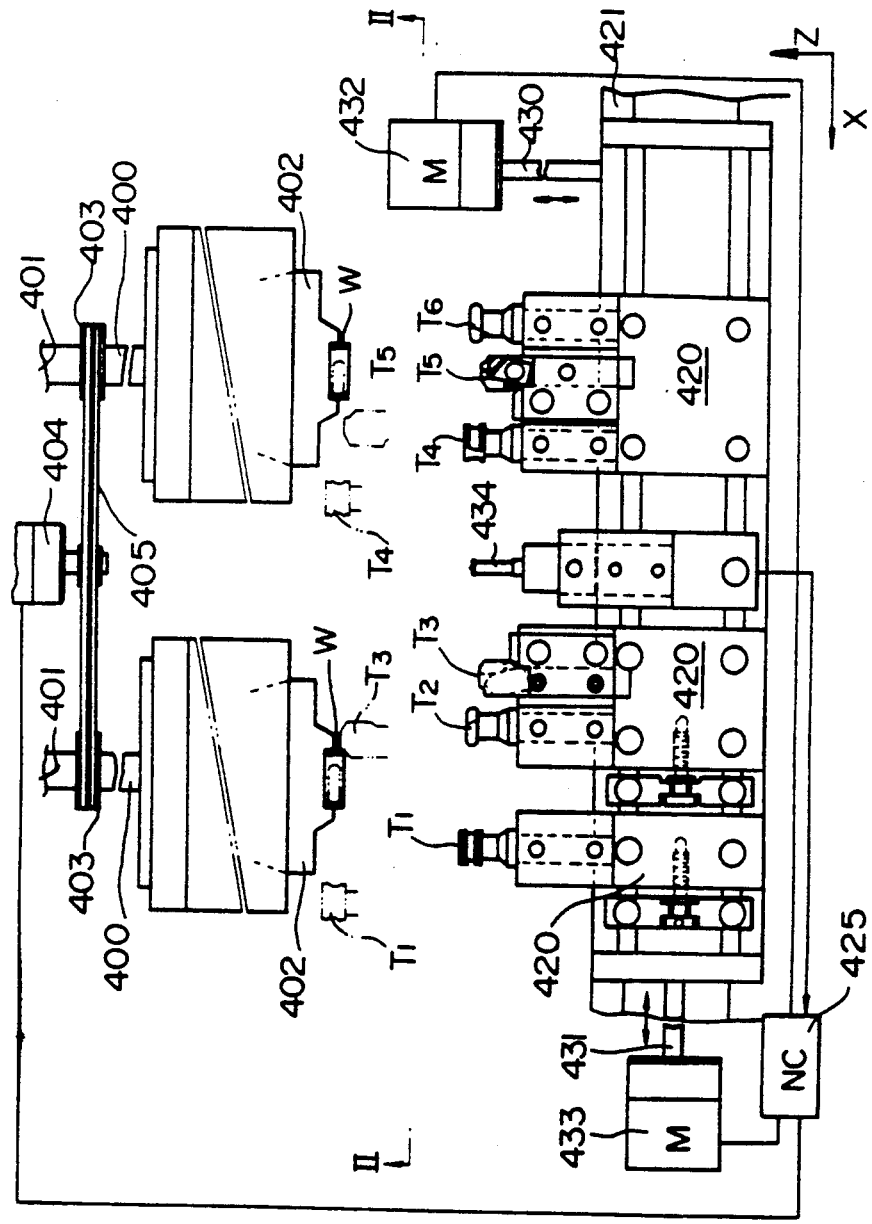
FIG. 1 is a plan view of a bi-spindle numerically controlled machine tool according to a typical embodiment of the present invention.
Figure 3:
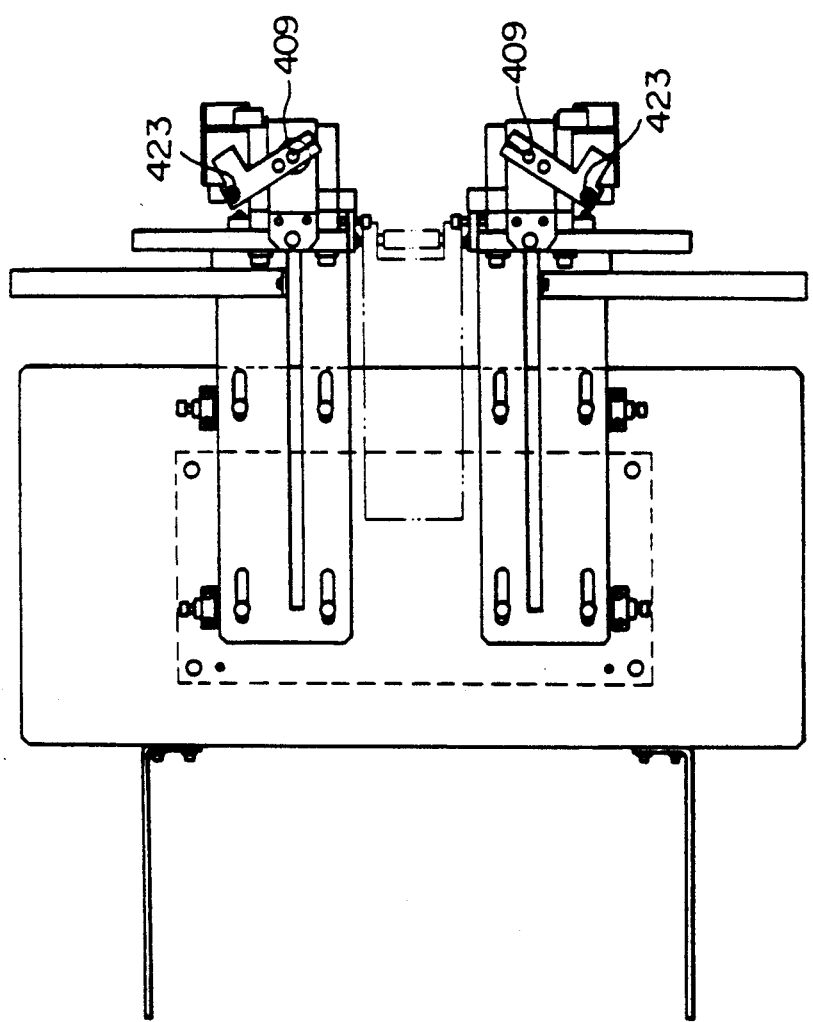
FIG. 3 is a partial top plan view taken along the line III—III of FIG. 2.

When the workpieces W are chucked by both chucking devices 402 of the two spindles 400, the two spindles 400 are ready to start the cutting operation of the workpieces W, and are rotated by the drive of the common spindle motor 404 (FIG. 1).

The bi-spindle numerically controlled lathe has tool blocks 420 (FIG. 1), which are attached to the top of a cross slide 422 slidably mounted on a reciprocative tool carriage 421. The tool carriage 421 is moved back and forth (Z-direction) by a feed screw 430 rotated by a prime mover, i.e., an electric feed motor 432, with respect to the spindles 400, and the cross slide 422 is moved longitudinally (X-direction) by a feed screw 431 rotated by another prime mover, i.e., an electric feed motor 433, with respect to the two spindles 400. The electric feed motors 432 and 433 are conventional electric servo motors and are electrically connected to a numerical controller (NC) 425 which controls the operation of the bi-spindle numerically controlled lathe in accordance with a predetermined numerical control program. The two left tool blocks 420 have a plurality of cutting tools $T_1$ through $T_3$ held thereon as a first group of cutting tools, and the right tool block 420 has a plurality of cutting tools $T_3$ through $T_6$ held thereon as a second group of cutting tools. The selection of one and/or two of the cutting tools $T_1$ through $T_6$ to be used for carrying out various types of cutting of the workpieces W, such as an outer face cutting, an inner face cutting, a boring, a groove cutting, a cutting off, and so on, at the respective spindles 400 is also determined by the numerical control program. The cutting tool or tools selected from the cutting tools $T_1$ through $T_6$ of the two separated groups held on the left and right tool blocks 420 alternately or simultaneously cut the workpieces W of the two spindles 400 during the common movement of the tool blocks 420 controlled by the numerical controller 425, via the tool carriage 421 and the cross slide 422.

A description of the method of machining workpieces W to form inner and outer bearing races by using a bi-spindle numerically controlled lathe similar to that of FIGS. 1 through 5, and cutting tools, chucking devices, and tool blocks able to be used with the bi-spindle numerically controlled lathe, will be provided hereinbelow.

FIG. 6 and 7a through 7h show a method of machining outer bearing races 5a and 7a from individual workpieces 5 and 7 chucked at the two parallel spindles 2 of the bi-spindle numerically controlled lathe. More specifically, as illustrated in FIG. 6, a first group of cutting tools 10, 12 and 14 attached to a left tool block 4, and a second group of cutting tools 15, 16, and 17 attached to a right tool block 6 are provided to alternately cut grooved tracks 11, and sealing grooves 13 in the inner faces of the two left and right hollow cylindrical workpieces 5 and 7 chucked by chucking devices 1 of the spindles 2, and to simultaneously chamfer outer corners of the two workpieces 5 and 7. The two tool blocks 4 and 6 are mounted on a common base 3 which is moved in the two mutually orthogonal directions by two feed motors, similar to the motors 432 and 433 of FIG. 1, and controlled by a numerical controller NC via a tool carriage and a cross slide (not shown in FIG. 6). A position of the left tool block 4 on the common base 3 with respect to the right tool block 6 can be finely adjusted by an adjusting screw 8, and therefore, the distance between the two identical cutting tools 10 and 15 is preliminarily set to be used for alternately cutting the grooved tracks 11 in the inner faces of the workpieces by the adjusting screw 8; the two cutting tools 10 and 15 are separated by a distance less than that existing between the axes of the two spindles 2, and arranged so that cutting edges of these cutting tools 10 and 15 confront one another in the longitudinal direction. The forming of sealing grooves 13 and chamfering of the workpieces 5 and 7 to produce the outer bearing races 5a and 7a are carried out by the left and right identical form tools 12 and 16 and left and right identical chamfering tools 14 and 17, respectively. A touch sensor 9 is mounted on the common base 3 at a position between the two tool blocks 4 and 6, and electrically connected to the numerical controller NC.

Figure 7A:
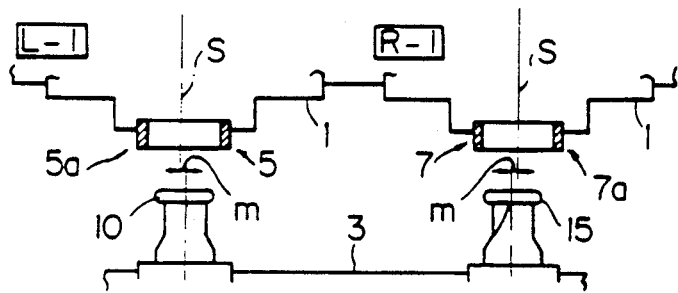
FIGS. 7a through 7h are explanatory plan views illustrating the sequential machining processes for machining an inner bore of an outer race of a bearing by employing the bi-spindle numerically controlled machine tool of FIGS. 1 through 5.
Figure 7B:
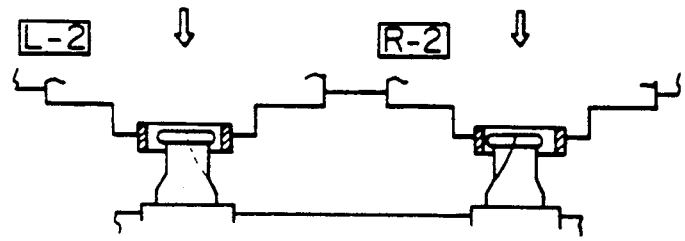
Figure 7C:
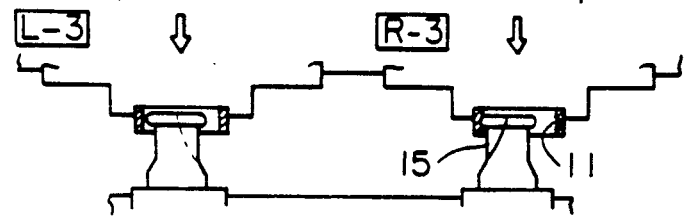
Figure 7D:
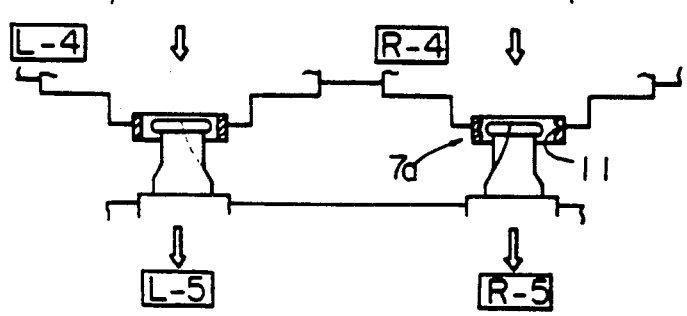
Figure 7E:
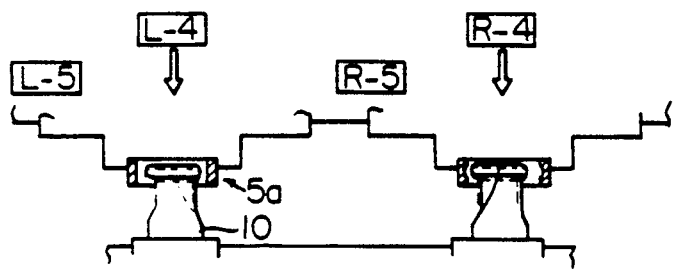
Figure 7F:
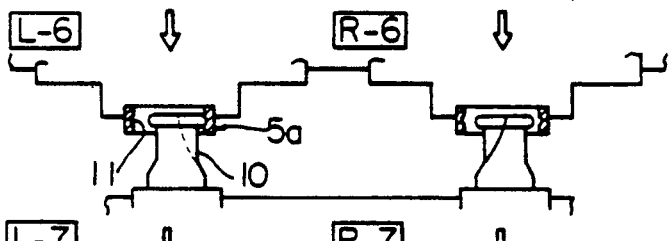
Figure 7G:
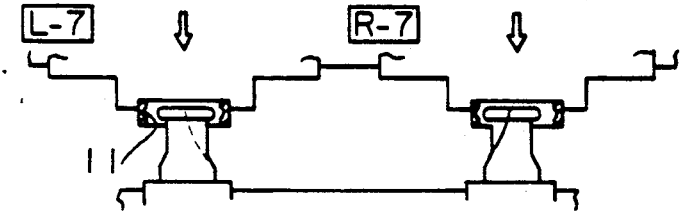
Figure 7H:
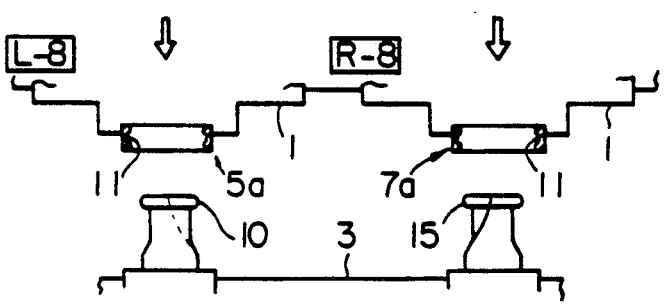

FIGS. 7a through 7h illustrate the sequential machining processes for forming the two workpieces 5 and 7 into the outer bearing races 5a and 7a in accordance with a numerical control program; i.e., the processes L-1 through L-8 illustrate how to machine a grooved track 11 in the inner face of the left outer bearing race 5a held by the left spindle 1 by using the numerically controlled cutting tool 10, and the processes R-1 through R-8 illustrate how to machine a grooved track 11 in the inner face of the right outer bearing race 7a held at the right spindle 2 by using the numerically controlled cutting tool 15, respectively. In the illustrated embodiment, the right workpiece 7 is first machined by the cutting tool 15, and thereafter, the left workpiece 5 is machined by the cutting tool 10. In FIG. 7a, each of the cutting tools 10 and 15 is initially offset by an amount "m" with respect to the axis "s" of the corresponding spindle 1, and therefore, the distance between the two cutting tools 10 and 15 is less than that between the axes "s" of the spindles 2.

An initial position adjustment of the cutting tool 15 and 10 with respect to the inner faces of the right and left workpieces 7 and 5 is carried out by using the touch sensor 9, respectively. That is, before starting a machining operation by the two cutting tools 10 and 15, a predetermined initial position of these cutting tools 10 and 15 to start the cutting operation therefrom is accurately established and measured by bringing the touch sensor 9 to a position in contact with the right and left workpieces 7 and 5, and the measured result is automatically stored in the numerical controller NC as control data. In the present embodiment, the positional adjustment of only the left cutting tool 10 is carried out in the process L-5 (the movement of both cutting tools 10 and 15 during the position adjustment process is illustrated by dotted lines in FIG. 7e). The above-mentioned position adjustment of the cutting tools 10 and 15 by bringing the touch sensor 9 into contact with the workpieces 5 and 15 is carried out by numerically controlling the movement of the common base 3 in the two mutually orthogonal directions, and this position adjustment operation is implemented either after a predetermined time period of using of the cutting tools 10 and 15, to compensate for wear of the cutting tools, or at the time of changing the used cutting tools for fresh cutting tools, for a renewal of the control data of the numerical controller. The wear of the cutting tools is periodically examined by sampling and checking the machined workpieces, e.g., the machined outer bearing races.

The outer bearing race 5a or 7a formed by sequentially cutting the workpiece 5 or 7 is illustrated in FIG. 8.

Figure 9:
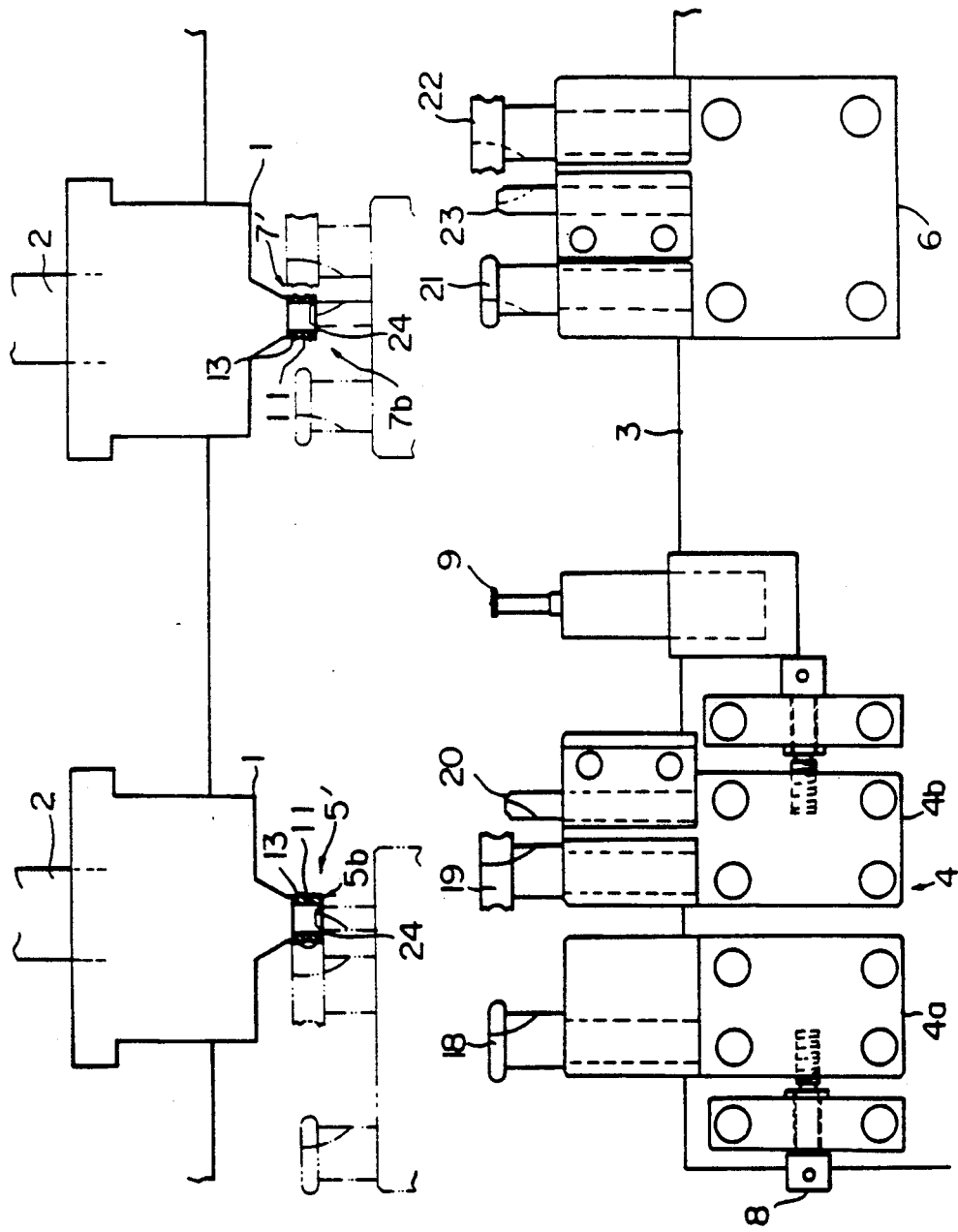
FIG. 9 is an explanatory plan view illustrating the machining of a grooved outer track of an inner race of a ball bearing by employing the bi-spindle numerically controlled machine tool of FIGS. 1 through 5.

FIG. 9 illustrates a case in which individual hollow cylindrical workpieces 5' and 7' are machined by the same bi-spindle numerically controlled lathe as that of FIG. 6 to form inner bearing races 5b and 7b. The workpieces 5' and 7' are chucked by chucking devices 1 of the left and right parallel spindles 2, and are subjected to cutting of grooved tracks 11 and sealing grooves 13 as well as chamfering of inner corners 24 by a left group of cutting tools 18 through 20 mounted on adjustable and fixed tool blocks 4a and 4b, and a right group of cutting tools 21 through 23 mounted on a tool block 6. The tool blocks 4a, 4b, and 6 are commonly fixed to a common base 3, the movement of which is controlled by a numerical controller NC. In the present embodiment, the left and right cutting tools (form tools) 18 and 21 are provided for cutting the grooved tracks 11, the left and right cutting tools 19 and 22 are provided for cutting the sealing grooves 13, and the left and right chamfering tools 20 and 23 are provided for chamfering the inner corners 24 of the inner bearing races 5b and 7b, respectively. A touch sensor 9 for a tool position adjustment is also mounted on the common base 3, and is used in a manner similar to that in the case of the bi-spindle numerically controlled lathe of FIG. 6.

The inner bearing race 5b or 7b formed by sequentially cutting the workpiece 5' or 7' is illustrated in FIG. 10.

FIGS. 11a through 11g illustrate an embodiment of the machining method in which machining processes L-1 through L-7 and R-1 through R-7 for cutting inner bores of two left and right workpieces 30 held on two parallel spindles 2 of a bi-spindle numerically controlled lathe are sequentially carried out by using cutting tools T01 and T11, in accordance with a numerical control program. The right and left workpieces 30, which are preliminarily formed as non-separated workpieces for a pair of inner and outer bearing races, are chucked by right and left chucking devices 1 of the two rotatable spindles 2 of the bi-spindle numerically controlled lathe, and alternately cut by the right and left cutting tools T01 and T11, the movements of which are controlled by a numerical controller NC. FIG. 11a illustrates the process L-1 and R-1 in which the two right and left cutting tools T01 and T11 are brought to a position in front of the two spindles 2, FIG. 11b illustrates the process L-2 and R-2 in which the two cutting tools T01 and T11 are set at a position adjacent to the respective workpieces 30, to thereby make a fine adjustment of the position of the right cutting tool T01, FIG. 11c illustrates the process L-3 and R-3 in which the inner bore of the right workpiece 30 is cut by the cutting tool T01 while the left cutting tool T11 is idle, FIG. 11e illustrates the process L-5 and R-5 in which a position adjustment of the left cutting tool T11 is carried out, FIG. 11f illustrates the process L-6 and R-6 in which the inner bore of the left workpiece 30 is cut by the cutting tool T11 while the right cutting tool T01 is idle, and FIG. 11g illustrates the process L-7 and R-7 in which both cutting tools are withdrawn from the workpieces 30 to the position as shown in FIG. 11a. In the machining processes of FIGS. 11a through 11g, when the cutting operation of either the right cutting tool T01 or the left cutting tool T11 is carried out, the tools T01 and T11 are fed in the two orthogonal directions shown by "+Z" and "+X", respectively. The above-mentioned processes of FIGS. 11a through 11g are repeated by the bi-spindle numerically controlled lathe controlled by the numerical controller NC, until accurate diameters $D_R$ and $D_L$ of the inner bores of the workpieces 30 (or the inner bearing races) are completely established.

FIG. 12 illustrates another embodiment of the machining method in which two identical workpieces 30 for producing a pair of inner and outer bearing races are chucked by chucking devices 1 of the two parallel spindles 1 and are machined by a left group of cutting tools 32, 33 and 33b and right group of cutting tools 32', 33' and 33b', respectively.

From the illustration of FIG. 12, it will easily understood that, while one of the two workpieces 30 is subjected to an inner bore cutting operation by either cutting tool 32 or 32', the other of the two workpieces 30 is subjected to a chamfering operation of an outer corner thereof by either cutting tool 33 or 33'. The cutting tools 33b and 33b' are used for chamfering an inner corner of each workpiece 30. The position adjustment of all cutting tools is carried out by using a touch sensor 9 connected to a numerical controller NC, before starting the above-mentioned cutting operations.

FIGS. 13a through 13h illustrate an embodiment of the machining method in which the machining of two individual hollow cylindrical workpieces 35 chucked by chucking devices 1 of two parallel spindles 2 of a bi-spindle numerically controlled lathe are alternately carried out in accordance with a numerical control program, by using two form tools T09 and T19 mounted on a common base 3 via tool blocks (not shown in FIGS. 13a through 13h). The feed of the two form tools T09 and T19 is controlled by a numerical controller NC of the bi-spindle numerically controlled lathe in an identical manner as described with reference to the afore-mentioned embodiments. Note, the two form tools T09 and T19 are arranged to be laterally separated by a distance larger than that between the axes of the two spindles 2, so that one of the form tools T09 and T19 is laterally brought to a position in contact with the workpiece 35, to cut the workpiece 35.

A description of the machining processes L-1 and R-1 through L-8 and R-8 of the two workpieces 35, in accordance with the numerical control program, is provided below in conjunction with FIGS. 13a through 13g.

In the process L-1 and R-1, the form tools T09 and T19 are advanced to a position just in front of the left and right spindles 2.

In the process L-2 and R-2, the form tools T09 and T19 are further advanced so that both tools are arranged alongside the outer faces of the two workpieces 35, and that the position adjustment of the right form tool T09 is accomplished.

In the process L-3 and R-3, the right form tool T09 cuts a grooved track in the outer face of the workpiece 35 held by the right spindle 2, and the left form tool T19 is idle.

In the process L-4 and R-4, the right form tool T09 is withdrawn from the workpiece 35 after cutting the grooved track, toward the same position as in the process R-2.

In the process L-5 and R-5, the position adjustment is applied to the left form tool T19 prior to starting the cutting operation thereof.

In the process L-6 and R-6, the left form tool T19 cuts a grooved track in the workpiece 35 held by the left spindle 2.

In the process L-7 and R-7, the left form tool T19 is withdrawn from the workpiece 35, after cutting the grooved track, toward the same position as in the process L-5.

In the process L-8 and R-8, both form tools T09 and T19 are retracted from the position adjacent to the workpieces 35 toward the position corresponding to that of Process L-1 and R-1.

After completion of the cutting of the grooved ball tracks of the two workpieces 35, due to the foregoing processes L-1 and R-1 through L-8 and R-8, the workpieces 35 are subjected to the next machining processes to form sealing grooves on the outer faces thereof and chamfer the outer corners thereof, respectively, by other form tools and chamfering tools as illustrated in FIG. 14. A touch sensor 9 of FIG. 14 is used for the initial position adjustment of all tools, and connected to a numerical controller NC which controls the operation of the bi-spindle numerically controlled lathe.

FIGS. 15a through 15n illustrate an embodiment of the machining method in which double grooved tracks are cut in the inner faces of workpieces 37 for outer bearing races, held at two parallel spindles 2 of a bi-spindle numerically controlled lathe by using form right and left tools T07 and T17 commonly mounted on a single tool block, the movement of which is controlled by a numerical controller in accordance with a numerical control program.

The embodiment of FIGS. 15a through 15h include 14 machining processes L-1 and R-1 through L-14 and R-14, and the right and left form tools T07 and T17 are initially arranged so that each of the axes of these two form tools is slightly offset from a corresponding axis of the workpieces as shown in FIG. 15a.

In the process L-1 and R-1 (FIG. 15a), the two right and left form tools T07 and T17 are brought to a position in front of the right and left spindles 2 of the bi-spindle numerically controlled lathe.

In the process L-2 and R-2 (FIG. 15b), the right and left form tools T07 and T17 are advanced in the z-direction to enter the right and left workpieces 37 held by chucking devices 1 of the right and left spindles 2. Simultaneously, the position adjustment of the right form tool T07 is implemented to thereby bring the tool T07 to a position in contact with the inner face of the right workpiece 37.

In the process L-3 and R-3 (FIG. 15c), the right form tool T07 cuts one of double grooved tracks in the inner face of the right workpiece 37, and the left form tool T17 remains idle.

In the process L-4 and R-4 (FIG. 15d), the right form tool T07 is withdrawn slightly from the inner face of the right workpiece 37 in the X-direction, and the left form tool T17 still remains idle.

In the process L-5 and R-5 (FIG. 15e), the right form tool T07 is fed forward by a predetermined amount in the Z-direction to cut another grooved track in the inner face of the right workpiece 37, and subjected to a position adjustment in accordance with the numerical control program.

In the process L-6 and R-6 (FIG. 15f), the right form tool T07 cuts another grooved track in the inner face of the right workpiece 37, and the left form tool T17 remains idle.

In the process L-7 and R-7 (FIG. 15g), the right form tool T07 is withdrawn slightly from the inner face of the workpiece 37 in the X-direction.

In the process L-8 and R-8 (FIG. 15h), a position adjustment of the left form tool T17 is carried out.

In the process L-9 and R-9 (FIG. 15i), the left form tool T17 cuts one of double grooved tracks in the face of the workpiece 37 held on the left spindle 2, and the right form tool T07 remains idle.

In the process 1-10 and R-10 (FIG. 15j), the left form tool T17 is withdrawn slightly from the inner face of the left workpiece 37.

In the process L-11 and R-11 (FIG. 15k), the left form tool T17 is fed back by a predetermined amount in the Z-direction to a position suitable for cutting another grooved track of the double tracks in the inner face of the left workpiece 37, and subjected to a position adjustment in accordance with the numerical control program.

In the process L-12 and R-12 (FIG. 15l), the left form tool T17 cuts another grooved track in the inner face of the left workpiece 37, and the right form tool T07 still remains idle.

In the process L-13 and R-13 (FIG. 15m), the left form tool T17 is withdrawn from the inner face of the left workpiece 37.

In the process L-14 and R-14 (FIG. 15n), both left and right form tools T17 and T07 are retracted from both workpieces 37 held on the two spindles 2 toward the initial position, as in the process L-1 and R-1.

FIGS. 16a through 16k illustrate an embodiment of the machining method in which workpieces for inner bearing races, held on the two parallel spindles of a bi-spindle numerically controlled lathe are machined by a point cutting by using point-cutting tools T08 and -T18, and a plurality of machining processes L-1 and R-1 through L-11 and R-11 are included in the method.

As illustrated in FIG. 16a, the two left and right point-cutting tools T08 and T18 are initially arranged so that the cutting points of these tools are separated laterally by a distance larger than that between the axes of the left and right spindles 2. Therefore, when the cutting operation is carried out, the left and right cutting tools T08 and T18 are alternately advanced to a position in contact with the outer face of a corresponding workpiece 39, and cut the double grooved tracks in the respective outer faces of the two workpieces 39 one by one.

In the first process L-1 and R-1 (FIG. 16a), the two right and left point-cutting tools T08 and T18 are moved to a position in front of the corresponding spindles 2.

In the process L-2 and R-2 (FIG. 16b), the right point-cutting tool T08 is advanced to a position alongside the outer face of the right workpiece 39 to cut one of the double grooved tracks, and is subjected to a position adjustment in accordance with a numerical control program.

In the process L-3 and R-3 (FIG. 16c), the right point-cutting tool T08 is fed in both the X- and Z-directions to cut and form a grooved track 40 in the outer face of the right workpiece 39.

In the process L-4 and R-4 (FIG. 16d), the right point-cutting tool T08 is moved to a position to cut another grooved track 41 in the outer face of the right workpiece 39, and a position adjustment of the tool T08 is carried out in accordance with the numerical control program.

In the process L-5 and R-5 (FIG. 16e), the right point-cutting tool T08 is fed in both the X- and Z-directions to cut and form the other grooved track 41 of the double tracks in the outer face of the right workpiece 39.

In the process L-6 and R-6 (FIG. 16f), the right point-cutting tool T08 is withdrawn from the outer face of the right workpiece 39, and the left point-cutting tool T18 is moved to a position at which a grooved track 42 can be cut in the outer face of the left workpiece 39 held by the left spindle 2.

In the process L-7 and R-7 (FIG. 16g), a position adjustment of the left point-cutting tool T18 is carried out in accordance with the numerical control program.

In the process L-8 and R-8 (FIG. 16h), the left point-cutting tool T18 is fed in both the X- and Z-directions to cut and form one grooved track 42 in the outer face of the left workpiece 39 held at the left spindle 2, and the right point-cutting tool T08 remains idle.

In the process L-9 and R-9 (FIG. 16i), the left point-cutting tool T18 is moved to a position to cut the other grooved track 43 of the double tracks in the outer face of the left workpiece 39.

In the process L-10 and R-10 (FIG. 16j), the left point-cutting tool T18 cuts and forms the other grooved track 43 in the outer face of the left workpiece 39. At this stage, an adjustment causing the diameter $DL_2$ of the track 43 to be made equal to the diameter $DL_1$ of the track 42 is also carried out.

In the process L-11 and R-11 (FIG. 16k), both right and left point-cutting tools T08 and T18 are withdrawn from the workpieces 39 toward the position as in the process L-1 and R-1.

Figures 1, 17:
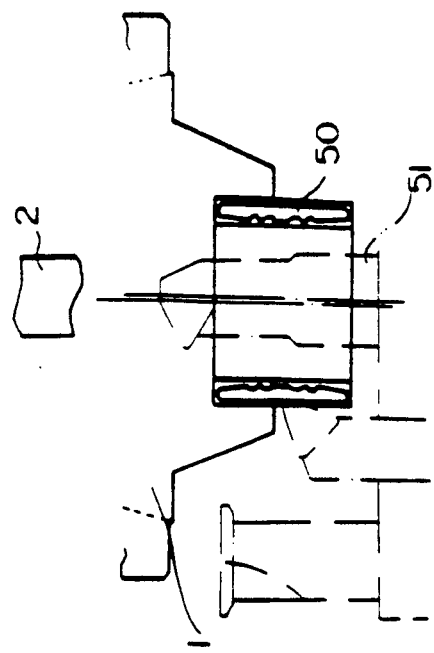
Figure 17:
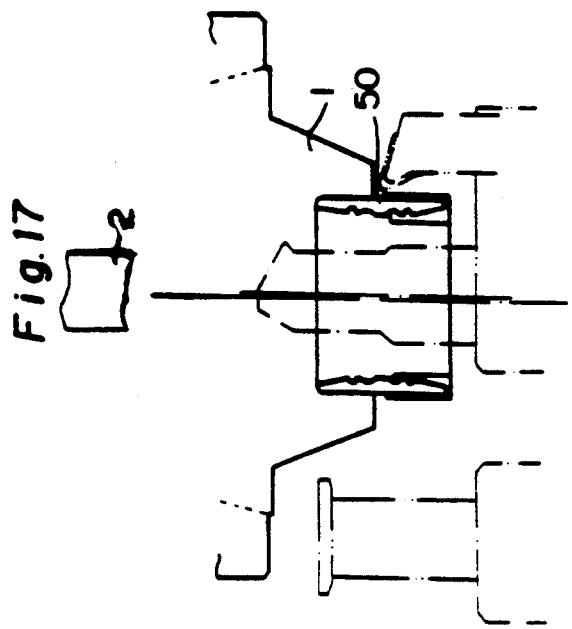
Figures 2, 17:
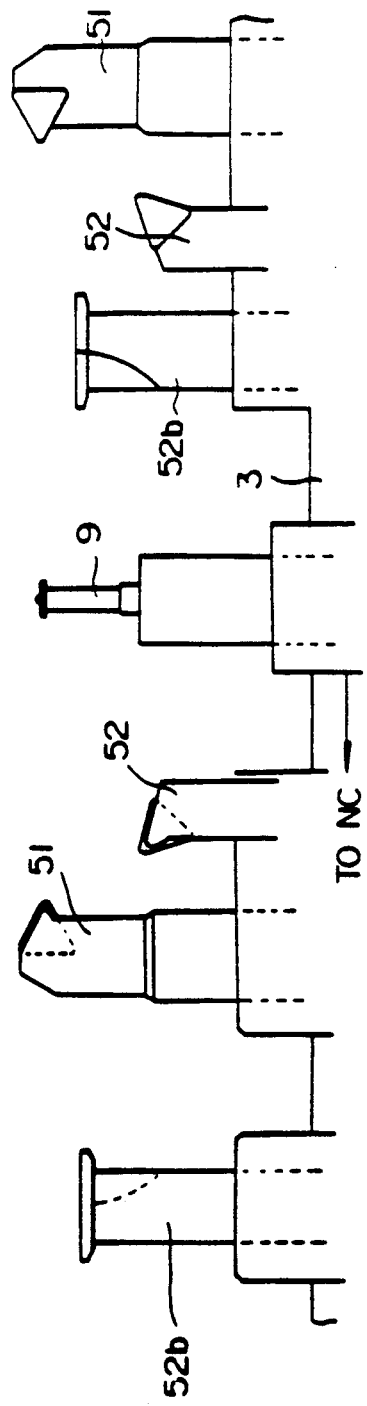
Figures 1, 18E, 18F, 18G, 18H:
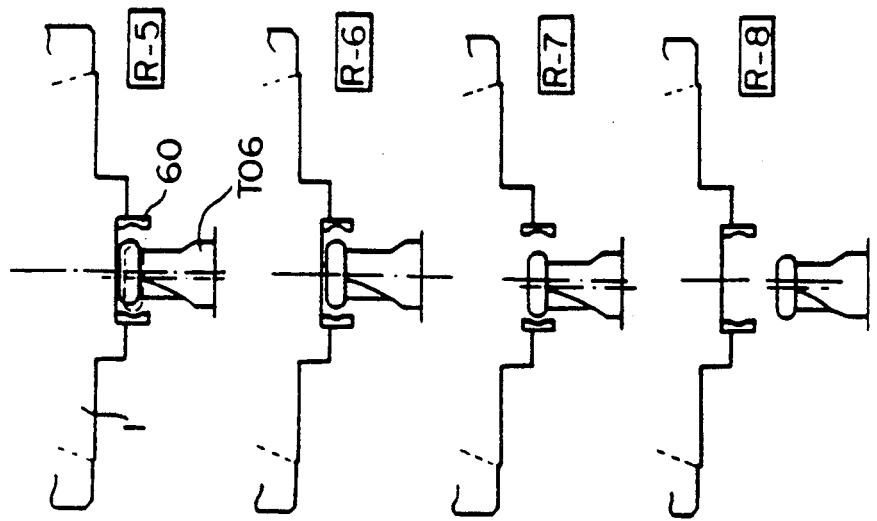
Figures 18E, 18F, 18G, 18H:
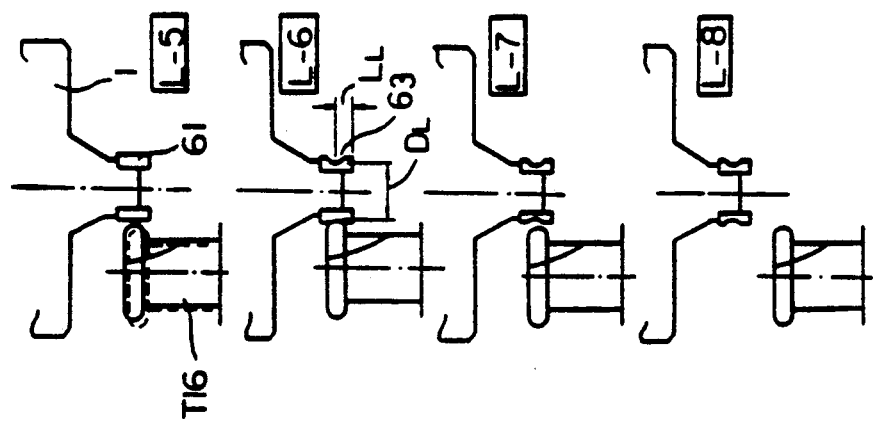
Figure 20A:
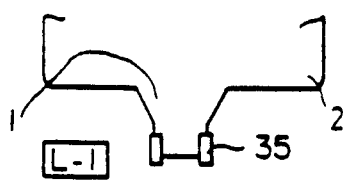
Figures 1, 20A:
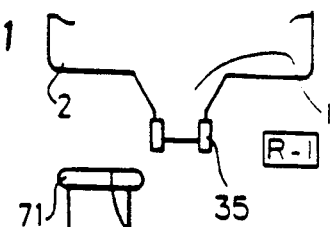
Figure 20B:
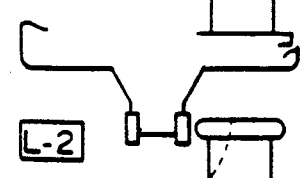
Figures 1, 20B:
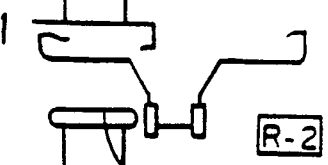
Figure 20C:
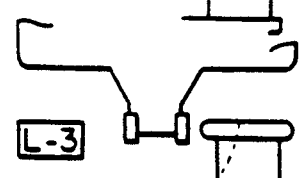
Figures 1, 20C:
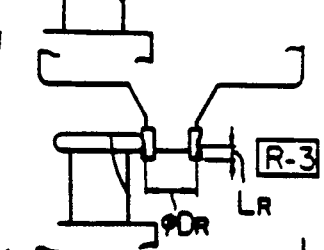
Figure 20D:
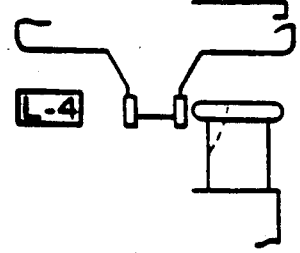
Figures 1, 20D:
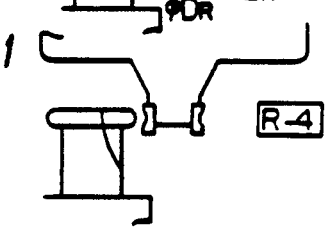
Figure 20E:
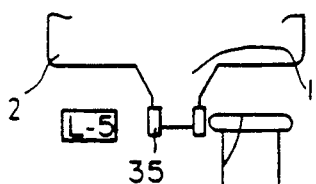
Figures 1, 20E:
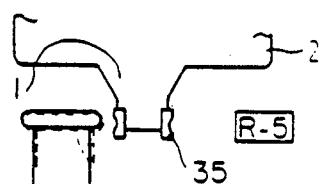
Figure 20F:
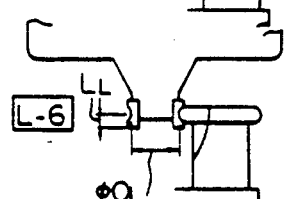
Figures 1, 20F:
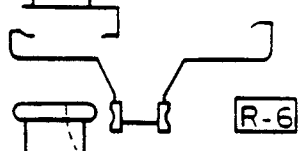
Figure 20G:
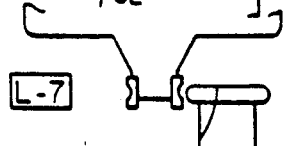
Figures 1, 20G:
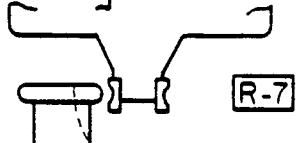
Figure 20H:
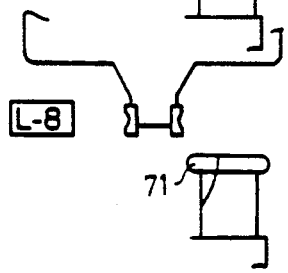
Figures 1, 20H:
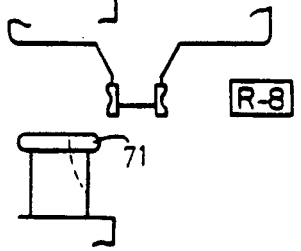

FIG. 17 illustrates an embodiment of the machining method in which a single workpiece 50 to be formed in an outer bearing race having double grooved tracks is continuously machined in two separate machining processes by using two parallel spindles 2 of a bi-spindle numerically controlled lathe, in accordance with a numerical control program.

In the method of FIG. 17, the workpiece 50 is initially chucked by a chucking device 1 of the left spindle 2, and left cutting tools 51 and 52 cut a portion of the inner and outer faces of the workpiece 50, which portion is not chucked by the chucking device 1. Thereafter, the workpiece 50 is moved to the right spindle 2 by an appropriate workpiece conveyer, so that the portion of the workpiece 50 machined at the left spindle 2 is in turn chucked by a chucking device 1 of the right spindle 2, and a reverse unmachined portion of the inner and outer faces of the workpiece 50 is cut by cutting tools 51 and 52 identical with the left cutting tools 51 and 52. The double grooved tracks are cut by a cutting tool 52b while the workpiece 50 is chucked by either one of the chucking devices 1 of the left and right spindles 2. Note; the workpiece 50 may be initially machined at the right spindle 2, and then at the left spindle 2.

FIGS. 18a through 18h illustrate an embodiment of the machining method in which a workpiece 60 for an outer bearing race is machined at one of the two parallel spindles 2, and another workpiece 61 for an inner bearing race is machined at the other of the spindles 2. The machining of the two workpieces 60 and 61 is processed in the manner described hereinafter.

FIG. 19 illustrates form tools T06 and T16 for cutting grooved tracks, cutting tools for cutting sealing grooves, and chamfering tools, and a bi-spindle numerically controlled lathe used for carrying out the machining method of FIGS. 18a through 18h. The above-mentioned cutting tools are commonly mounted on a tool block or base 3 on which a touch sensor 9 connected to a numerical controller NC is also mounted. The common tool base 3 is fed in two mutually orthogonal directions (X- and Z-directions) in accordance with a numerical control program.

In the process L-1 and R-1 (FIG. 18a), the form tools T06 and T16 are initially brought to a position in front of the right and left spindles 2.

In the process L-2 and R-2 (FIG. 18b), the form tools T06 and T16 are moved forward to respective positions adjacent to the right and left workpieces 60 and 61, and the right form tool T06 is subjected to a position adjustment in accordance with the numerical control program. Note, the right form tool T06 is positioned inside the workpiece 60, and the left form tool is positioned alongside the left workpiece 61.

In the process L-3 and R-3 (FIG. 18c), the right form tool T06 is fed and brought into contact with the inner face of the workpiece 60 to cut a grooved track 62, and the left form tool T16 remains idle.

In the process L-4 and R-4 (FIG. 18d), the right form tool T06 is withdrawn from the inner face of the right workpiece 60 to the same position as the process L-2 and R-2.

In the process L-5 and R-5 (FIG. 18e), the left form tool T16 is subjected to a position adjustment in accordance with the numerical control program.

In the process L-6 and R-6 (FIG. 18f), the left form tool T16 is fed and brought into contact with the outer face of the left workpiece 61 to cut a grooved track 63 in the outer face of the left workpiece 61, and the right form tool T06 remains idle.

In the process L-7 and R-7 (FIG. 18g), the left form tool T16 is withdrawn from the outer face of the left workpiece 61 to the same position as the process L-5 and R-5.

In the process L-8 and R-8 (FIG. 18h), both right and left form tools T06 and T16 are retracted from the workpieces 60 and 61 to the position corresponding to that in the process L-1 and R-1.

FIGS. 20a through 20h illustrate an embodiment of the machining method in which two identical workpieces 35 chucked by chucking devices 1 of two parallel spindles 2 of a bi-spindle numerically controlled lathe are machined by two right and left juxtaposed form cutting tools 71 commonly mounted on a tool block. The right and left form cutting tools 71 are moved in two mutually orthogonal directions in accordance with a numerical control program stored in a numerical controller NC, and the right and left workpieces 35 are formed with a grooved track in the outer face thereof, respectively, alternately by the form tools 71.

The processes L-1 and R-1 through L-4 and R-4 illustrate the sequence of machining for cutting the grooved track in the right workpiece 35, and the subsequent processes L-5 and R-5 through L-8 and R-8 illustrate the sequence of machining for cutting the grooved track in the left workpiece 35. It should be understood that the machining of the left workpiece may be first carried out at the left spindle 2 prior to machining of the right workpiece at the right spindle 2.

In the foregoing embodiments of the machining method of the present invention, individual hollow cylindrical workpieces are chucked by using the chucking devices of the two parallel spindles of a bi-spindle numerically controlled lathe. However, when either one or both of two parallel spindles of a bi-spindle numerically controlled lathe is provided with a workpiece feeder for continuously feeding a bar-like workpiece through the spindle or spindles, the bar-like workpiece is tightly held by a suitable holding device provided at a front end of each spindle and is machined by the methods similar to those described before.

A detailed description of the cutting method of bar-like workpieces by using a bi spindle numerically controlled lathe with bar feeder is now provided below.

Figure 21:
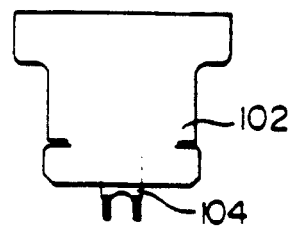
Figures 1, 21:
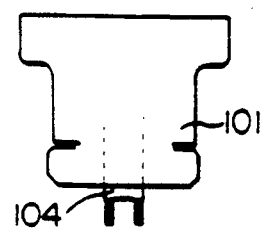
Figures 2, 21:
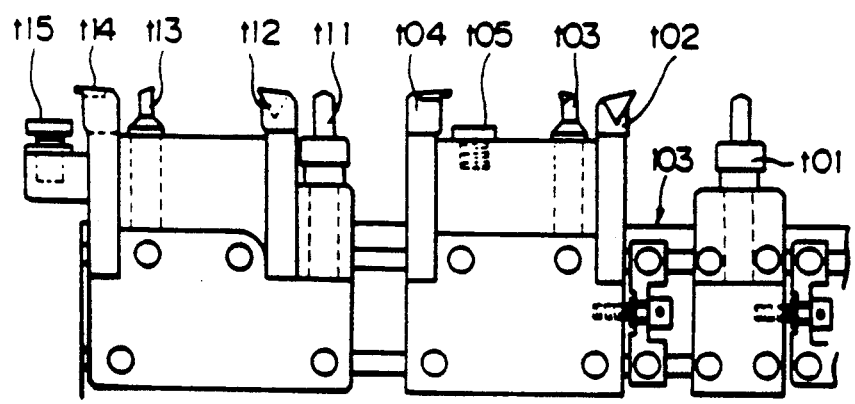
Figure 22A:
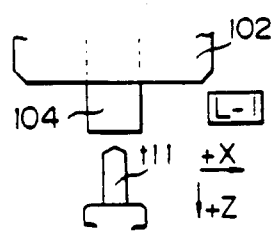
Figures 1, 22A:
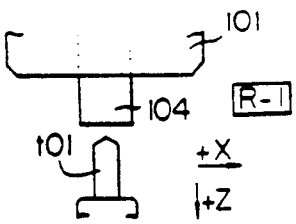
Figure 22B:
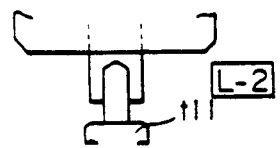
Figures 1, 22B:
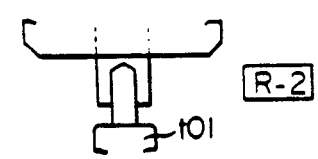
Figure 22C:
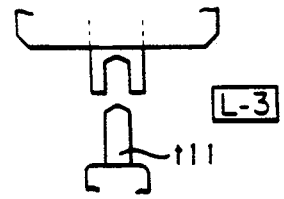
Figures 1, 22C:
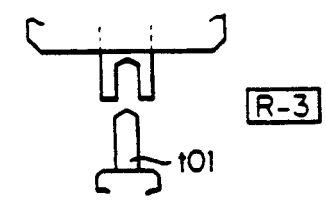
Figure 22D:
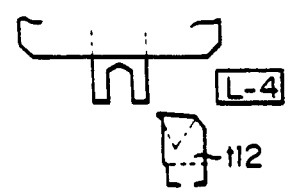
Figures 1, 22D:
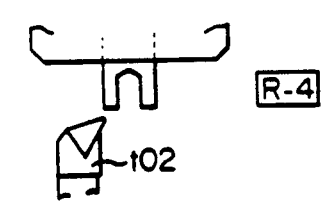
Figure 22E:
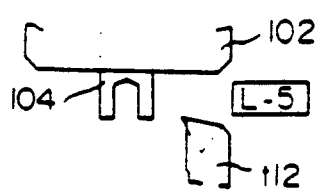
Figures 1, 22E:
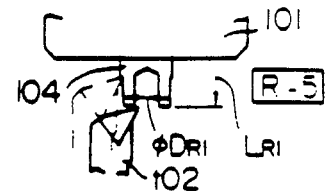
Figure 22F:
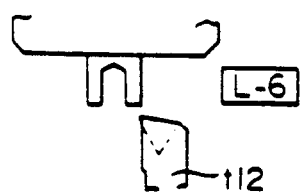
Figures 1, 22F:
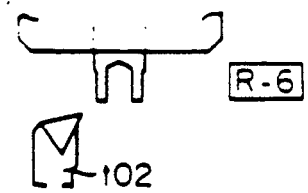
Figure 22G:
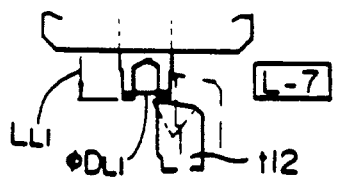
Figures 1, 22G:
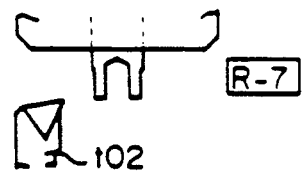
Figure 22H:
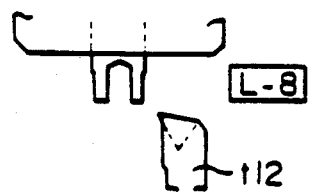
Figures 1, 22H:
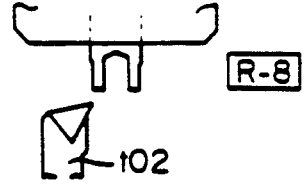
Figure 22I:
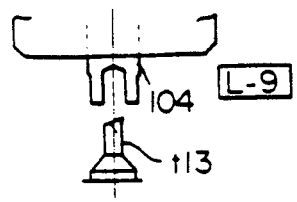
Figures 1, 22I:
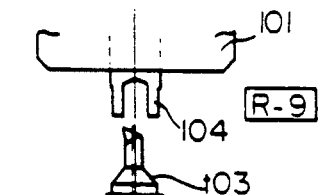
Figure 22J:
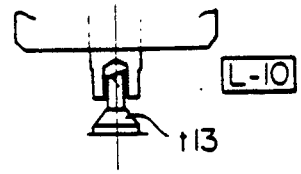
Figures 1, 22J:
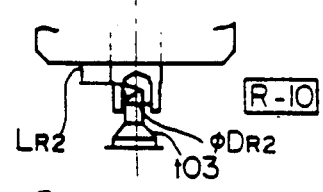
Figure 22K:
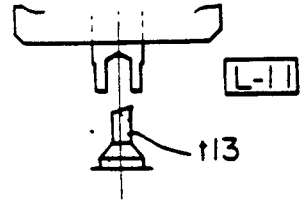
Figures 1, 22K:
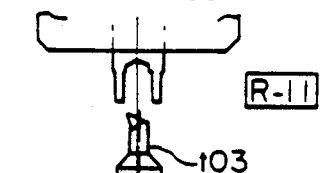
Figure 22L:
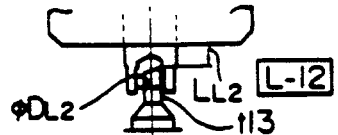
Figures 1, 22L:
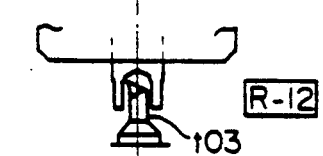
Figure 22M:
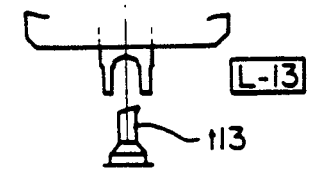
Figures 1, 22M:
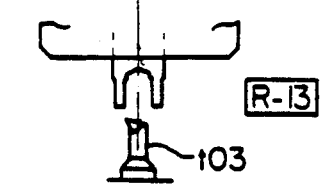
Figure 22N:
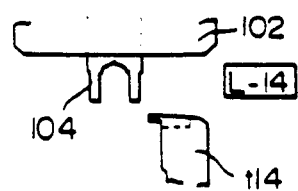
Figures 1, 22N:
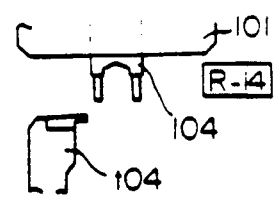
Figure 22O:
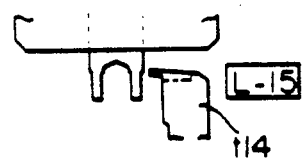
Figures 1, 22O:
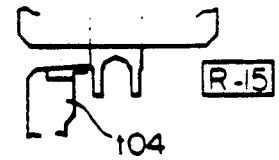
Figure 22P:
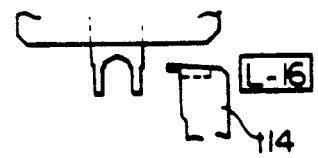
Figures 1, 22P:
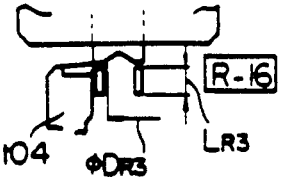
Figure 22Q:
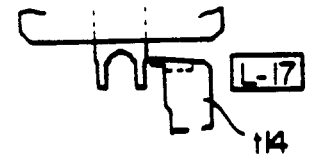
Figures 1, 22Q:
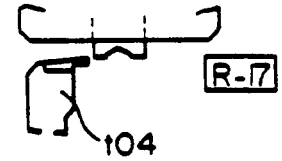
Figure 22R:
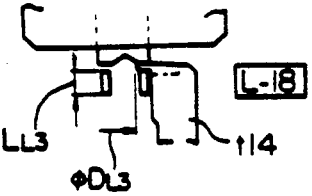
Figures 1, 22R:
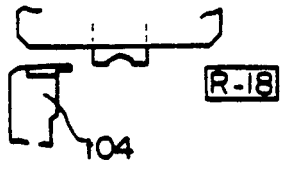
Figure 22S:
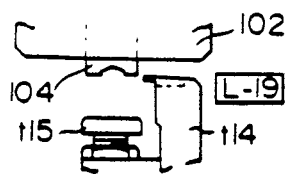
Figures 1, 22S:
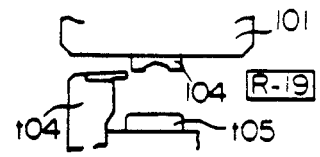
Figure 22T:
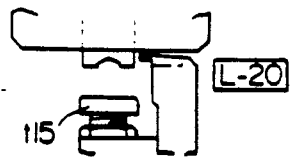
Figures 1, 22T:
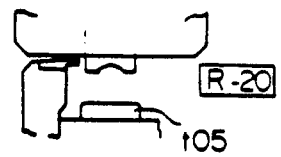
Figure 22U:
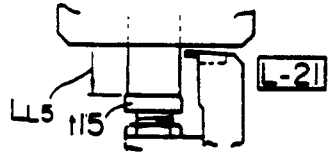
Figures 1, 22U:
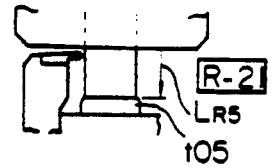
Figure 22V:
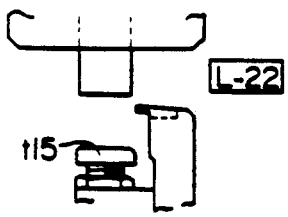
Figures 1, 22V:
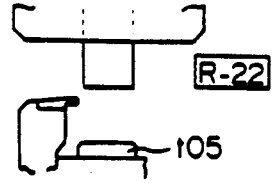

FIGS. 21 and 22a through 22v illustrate an embodiment of the machining method in which a pair of bar-like workpieces are fed through two parallel spindles of a bi-spindle numerically controlled lathe by bar feeders of the two spindles and are cut by separate groups of cutting tools mounted on a tool block unit, the movement of which is controlled by a numerical controller in accordance with a numerical control program. The workpieces are cut by cutting-off tools of the two groups of cutting tools after completion of the entire cutting operation.

As illustrated in FIG. 21, the bi-spindle numerically controlled lathe has a pair of parallel spindles 101 and 102 provided with a bar feeder (not shown in FIG. 21) respectively, for feeding a pair of bar-like workpieces 104. The lathe also has a common tool base 103 movable in two mutually orthogonal directions under the control of a numerical controller (not shown), and a pair of right and left groups of cutting tools t01 through t04 and t11 through t14 are mounted on the common tool base 103.

The machining processes of the workpieces 104 are now described with reference to FIGS. 22a through 22v.

In the process L-1 and R-1 of FIG. 22a drills t01 and t11 are moved to a position in front of the respective spindles 101 and 102. The distance between the two drills t01 and t11 is preliminarily set to be accurately equal to that existing between the axes of the two spindles 101 and 102.

In the process L-2 and R-2 of FIG. 22b, the pair of workpieces 104 of the right and left spindles 101 and 102 are simultaneously drilled by the drills t01 and t11.

In the process L-3 and R-3 of FIG. 22c, the two drills t01 and t11 are withdrawn from the corresponding workpieces 104.

In the process L-4 and R-4 of FIG. 22d, cutting tools t02 and t12 for cutting an outer face of each workpiece 104 are simultaneously moved to a position in front of the two spindles 101 and 102, and a position adjustment of the right cutting tool t01 is carried out in accordance with a numerical control program to obtain desired dimensions of $D_R 1$ and $L_R 1$ (FIG. 22e) of the right workpiece 104. The tool position adjustment is carried out by moving the common tool base 103.

In the process L-5 and R-5 of FIG. 22e, the right cutting tool t02 cuts the outer face of the right workpiece 104, and the left cutting tool t12 remains idle.

In the process L-6 and R-6 of FIG. 22f, the left cutting tool t12 is moved to a position adjacent to the left workpiece 104, and a position adjustment of the left cutting tool t12 is carried out in accordance with the numerical control program to obtain desired dimensions of $D_L 1$ and $L_L 1$ (see FIG. 22e) of the right workpiece 104.

In the process L-7 and R-7 of FIG. 22g, the left cutting tool t12 cuts the outer face of the left workpiece 104 until the above-mentioned desired dimensions are obtained, and the right cutting tool t02 remains idle.

In the process L-8 and R-8 of FIG. 22h, both cutting tools t02 and t12 are withdrawn from the corresponding workpieces 104.

In the process L-9 and R-9 of FIG. 22i, cutting tools t03 and t13 for cutting inner faces of the workpieces 104 are brought to a position in front of the right and left spindles 101 and 102, and a position adjustment of the right cutting tool t03 is carried out in accordance with a numerical control program to obtain desired dimensions $D_R 2$ and $L_R 2$ of the right workpiece 104.

In the process L-10 and R-10 of FIG. 22j, the right cutting tool t03 cuts the inner face of the right workpiece 104 to establish the desired dimensions $D_R 2$ and $L_R 2$ of the right workpiece 104, and the left cutting tool t13 remains idle.

In the process L-11 and R-11 of FIG. 22k, the right cutting tool t03 is withdrawn from the right workpiece 104, and the left cutting tool t13 is moved to a position in front of the left workpiece 104. A position adjustment of the left cutting tools t13 is also carried out to obtain desired dimensions $D_L 2$ and $L_L 2$ of the left workpiece 104.

In the process L-12 and R-12 of FIG. 22l, the left cutting tool t13 cuts the inner face of the left workpiece 104 to obtain the desired dimensions $D_L 2$ and $L_L 2$ of the left workpiece 104, and the right cutting tool t03 remains idle.

In the process L-13 and R-13 of FIG. 22m, both cutting tools t03 and t13 are withdrawn from the corresponding workpieces 104.

In the process L-14 and R-14 of FIG. 22n, right and left cutting-off tools t04 and t14 are brought to a position in front of the right and left workpieces 104 held at the two spindles 101 and 102.

In the process L-15 and R-15 of FIG. 22o, the right cutting-off tool t04 is moved to a position alongside the right workpiece 104, and a position adjustment of the tool t04 is carried out in response to desired dimensions $D_R 3$ and $L_R 3$ of the right workpiece 104.

In the process L-16 and R-16 of FIG. 22p, the right cutting-off tool t04 severs and separates the right workpiece from the remaining bar-like workpiece 104. The left cutting-off tool t14 remains idle.

In the process L-17 and R-17 of FIG. 22q, the right cutting tool t04 is withdrawn from the right bar-like workpiece 104, and the left cutting-off tool t14 is moved to position alongside the left workpiece 104, and a position adjustment of the tool t14 is carried out in response to desired dimensions $D_L 3$ and $L_L 3$ of the left workpiece 104.

In the process L-18 and R-18 of FIG. 22r, the left cutting-off tool t14 severs and separates the left workpiece 104 from the remaining bar-like workpiece 104. The right cutting-off tool t14 is idle.

In the process L-19 and R-19 of FIG. 22s, the left cutting-off tool t14 is withdrawn from the bar-like workpiece 104 held by the left spindle 102. The right cutting-off tool t04 is also withdrawn from the right workpiece 104 held by the right spindle 101.

In the process L-20 and R-20 of FIG. 22t, right and left stop tools t05 and t15 are brought to a position in front of the respective spindles 101 and 102 to establish predetermined feeding lengths $L_R 5$ and $L_L 5$ of both workpieces 104 in the spindles 101 and 102. A fine adjustment of the right and left stop tools t05 and t15 is carried out in accordance with a numerical control program.

In the process L-21 and R-21 of FIG. 22u, the holding devices of the right and left spindles 101 and 102 are released to allow the respective bar-like workpieces 104 to be axially fed by the bar feeder. The workpieces 104 are fed until they are stopped by the stop tools t05 and t15, respectively, and thereafter the holding devices are tightened again to tightly hold the workpieces 104 by the right and left spindles 101 and 102.

In the process L-22 and R-22 of FIG. 22v, the stop tools t05 and t15 are retracted from the predetermined respective positions of the process L-21 and R-21, and a pair of machined products are obtained.

The processes L-1 and R-1 through L-22 and R-22 are repeated to produce a plurality of machined products from the bar-like workpieces 104.

Figures 1, 23:
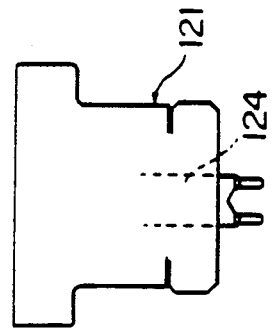
Figure 23:
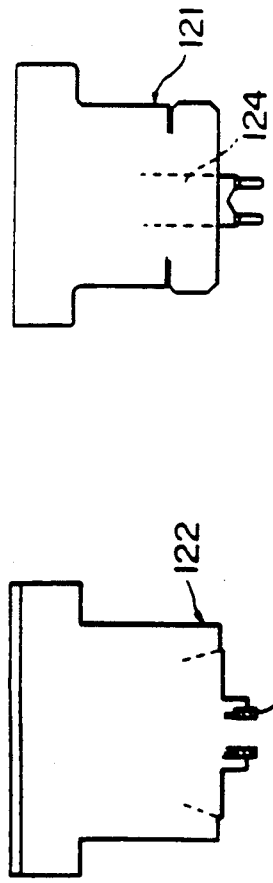
Figures 2, 23:
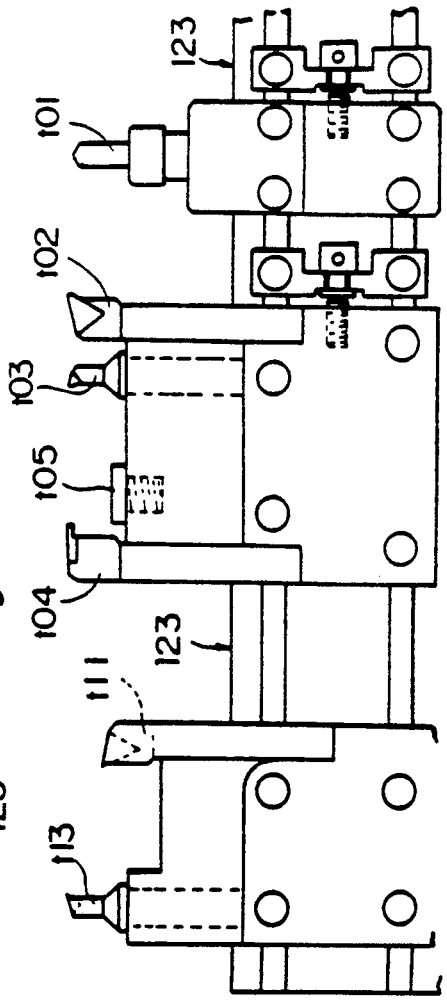
Figure 24A:
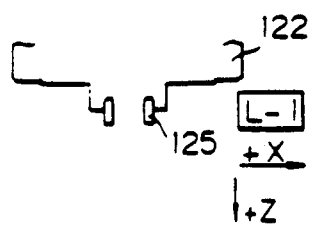
Figures 1, 24A:
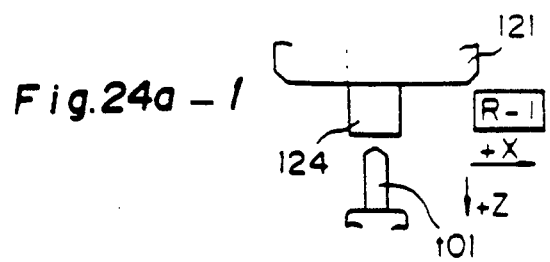

FIGS. 23 and 24a through 24u illustrate an embodiment of the machining method in which one bar-like workpiece 124 is machined at one spindle 121 of the two parallel spindles while feeding the bar-like workpiece 124 by a bar feeder of the spindle 121, and the machined portion is severed from the bar-like workpiece 124 as an individual workpiece 125, and conveyed to the other spindle 122 at which the individual workpiece 125 is again subjected to a machining operation by a left cutting tool to finish the severed end of the workpiece 125.

In FIG. 23, the right spindle 121 of a bi-spindle numerically controlled lathe is provided with a bar feeder (not shown) and the left spindle 122 is provided with a chucking device for grasping an individual workpiece. The lathe also has a common tool block unit 123, the movement of which is controlled by a numerical controller. A right group of cutting tools - t01 through t04, and a left group of cutting tools t11 and t134, and a stop tool t05 are commonly mounted on the tool block unit 123.

A description of the machining process carried out by the bi-spindle numerically controlled lathe of FIG. 23 is provided below with reference to FIGS. 24a through 24u.

In the process L-1 and R-1 of FIG. 24a, the drill t01 is brought to a position in front of the right spindle 121 holding a bar-like workpiece 124.

Figure 24B:
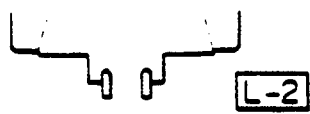
Figures 1, 24B:
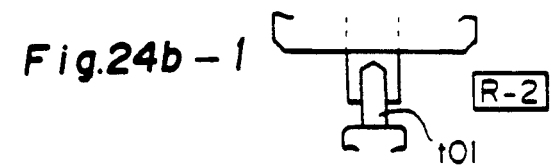

In the process L-2 and R-2 of FIG. 24b, the drill t01 is fed in the workpiece 124 to drill therein a hole having a predetermined depth in accordance with a numerical control program.

Figure 24C:
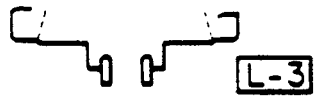
Figures 1, 24C:
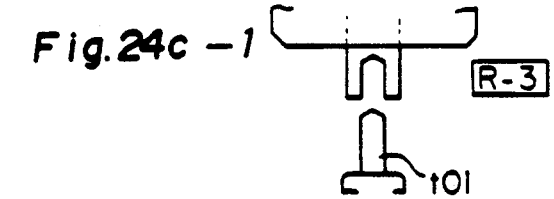

In the process L-3 and R-3 of FIG. 24c, the drill t01 is withdrawn from the workpiece 124 after completion of drilling of the hole.

Figure 24D:
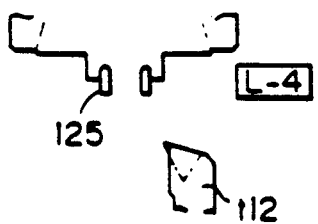
Figures 1, 24D:
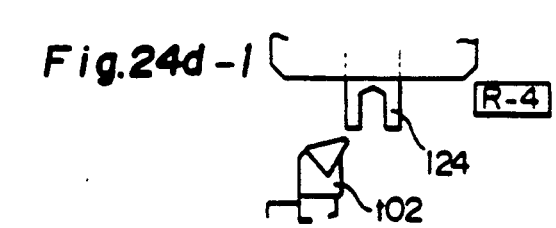

In the process L-4 and R-4 of FIG. 24d, the cutting tools t02 and t12 for an outer face cutting are brought to a position in front of the right and left spindles 121 and 122, and a position adjustment of the tool t02 is carried out in accordance with the numerical control program to establish desired dimensions $D_R 1$ and $L_R 1$ of the workpiece 124.

Figure 24E:
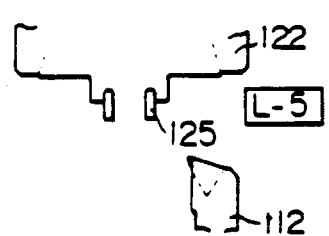
Figures 1, 24E:
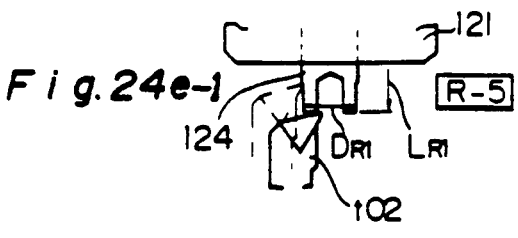

In the process L-5 and R-5 of FIG. 24e, the cutting tool t02 cuts outer and end faces of the workpiece 124 held by the right spindle 121, and the left cutting tool t12 is idle.

Figure 24F:
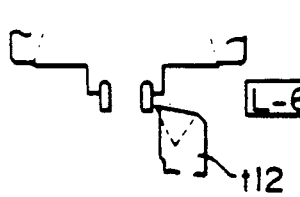
Figures 1, 24F:
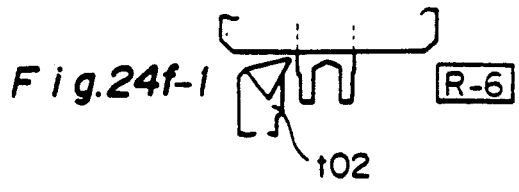

In the process L-6 and R-6 of FIG. 24f, the right cutting tool t02 is withdrawn from the workpiece 124, and the left cutting tool t12 is brought to a position in front of an individual workpiece 125 chucked by the left spindle 122, and a position adjustment of the tool t12 is carried out to establish desired dimensions $D_L 1$ and $L_L 1$ of the workpiece 125.

Figure 24G:
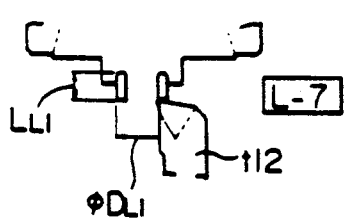
Figures 1, 24G:
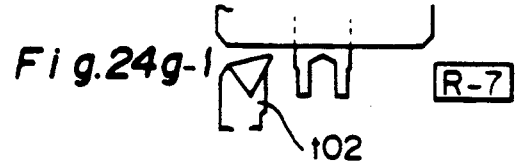

In the process L-7 and R-7 of FIG. 24g, the left cutting tool t12 cuts outer and end faces of the workpiece 125 chucked by the left spindle 122 to obtain the desired dimensions $D_L 1$ and $L_L 1$ of the workpiece 125, and the right cutting tool t02 remains idle.

Figure 24H:
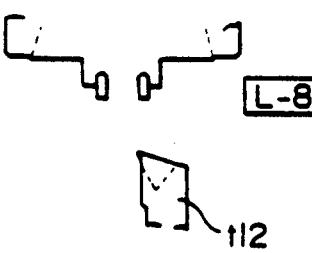
Figures 1, 24H:
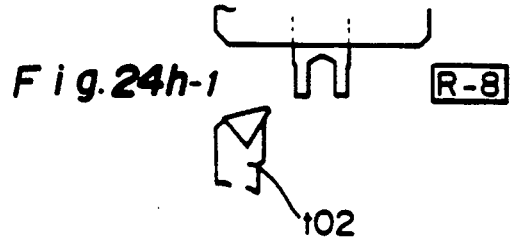

In the process L-8 and R-8 of FIG. 24h, both cutting tools t02 and t12 are withdrawn from the corresponding right and left spindles 121 and 122.

Figure 24I:
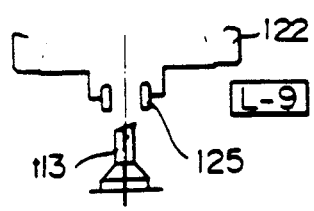
Figures 1, 24I:
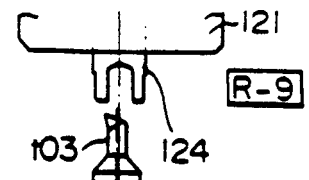

In the process L-9 and R-9 of FIG. 24i, the right and left cutting tools t03 and t13 for an inner face cutting are brought to a position in front of the right and left spindles 121 and 122, and a position adjustment of the right cutting tool t03 is carried out to establish desired dimensions $D_R 2$ and $L_R 2$ of the workpiece 124.

Figure 24J:
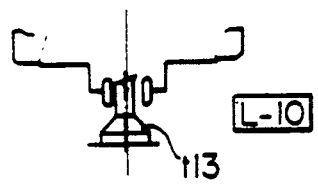
Figures 1, 24J:
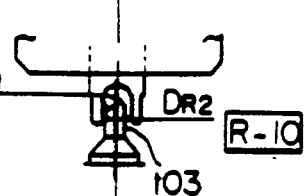

In the process L-10 and R-10 of FIG. 24j, the right cutting tool t03 cuts and chamfers the inner face of the right workpiece 124, and the left cutting tool t13 is idle.

Figure 24K:
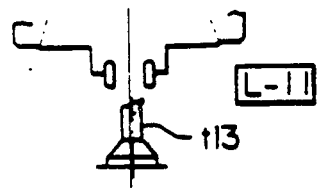
Figures 1, 24K:
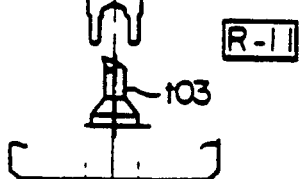

In the process L-11 and R-11 of FIG. 24k, the right cutting tool t03 is withdrawn from the right workpiece 124, and the left cutting tool t13 is moved to a position in front of the workpiece 125 of the left spindle 122. A position adjustment of the left tool t13 is then carried out to establish desired dimensions $D_L 2$ and $L_L 2$ of the workpiece 125.

Figure 24L:
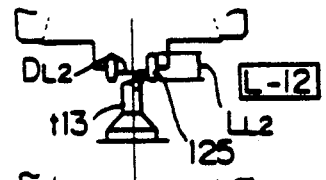
Figures 1, 24L:
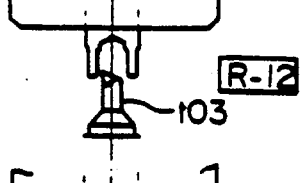

In the process L-12 and R-12 of FIG. 24l, the left cutting tool t13 cuts and chamfers the inner face of the individual workpiece 125 chucked by the left spindle 122.

Figure 24M:
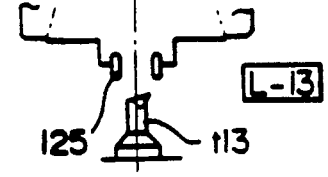
Figures 1, 24M:
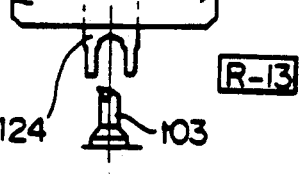

In the process L-13 and R-13 of FIG. 24m, both right and left cutting tools t03 and t13 are withdrawn from the corresponding workpieces 124 and 125.

Figure 24N:
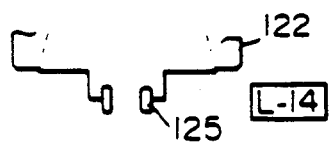
Figures 1, 24N:
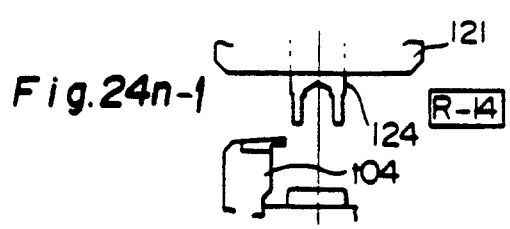

In the process L-14 and R-14 of FIG. 24n, the cutting-off tool t04 is brought to a position in front of the right workpiece 124 held by the right spindle 121.

Figure 24O:
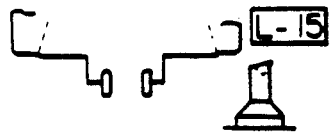
Figures 1, 24O:
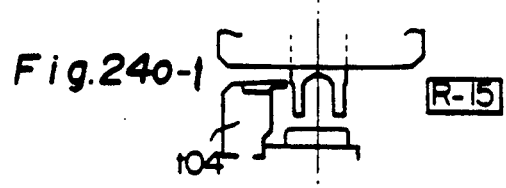

In the process L-15 and R-15 of FIG. 24o, the cutting-off tool t04 is advanced to a position alongside the right bar-like workpiece 124, and a fine position adjustment of the tool t04 is carried out to establish desired dimensions $D_R 3$ and $L_R 3$ of the right workpiece 124.

Figure 24P:
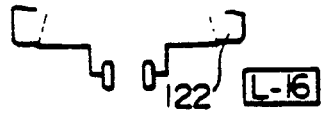
Figures 1, 24P:
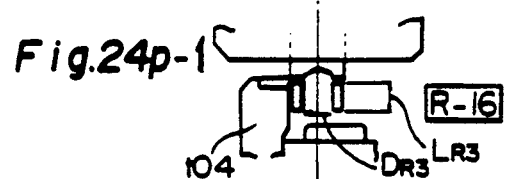

In the process L-16 and R-16 of FIG. 24p, the cutting-off tool t04 severs the machined portion of the workpiece from the bar-like workpiece 124 held by the right spindle 121. The severed workpiece portion is placed on an appropriate conveyor means which can convey an individual workpiece from the right spindle 121 to the left spindle 122.

Figure 24Q:
Figures 1, 24Q:
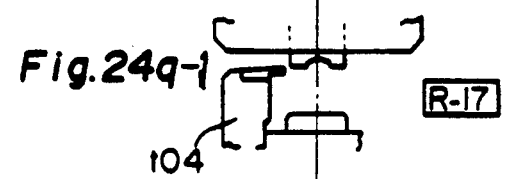

In the process L-17 and R-17 of FIG. 24q, the cutting-off tool t04 is withdrawn from the right bar-like workpiece 124 held by the right spindle 121.

Figure 24R:
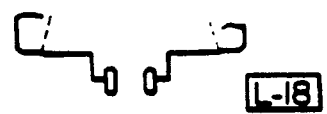
Figures 1, 24R:
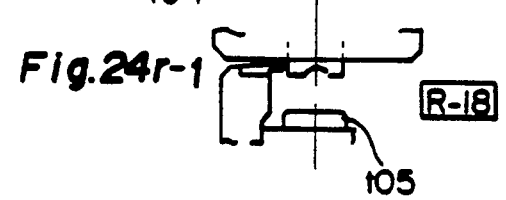

In the process L-18 and R-18 of FIG. 24r, the right stop tool t05 is moved to a position in front of an end of the right bar-like workpiece held by the right spindle 121, and then a position adjustment of the stop tool t05 is carried out in accordance with the numerical control program.

In the process L-19 and R-19 of FIG. 24s, the holding device of the right spindle 121 is released to permit the bar-like workpiece 124 to be fed by a bar feeder until it is stopped by the stop tool t05. Subsequently, the holding device is tightened to tightly hold the workpiece 124 on the right spindle 121. On the other hand, the chucking device of the left spindle 122 is released to remove the machined individual workpiece 125 from the left spindle 122.

In the process L-20 and R-20 of FIG. 24t, the stop tool t05 is withdrawn from the position in the process L-18 and R-18.

In the process L-21 and R-21 of FIG. 24u, the individual workpiece severed from the bar-like workpiece 124 and conveyed from the right spindle 121 during the process L-16 and R-16 is reversed and inserted as an individual workpiece 125 into the chucking device of the left spindle 122, and the chucking device of the left spindle 122 is tightened to tightly chuck the workpiece 125. The drill t01 is again brought to a position in front of the right spindle 121 to repeat the drilling operation of the process L-2 and R-2.

The above-described processes L-1 and R-1 through L-21 and R-21 are repeated to produce a plurality of machined products by using two right and left groups of cutting tools of the bi-spindle numerically controlled lathe.

Figure 25:
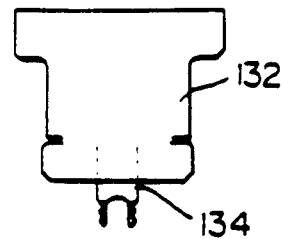
Figures 1, 25:
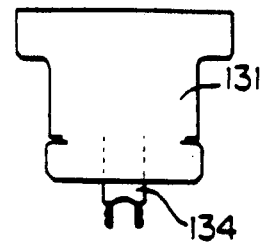
Figures 2, 25:
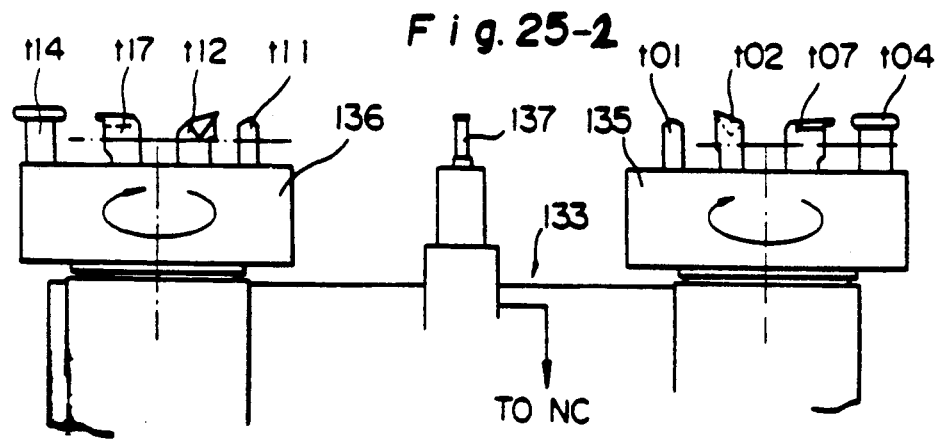
Figures 1, 26A:
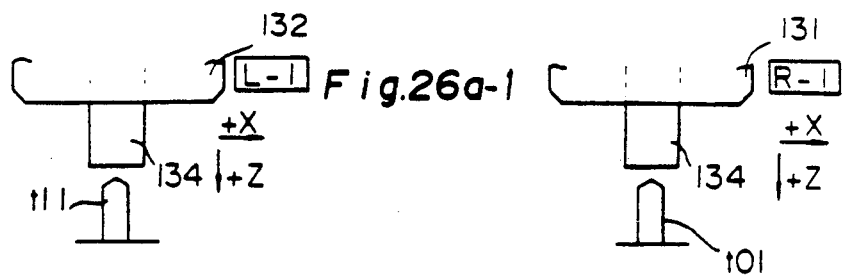
Figures 1, 26B:
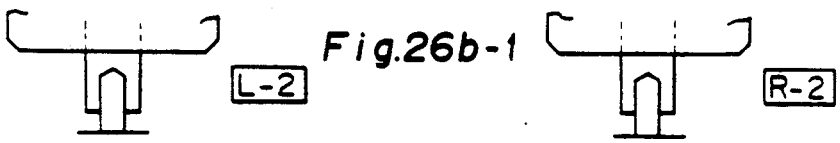
Figures 1, 26C:
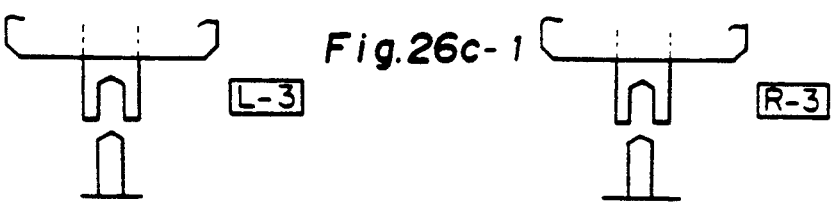
Figures 1, 26D:
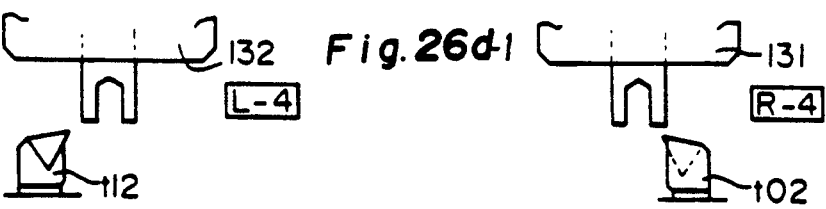
Figure 26E:
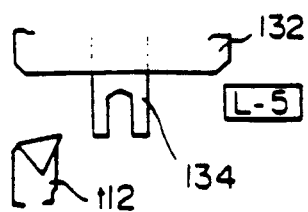
Figures 1, 26E:
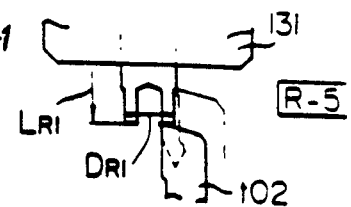
Figure 26F:
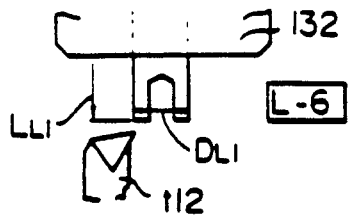
Figures 1, 26F:
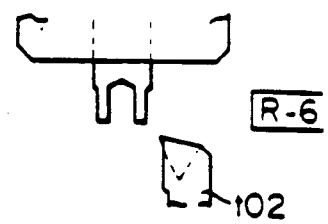
Figure 26G:
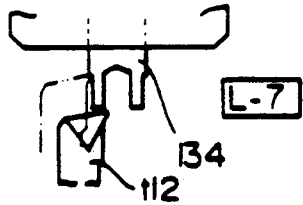
Figures 1, 26G:
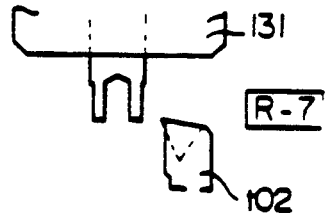
Figure 26H:
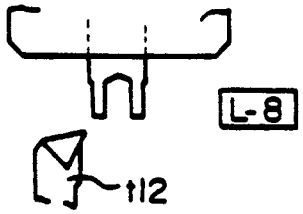
Figures 1, 26H:
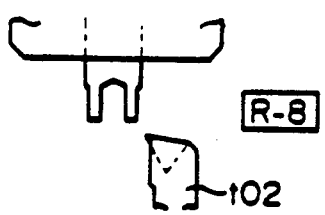
Figure 26I:
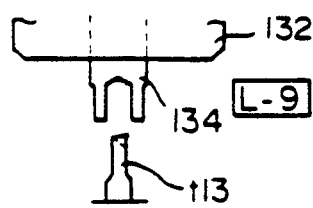
Figures 1, 26I:
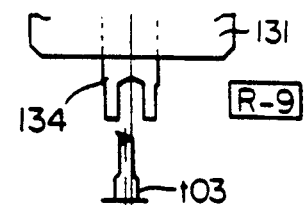
Figure 26J:
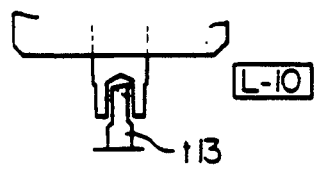
Figures 1, 26J:
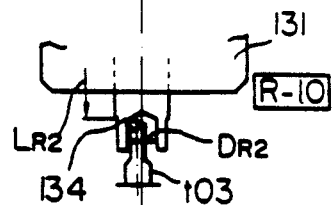
Figure 26K:
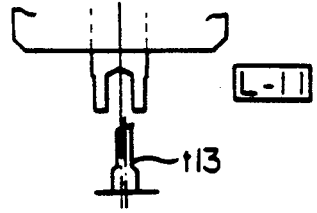
Figures 1, 26K:
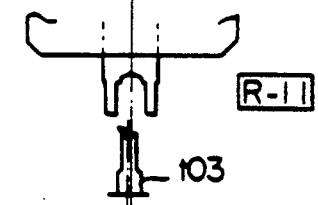
Figure 26L:
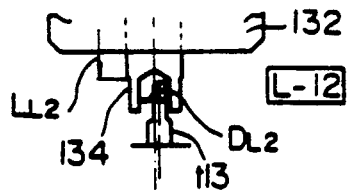
Figures 1, 26L:
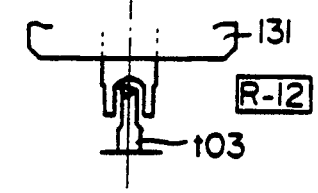
Figures 26Q, 26R:
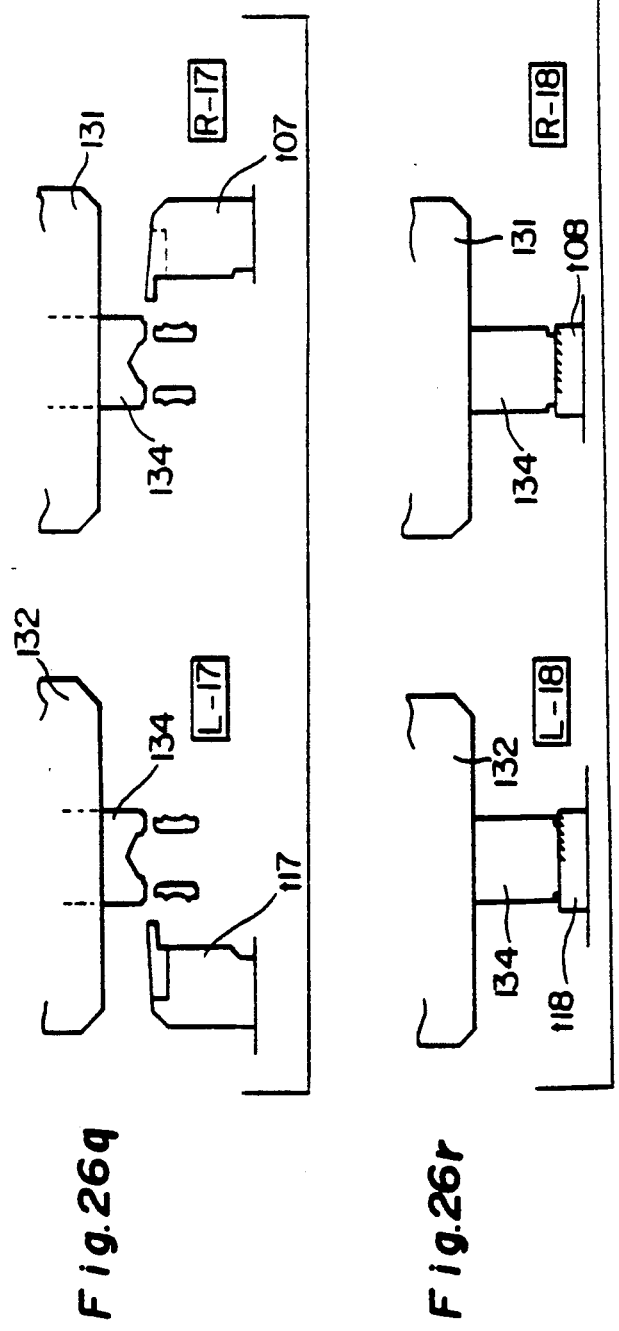

FIGS. 25 and 26a through 26r illustrate an embodiment of the machining method of workpieces, in which two bar-like workpieces fed by bar feeders of the right and left spindles of a bi-spindle numerically controlled lathe are machined by right and left groups of cutting tools mounted on two separate turrets which are in turn mounted on a common tool block movable in two mutually orthogonal directions under the control of a numerical controller.

Referring to FIG. 25, the bi-spindle numerically controlled lathe has two parallel spindles 131 and 132 provided with a bar feeder for feeding a bar-like workpiece 134 respectively. The lathe also has a pair of rotatable turrets 135 and 136 commonly mounted on a tool block unit 133 the movement of which is controlled by a numerical controller NC. The rotation of the turrets 135 and 136 is also controlled by the numerical controller NC. A touch sensor 137 is also mounted on the tool block unit 133 and connected to the numerical controller to preliminarily and periodically measure tool position adjusting data of the cutting tools to be used with the numerical control program. On the right and left turrets 135 and 136, right and left groups of cutting tools t01 through t07 and t11 through t17 are correspondingly mounted. Although not illustrated in FIG. 25, right and left stop tools t08 and t18 are mounted on the right and left turrets 135 and 136, respectively.

A description of the subsequent machining processes L-1 and R-1 through L-18 and R-18 is provided below, with reference to FIGS. 26a through 26r.

In the first process L-1 and R-1 of FIG. 26a, right and left drills t01 and t11 are brought to a position in front of the right and left spindles 131 and 132 by the movement of the tool block unit 133. At this stage, it should be noted that the distance between the two drills t01 and t11 is preliminarily set to be accurately equal to that between the axes of the right and left spindles 131 and 132.

In the process L-2 and R-2 of FIG. 26b, the two drills t01 and t11 are simultaneously fed in the right and left workpieces 134 to drill therein a hole having a predetermined depth in accordance with the numerical control program, respectively.

In the process L-3 and R-3 of FIG. 26c, the drills t01 and t11 are simultaneously withdrawn from the workpieces 134 by the movement of the tool block unit 133.

In the process L-4 and R-4 of FIG. 26d, right and left cutting tools t02 and t12 for outer face cutting are brought to a position in front of the right and left spindles 131 and 132, respectively, by the movement of the tool block unit 133, and a position adjustment of the right cutting tool t02 is carried out in accordance with the numerical control program to establish desired dimensions $D_R 1$ and $L_R 1$ of the right workpiece 134.

In the process L-5 and R-5 of FIG. 26e, the right cutting tool t02 cuts outer and end faces of the right workpiece 134 held by the right spindle 131. At this stage, the left cutting tool t12 remains idle during the cutting operation of the right cutting tool t02.

In the process L-6 and R-6 of FIG. 26f, the left cutting tool t12 is advanced to the left spindle 132, and a position adjustment of the tool t12 is carried out to establish desired dimensions $D_L 1$ and $L_L 1$ of the left workpiece 134.

In the process L-7 and R-7 of FIG. 26g, the left cutting tool t12 cuts outer and end faces of the left workpiece 134 to obtain the above-mentioned desired dimensions $D_L 1$ and $L_L 1$. At this stage, the right cutting tool t02 is idle.

In the process L-8 and R-8 of FIG. 26h, the two cutting tools t02 and t12 are withdrawn from the corresponding right and left spindles 131 and 132.

In the process L-9 and R-9 of FIG. 26i, cutting tools t03 and t13 for inner face cutting are brought to a position in front of the right and left spindles 131 and 132, and a position adjustment of the right cutting tool t03 is carried out in accordance with the numerical control program to establish desired dimensions $D_R 2$ and $L_L 2$ of the right workpiece 134.

In the process L-10 and R-10 of FIG. 26j, the right cutting tool t03 cuts the inner face of the right workpiece 134 held by the right spindle 131, and the left cutting tool t13 remains idle.

In the process L-11 and R-11 of FIG. 26k, the right cutting tool t03 together with the left cutting tool t13 are withdrawn from the workpieces 134. Then, the left cutting tool t13 is advanced to a position in front of the right workpiece 134 of the rotating right spindle 132 while finely adjusting the position thereof in accordance with the numerical control program to establish desired dimensions $D_L 2$ and $L_L 2$ of the left workpiece 134.

In the process L-12 and R-12 of FIG. 26l, the left cutting tool t13 cuts the inner face of the left workpiece 134 to obtain the desired dimensions $D_L 2$ and $L_L 2$ thereof. At this stage, the right cutting tool t03 is idle.

In the process L-13 and R-13 of FIG. 26m, the two cutting tools t03 and t13 are simultaneously withdrawn from the right and left workpieces 134.

In the process L-14 and R-14 of FIG. 26n, right and left form tools t04 and t14 are brought to respective positions alongside the right and left workpieces 134, and a position adjustment of the two form tools t04 and t14 are carried out in accordance with the numerical control program. Subsequently, the right and left form tools t04 and t14 are alternately advanced to the outer faces of the two corresponding workpieces 134 to form a grooved track, respectively.

In the process L-15 and R-15 of FIG. 26o, different right and left form tools t05 and t15 for seal groove cutting are brought to respective positions alongside the right and left workpieces 134, and a position adjustment of the two form tools t05 and R-15 are carried out in accordance with the numerical control program. Subsequently, the right and left form tools t05 and t15 are alternately advanced to the outer faces of the two corresponding workpieces 134 to form seal grooves, respectively. After completion of the above-mentioned seal groove cutting, the two form tools are withdrawn.

In the process L-16 and R-16 of FIG. 26p, two chamfering tools t06 and t16 are brought to respective positions suitable for chamfering innermost portions of the inner faces of the right and left workpieces 134, and a position adjustment of the tools t06 and t16 is carried out in accordance with the numerical control program. Subsequently, the chamfering tools t06 and t16 alternatively chamfer the innermost portion of the inner faces of the right and left workpieces 134.

In the process L-17 and R-17 of FIG. 26q, two cutting-off tools t07 and t17 are brought to respective positions suitable for severing the machined portions of the right and left workpieces 134, and a position adjustment of the two tools t07 and t17 is carried out in accordance with the numerical control program. Subsequently, the machined portions of the right and left workpieces 134 are severed therefrom by the right and left cutting-off tools t07 and t17, respectively. After completion of the severing operation, the cutting-off tools t07 and t17 are withdrawn, and two machined products are simultaneously obtained.

In the process L-18 and R-18 of FIG. 26r, the stop tools t08 and t18 are brought to a position in front of the two parallel spindles 131 and 132, and a position adjustment of the two stop tools t08 and t18 is carried out. Subsequently, the rotation of the right and left spindles is stopped, and the holding devices of the right and left spindles 131 and 132 are released to thereby permit the bar-like workpieces 134 to be fed by the respective bar feeders until they are stopped by the stop tools t08 and t18. It should be noted that, when the stop tools t08 and t18 are rotatable, the feeding of the two bar-like workpieces 134 can be carried out without stopping the rotation of the spindles 131 and 132.

The above-described machining processes L-1 and R-1 through L-18 and R-18 are repeated to machine and produce a plurality of products such as inner and outer bearing races. That is, an effective machining of a plurality of hollow cylindrical products can be realized. Further, due to the employment of the rotatable tool turrets 135 and 136, the plurality of cutting tools t01 through t08 and t11 through t18 can be arranged without causing interference among the tools, and thus a complicated machining using many cutting tools can be achieved.

FIGS. 27a through 27c illustrate the right and left machined products which are produced by the above-described method of FIGS. 26a through 26r. The portions of the right product, designated by "KT 02" through "KT 07" are machined by the right group of cutting tools t02 through t07, and the portions of the left product, designated by "KT 12" through "KT 17" are machined by the left group of cutting tools t12 through t17.

Figure 28:
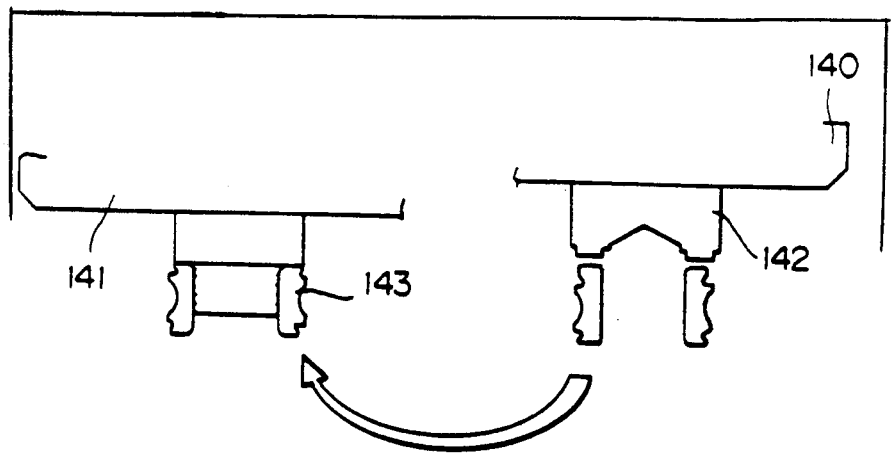
FIGS. 28 and 29 are cross-sectional views of the machined workpieces on the two parallel spindles, cut by the cutting tools held on the turret units.

FIG. 28 illustrates an embodiment of the machining method employing a bi-spindle numerically controlled lathe having one spindle with a bar feeder, the other spindle with a chucking device for chucking an individual workpiece, and two groups of cutting tools mounted on rotatable tool turrets. That is, a bar-like workpiece 142 is machined at the right spindle 140 with a bar feeder, and after machining, the machined portion is severed by a cutting-off tool from the bar-like workpiece 142 as an individual workpiece 143. The individual workpiece 143 is then conveyed to the left spindle 141 while reversing the ends thereof, and chucked at the machined end thereof by the chucking device of the left spindle 141, whereby the reverse end of the individual workpiece 143 can be machined at the left spindle 141. An arrow in FIG. 28 indicates the conveyance of the machined portion of the bar-like workpiece from the right spindle with the bar feeder to the left spindle with the chucking device.

Figure 29:
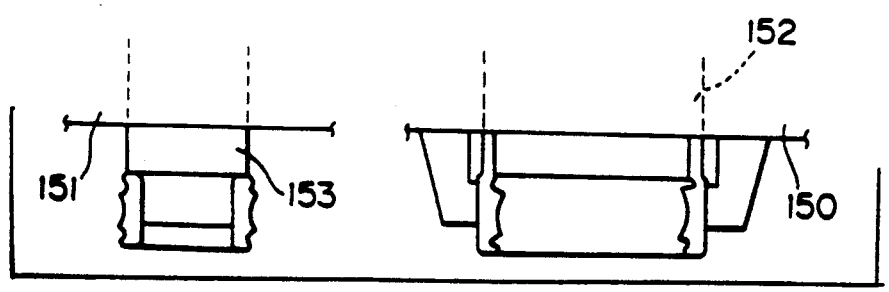

FIG. 29 illustrates a further embodiment in which two bar-like workpieces 152 and 153 having different diameters are machined in a parallel manner by a bi-spindle numerically controlled lathe provided with two spindles 150 and 151 with bar feeders. This method can be applied to an effective machining of a pair of outer and inner bearing races.

From the foregoing descriptions of the various embodiments of the machining methods of the present invention, it will be readily understood that, by employing a bi-spindle numerically controlled lathe and two groups of cutting tools mounted on a single common tool block or base unit, the movement of which is controlled by a numerical controller in accordance with a numerical control program, a pair workpieces such as a pair of individual workpieces, a pair of bar-like workpieces, and a combination of an individual workpiece and a bar-like workpiece can be effectively and accurately machined in either an alternate manner or parallel manner. Therefore, the number of products machined by one bi-spindle numerically controlled lathe is large compared with the prior art method, although the machining time of each product is reduced. Further, the floor space for the installation of the single bi-spindle numerically controlled lathe can be reduced. Moreover, a labor-saving method of machining small cylindrical workpieces by using a bi-spindle numerically controlled machine tool can be realized to reduce the manufacturing cost of the machined products.

Figure 30:
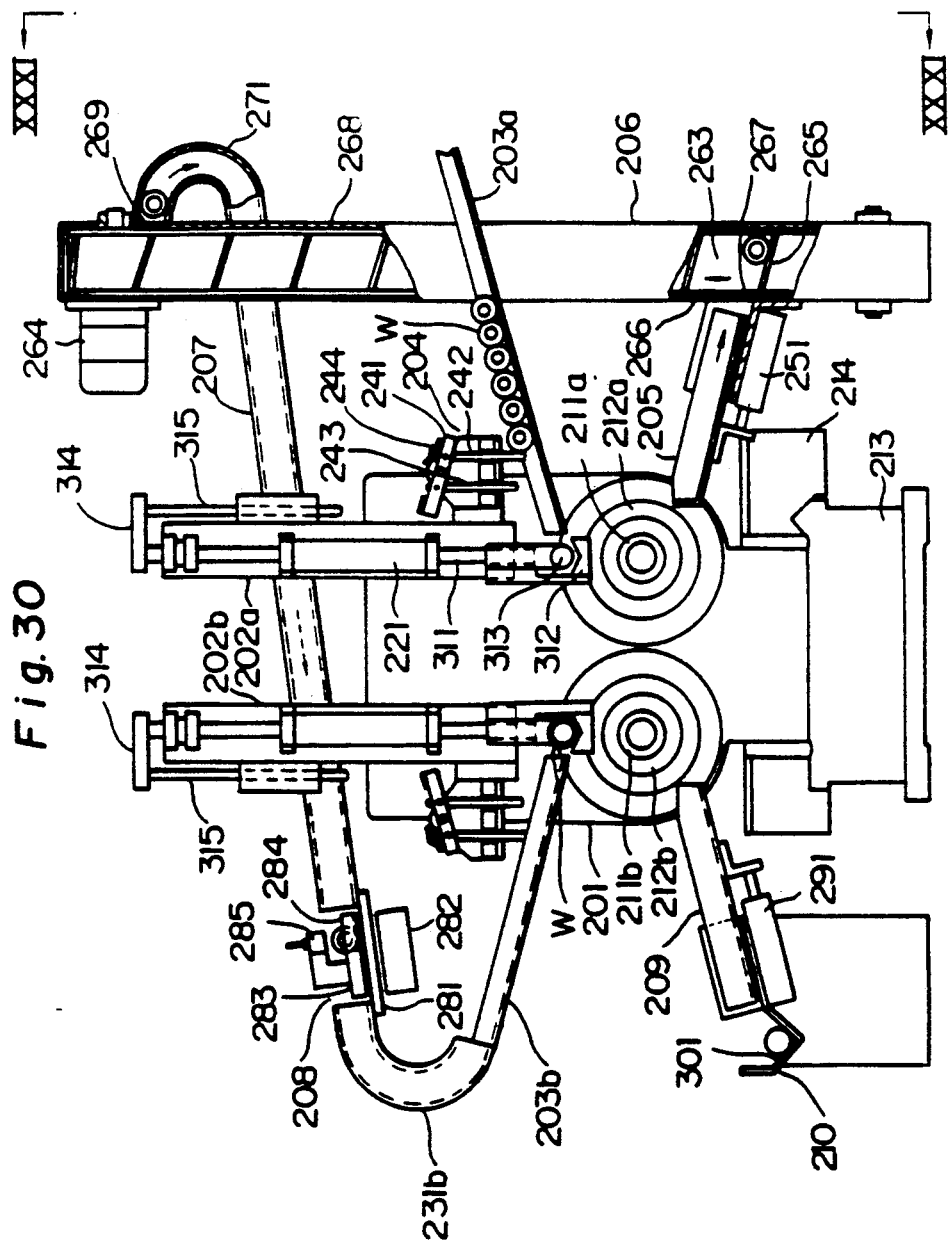
FIG. 30 is a front view of a machining system of the present invention, illustrating a workpiece supply and conveying system incorporated in a bi-spindle numerically controlled machine tool.
Figure 31:
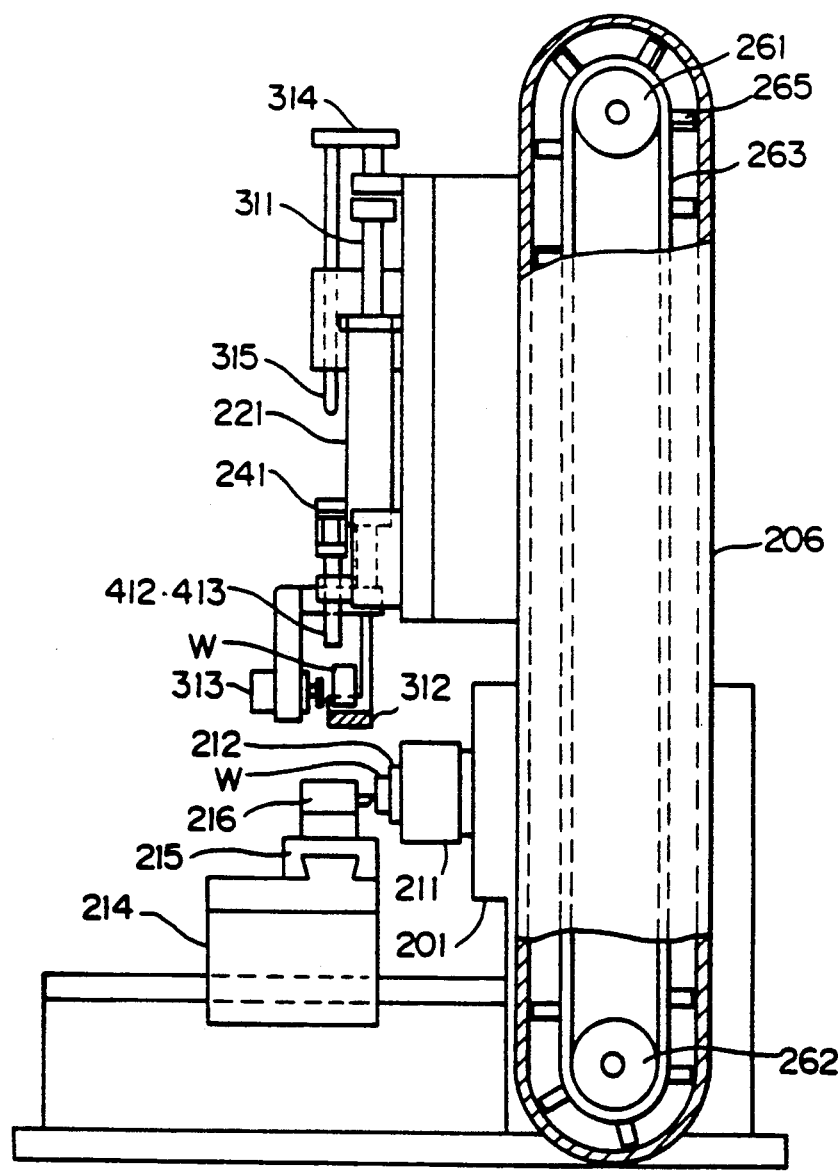
FIG. 31 is a side view of the machining system of FIG. 30.

FIGS. 30 and 31 illustrate a numerically controlled machining system according to an embodiment of the present invention, by which front and rear ends of one workpiece can be machined alternately or in parallel by employing a bi-spindle numerically controlled machine tool and a workpiece conveying system.

Referring to FIGS. 30 and 31, a headstock 201 has a spindle assembly 211 including first and second parallel spindles 211a and 211b having chucking devices 212a and 212b, respectively, for chucking workpieces W such as small hollow cylindrical workpieces. The machining system has workpiece handling devices 202a and 202b located above the respective spindles 211a and 211b. Each of the workpiece handling devices 202a and 202b includes a vertical cylinder 221 provided with a vertically movable piston rod 311 having upper and lower rod portions extending from the opposite ends of the vertical cylinder 221. The vertically movable piston 311 has, at the lowermost end thereof, a V-rest 312 for receiving a workpiece thereon, and a pusher 313 to push the workpiece W on the V-rest 312 toward the chucking device 212a or 212b of the corresponding spindle 211a or 211b. The workpieces W before machining are supplied from supply chute 203a and 203b to the spindle 211a and 211b, respectively. The supply chutes 203a and 203b are arranged to be inclined from the opposite sides of the headstock 201 toward positions below the respective spindles 211a and 211b, to permit each workpiece W to roll down along the chutes toward the respective V-rests 312 where the workpiece is pushed into the chucking device 212a and 212b due to the operation of the piston rods 311 of the cylinders 221. Each of the piston rods 311 has, at the uppermost end thereof, a plate 314 connecting the piston rod to each of pushing rods 315, which is able to press down an inner end of a rocking lever 241 of an intermittent work sending device 204. The intermittent work sending device 204 has a pair of stop rods 242 and 243 pivoted to the rocking lever 241 to alternately move down into the chute 203a or 204b in response to the rocking motion of the rocking lever 241 urging the outer stop rod 242 downward due to a spring force of a leaf spring 244, and sends workpiece one by one along the respective chutes 203a and 203b toward the respective V-rests 312.

A receiving chute 205 is located on the side of the first spindle 211a and arranged to descend from a position adjacent to the first spindle 211a toward a position adjacent to a lower portion of an elevator device 206, and can be extended toward a position beneath the center of the first spindle 211a by the operation of a cylinder device 251 fixed to a lower portion of the elevator 206. The receiving chute 205, when extended toward the first spindle 211a, receives a workpiece W after machining from the chucking device 212a of the first spindle 211a, and sends the workpiece to the elevator 206. The elevator 206 has upper drive and lower driven pulleys 261 and 262 (FIG. 31), an endless belt 263 wound around both pulleys 261 and 262, and a drive motor 264 for rotating the drive pulley 261. The endless belt 263 of the elevator 206 has attached thereto a plurality of scooping plates 265 inclining downward from the inner side to the outer side of the elevator 206, and therefore, the scooping plates 265 receive workpieces W from the receiving chute 205 at an entrance port 267 of an inner side wall 266 of the elevator 206, and lift the workpieces W to the top of the elevator 206 during rotation of the endless belt 263. The workpieces W carried to the top of the elevator 206 are dropped, by gravity, into a curved chute portion 271 of a conveying chute 207 via an exit port 269 of an outer side wall 268. The curved chute portion 271 is disposed to smoothly convey the workpieces W from the exit port 269 to an upper end of the conveying chute 207 without the need for a particular actuating means. The conveying chute 207 is downwardly slanted toward a position on the opposite side of the machining system to thereby allow the workpieces W to roll down in the conveying chute 207, and the lower end of the conveying chute 207 is connected to the supply chute 203b via a workpiece turning device 208 which includes a base 281 arranged to connect the end of the conveying chute 207 with the end of the supply chute 203b, a drive motor 282 attached to the base 281, and a turn table 283 on which each workpiece W is mounted and turned through a half of one turn when sent from the conveying chute 207. The turn table 283 is arranged to be in parallel with the slanted base 281, and is turned by the drive motor 282 when operated. The turn table 283 has a slot 284 for receiving each workpiece W sent from the conveying chute 207, and a detector 285 for detecting the workpiece W in the slot 284 of the turn table 283. The supply chute 203b is provided with a curved chute portion 231b for receiving the workpiece W from the workpiece turning device 208. The workpiece W passing through the curved chute portion 231b enters the linear chute portion of the supply chute 203b and rolls down toward the V-rest 312 positioned adjacent to the second spindle 211b. The intermittent work sending device 204 on the side of the second spindle 211b controls the supply of the workpieces W, to thereby intermittently send the workpieces one by one toward the V-rest 312 of the left handling device 202b.

A receiving chute 209 is located beneath the second spindle 211b, and can be extended toward the second spindle 211b by the operation of a cylinder 291 fixed to a work stocker 210 to receive the workpiece W after machining at the second spindle 211b. The work stocker 210 has a V-recess 301 for receiving each workpiece W sent by the receiving chute 209, and a cylinder (not shown), to shift and bring the workpieces W into line in the V-recess 301.

Figure 32:
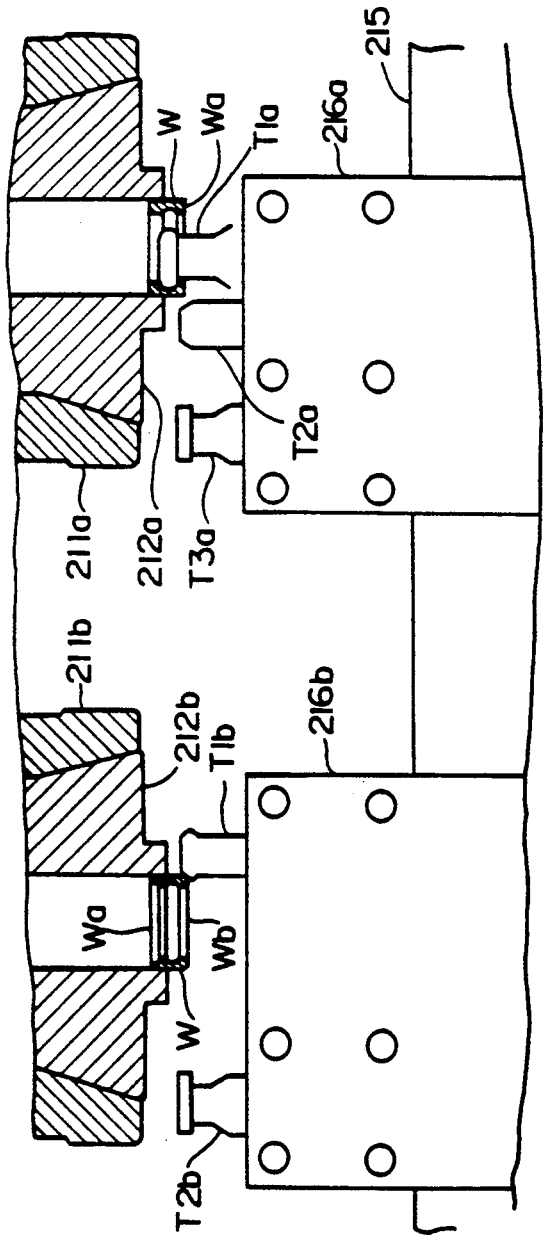
FIG. 32 is a plan view, in part cross-section, of an important portion of the machining system of FIG. 30.

The machining system has a bed 213 under the spindle assembly 211, a carriage 214 slidable on the base 213 in the same direction as the axes of the spindles 211a and 211b, and a cross slide 215 slidable on the carriage 214 in a direction orthogonal to the axes of the spindles 211a and 211b. As best illustrated in FIG. 32, a tool block assembly 216 including a right tool block 216a and a left tool block 216b is secured to the top of the cross slide 215. On the right tool block 216a are mounted a plurality of cutting tools T1a, T2a, and T3a for cutting a workpiece W held by the first spindle 211a, and on the left tool block 216b are mounted a plurality of cutting tools T1b, and T2b for cutting a workpiece W held by the second spindle 211b.

Figure 33:
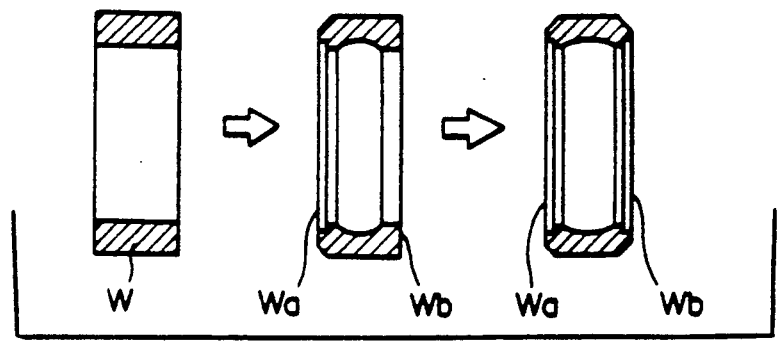
FIG. 33 is a cross-sectional view of a single workpiece, illustrating how to sequentially cut the workpiece.

A description of the method of machining an unmachined workpiece w illustrated in the left side of FIG. 33 to form a desired final product illustrated in the right side of FIG. 33 via the semimachined product illustrated in the middle of FIG. 33 by employing the machining system of FIGS. 30 through 32 is provided below with reference to FIGS. 30 through 35.

First, unmachined workpieces W are supplied in succession by the supply chute 203a toward the first spindle 211a via the intermittent work sending device 204. The stop rods 242 and 243 of the intermittent work sending device 204 control the workpieces W to send the workpieces W one by one to the first spindle 211a in response to the operation of the piston rod 311 of the right cylinder 221. One workpiece W sent by the supply chute 203a via the intermittent work sending device 204 rides on the V-rest 312 attached to the lowermost end of the right piston rod 311, and is lowered to a position adjacent to the chucking device 212a of the first spindle 211a by the downward movement of the piston rod 311. Subsequently, the workpiece W is pressed toward the spindle 211a by the pusher 313, and chucked by the chucking device 212a of the first spindle 211a. At the same time, the downward movement of the piston rod 311 causes the pushing rod 315 to move down while pressing the rocking lever 241 of the intermittent work sending device 204. Therefore, a subsequent workpiece W in the supply chute 203a is sent to and stopped by the inner stop rod 243. When the piston rod 311 is then moved up from the lowermost position, the subsequent workpiece W is supplied by the supply chute 203a from the inner stop rod 243 to the V-rest 312. The abovementioned workpiece sending process from the supply chute 203a to the first spindle 211a is repeated to supply the unmachined workpieces W one by one to the first spindle 211a under the control of a numerical controller.

When one unmachined workpiece W is chucked by the chucking device 212a of the first spindle 211a, the workpiece is rotated at a high speed by the first spindle 211a, and is subjected to a first stage cutting operation by the cutting tools T1a through T3a on the tool block 216a. After completion of the first stage cutting operation, the workpiece W, i.e., the semimachined workpiece, is pushed out of the chucking device—212a of the first spindle 211a, and is dropped into the receiving chute 205 extended toward a position beneath the spindle 211a by the cylinder 251. The semimachined workpiece W is subsequently sent to the second spindle 211b via the elevator 206, the conveying chute 207, the workpiece turning device 208 and the other supply chute 203b. The workpiece turning device 208 turns the semimachined workpiece W so that front end Wa and rear end Wb of the semimachined workpiece W are reversed, and therefore, when the semimachined workpiece W is chucked by the chucking device 212b of the second spindle 211b, the front end Wa of the workpiece W, which was machined at the first spindle 211a, is inside the second spindle 211b, and the unmachined rear end Wb of the workpiece W is exposed to the cutting tools T1b and T2b of the tool block 216b. The handling device 202b and the intermittent work sending device 204 of the second spindle 211b control the supply of the semimachined workpiece W to the second spindle 211b. The semimachined workpiece W chucked by the chucking device 212b of the second spindle 211b is then rotated at a high speed by the second spindle 211b, and subjected to a second stage cutting operation by the cutting tools T1b and T2b on the left tool block 216b.

The right and left cutting tools T1a through T3a and T1b and T2b are preliminarily arranged on the corresponding tool blocks 216a and 216b, taking into account the desired dimensions of the workpiece W and the distance between the axes of the first and second parallel spindles 211a and 211b.

FIG. 32 illustrates a case where two workpieces W are simultaneously machined at the first and second spindles 211a and 211b, respectively. The carriage 214 and cross slide 215 are first moved under the control of the numerical controller to bring the cutting tool T1a into contact with the unmachined workpiece W held by the first spindle 211a to thereby cut a desired groove in the inner face of the workpiece W. Simultaneously, the cutting tool T1b on the left tool block 216b is brought into contact with the semimachined workpiece W held by the second spindle 211b to thereby chamfer an outer corner of the workpiece W. Thereafter, the cross slide 215 is moved to bring the cutting tool T2a into contact with the workpiece W of the first spindle 211a to thereby chamfer an outer corner of the workpiece W of the first spindle 211a. Subsequently, the cross slide 215 is further moved to bring the cutting tools T3a and T2b into contact with the corresponding unmachined and semimachined workpieces W to thereby cut seal grooves in the inner faces of both workpieces W. Finally, the cutting tools T3a and T2b are alternately brought into contact with the inner faces of both workpieces W to thereby cut the respective inner faces into desired dimensions thereof. At this stage, one of the cutting tools T3a and T2b remains idle while the other cutting tool is cutting, and thus, if necessary, a position adjustment of the idle tool may be carried out in accordance with the numerical control program.

After completion of the machining of the respective workpieces W at the first and second spindles 211a and 211b, the workpiece W of the first spindle 211a is pushed out of the chucking device 212a into the receiving chute 205 to be sent to the second spindle 211b in the manner described before, and the workpiece W of the second spindle 211b is pushed out of the chucking device 212b into the receiving chute 209 to be sent to the stocker 210.

Figure 34:
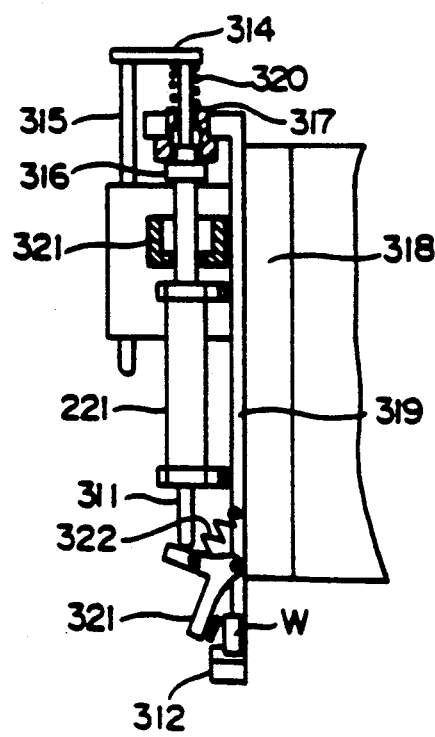
FIG. 34 is a partial cross-sectional view of a workpiece handling device according to a different embodiment of the present invention.
Figure 35:
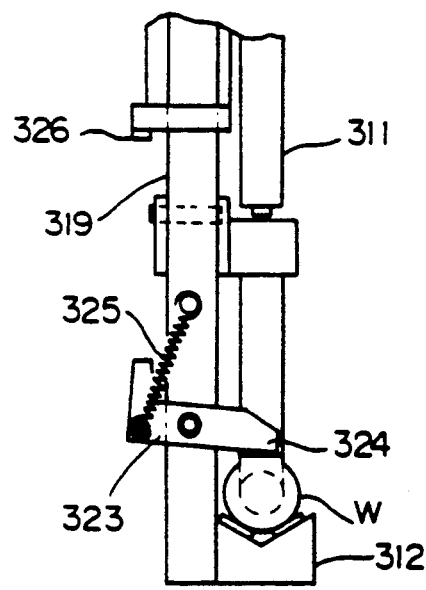
FIG. 35 is a partial front view of the workpiece handling device of FIG. 34.
Figure 36:
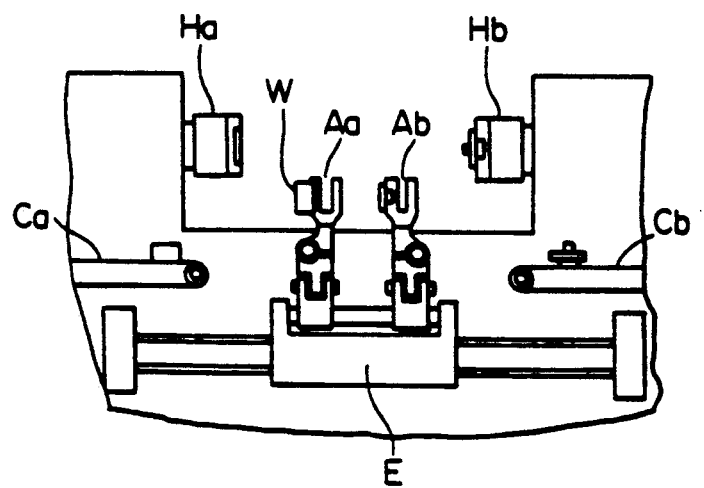
FIG. 36 is a bi-spindle machine tool with a workpiece handling device according to the prior art.

FIGS. 34 and 35 illustrate a modification of the handling device 202a or 202b of the machining system of the present invention. The handling device of this modification includes a ring 317 slidably fitting on a piston rod 311 of a cylinder 221 and in contact with the upper end of a stop ring 316 provided for an upper portion of the piston rod 311, and a vertically extending loading slide 319 having an upper end thereof fixed to the ring 317 and a lower end thereof provided with a V-rest 312. The middle portion of the loading slide 319 slides along a surface of a base 318 of the handling device. A spring 320 is disposed between a plate 314 and the upper face of the ring 317. When the piston rod 311 moves down, the lower end of the ring 317 is first stopped by a stop 321 fixed to the base 318, and therefore, the movement of the loading slide 319 is stopped. Nevertheless, the piston rod 311 can further move down. A bifurcated pushing lever 321 is pivotally secured to the loading slide 319 and arranged at a position above the V-rest 312. A spring 322 having one end attached to the slide 319 and the other end attached to one of arms of the bifurcated lever 321 is provided for urging the bifurcated pushing lever 321 to be separated from a workpiece W on the V-rest 312. Therefore, when the piston rod 311 moves down after the stopping of the loading slide 319, the piston rod 311 presses one arm of the bifurcated pushing lever 321 against the spring force of the spring 322, and as a result, the other arm of the bifurcated pushing lever 321 pushes the workpiece W on the V-rest 312 into a chucking device of the spindle of a bi-spindle numerically controlled lathe. That is, according to this modification of the handling device 202, the lowering of the workpiece W on the V-rest 312 and the insertion of the same workpiece W into the chucking device can be achieved by a single actuator, i.e., the cylinder 221.

As illustrated in FIG. 35, a press lever 323 is pivotally secured to the lower end of the loading slide 319, and has a front end 324 capable of suppressing a workpiece W on the V-rest 312 under a spring force of a spring 325 provided between a portion of the loading slide 319 and a rear end of the press lever 323. When the loading slide 319 moves upward, the rear end of the press lever 323 abuts against a cam 326 fixed to the base 318 to thereby separate the front end 324 of the press lever 323 from the V-rest 312, and therefore, a workpiece W can ride on the V-rest 312. When the loading slide 319 moves down, the rear end of the press lever 323 is separated away from the cam 326, and therefore, the front end 324 of the press lever 323 comes to a position at which it suppresses the workpiece W on the V-rest 312, to thereby prevent the workpiece W from falling from the V-rest 312.

From the foregoing description of the illustrated machining system for machining hollow cylindrical workpieces it will be understood that, according to the present invention, a pair of unmachined and semimachined workpieces held by two parallel spindles can be machined in parallel by using two separate groups of cutting tools. Therefore, a simultaneous machining of two workpieces can be automatically achieved at a high efficiency and a high accuracy.

I claim:

1. A method for machining substantially cylindrical workpieces held by chucking devices of two axially parallel spindles of a numerically controlled machine tool, said method comprising:

mounting two separate spaced groups of cutting tools on a single tool block;

positioning a selected cutting tool from each of the two groups in a predetermined fixed position spaced relative to one another in accordance with the distance between each of the workpieces and a predetermined cutting sequence of the two selected tools, each of said two groups of cutting tools includes at least one first cutting tool for cutting an internal cylindrical face of each of said cylindrical workpieces on said two parallel spindles, said first cutting tool of each of said two groups of cutting tools being fixedly disposed laterally inwardly offset from a position in alignment with said axis of one of said two parallel spindles toward the axis of the other of said two parallel spindles, mounting the single tool block for movement in two mutually orthogonal directions corresponding to the plane in which the axes of the two spindles lie; and controlling the motion of the single tool block in the two orthogonal directions by a numerical control program for cutting both of the two workpieces in said predetermined cutting sequence as a function of the predetermined fixed positions of the selected cutting tools relative to one another and the numerical control, said step of controlling said motion of said tool block means includes alternately bringing each of said first cutting tools of said two groups of cutting tools into contact with said internal cylindrical face of one respective cylindrical workpiece for carrying out a cutting operation, while the other of each said first cutting tools is spaced idly from the internal face of the other respective workpiece.

2. A method for machining substantially cylindrical workpieces held by chucking devices of two axially parallel spindles of a numerically controlled machine tool, said method comprising:

mounting two separate spaced groups of cutting tools on a single tool block, each of said two groups of cutting tools includes at least one second cutting tool for cutting an outer cylindrical face of each of said cylindrical workpieces on said two parallel spindles, positioning a selected cutting tool from each of the two groups in a predetermined fixed position spaced relative to one another in accordance with the distance between each of the workpieces and a predetermined cutting sequence of the two selected tools, positioning said second cutting tool of each of said two groups of cutting tools outside a region spanning said axes of said two parallel spindles and distant from the outer cylindrical face of each of said cylindrical workpieces on said two parallel spindles, mounting the single tool block for movement in two mutually orthogonal directions corresponding to the plane in which the axes of the two spindles lie; and controlling the motion of the single tool block in the two orthogonal directions by a numerical control program for cutting both of the two workpieces in said predetermined cutting sequence as a function of the predetermined fixed positions of the selected cutting tools relative to one another and the numerical control, said step of controlling said motion of said single tool block means includes alternately bringing each of said second cutting tools of said two groups of cutting tools into contact with the outer cylindrical face of a respective said cylindrical workpiece for carrying out a cutting operation, while the other of said second cutting tools is spaced idly from the other respective workpiece.

3. A method for machining substantially cylindrical workpieces held by chucking devices of two axially parallel spindles of a numerically controlled machine tool said method comprising:

mounting two separate spaced groups of cutting tools on a single tool block;

positioning a selected cutting tool from each of the two groups in a predetermined fixed position spaced relative to one another in accordance with the distance between each of the workpieces and a predetermined cutting sequence of the two selected tools; each of said two groups of cutting tools includes at least one third cutting tool for cutting an outer cylindrical face of each of said cylindrical workpieces on said two parallel spindles; said step of positioning comprises positioning each said third cutting tool of each of said two groups of cutting tools within a region spanning said axes of said two parallel spindles and distant from the outer cylindrical face of each of said cylindrical workpieces on said two parallel spindles, mounting the single tool block for movement in two mutually orthogonal directions corresponding to the plane in which the axes of the two spindles lie; and controlling the motion of the single tool block in the two orthogonal directions by a numerical control program for cutting both of the two workpieces in said predetermined cutting sequence as a function of the predetermined fixed positions of the selected cutting tools relative to one another and the numerical control said step of controlling said motion of said single tool block means includes alternately bringing each of said third cutting tools of said two groups of cutting tools into contact with the outer cylindrical face of each of said cylindrical workpieces for carrying out a cutting operation, on one respective workpiece, while the other of each said second cutting tool is idle.

4. A method for machining substantially cylindrical workpieces held by chucking devices of two axially parallel spindles of a numerically controlled machine tool, said machine tool includes a size detecting means fixedly mounted on said single tool block means for detecting the size and position of each of said cylindrical workpieces on said two parallel spindles, the method comprising the steps of:

mounting two separate spaced groups of cutting tools on a single tool block;

positioning a selected cutting tool from each of the two groups in a predetermined fixed position spaced relative to one another in accordance with the distance between each of the workpieces and a predetermined cutting sequence of the two selected tools;

changing said two groups of cutting tools with two other groups of cutting tools when directed to do so by said numerical program:

mounting the single tool block for movement in two mutually orthogonal directions corresponding to the plane in which the axes of the two spindles lie; and controlling the motion of the single tool block in the two orthogonal directions by a numerical control program for cutting both of the two workpieces in said predetermined cutting sequence as a function of the predetermined fixed positions of the selected cutting tools relative to one another and the numerical control, the step of controlling the motion of said single tool block means includes the substeps of, carrying out a detection of an amount of correction of movements of said two other groups of cutting tools by using said size detecting means, and setting said detected amount of correction of movements of said two other groups of cutting tools in said numerical controller prior to starting said cutting of said substantially cylindrical workpieces by said two other groups of cutting tools.

5. The method according to claim 4 further comprising the step of:

moving said single tool block means to cause a small amount of movement of said two other groups of cutting tools under the control of said numerical controller for preliminary carrying out said detected amount of correction of movements of said two other groups of cutting tools before starting said controlling step for machining said cylindrical workpieces.

6. A method for machining substantially cylindrical workpieces held by chucking devices of two axially parallel spindles of a numerically controlled machine tool, comprising, mounting two separate spaced groups of cutting tools on a single tool block, said machine tool includes size detecting means fixedly mounted on said single tool block means for detecting the size and positions of each of said cylindrical workpieces on said two parallel spindles;

positioning a selected cutting tool from each of the two groups in a predetermined fixed position spaced relative to one another in accordance with the distance between each of the workpieces and a predetermined cutting sequence of the two selected tools;

mounting the single tool block for movement in two mutually orthogonal directions corresponding to the plane in which the axes of the two spindles lie;

controlling the motion of the single tool block in the two orthogonal directions by a numerical control program for cutting both of the two workpieces in said predetermined cutting sequence as a function of the predetermined fixed positions of the selected cutting tools relative to one another and the numerical control;

stopping the machining of said cylindrical workpieces on said two parallel spindles when a predetermined time of use of said two groups of cutting tools in accordance with said numerical program has lapsed;

controlling the motion of said single tool block means to carry out a detection of an amount of correction of movements of said two groups of cutting tools by using said size detecting means after said stopping step; and setting said detected amount of correction of movements of said two groups of cutting tools in said numerical controller prior to re-starting said cutting of said substantially cylindrical workpieces on said two parallel spindles by said two groups of cutting tools.

7. The method according to claim 6, further comprising the step of:

moving said single tool block means for causing a small amount of movement of said two groups of cutting tools under the control of said numerical controller for preliminarily carrying out said detected amount of correction of movements of said two groups of cutting tools before starting said controlling step for machining of said cylindrical workpieces.

8. A method for machining substantially cylindrical workpieces held by chucking devices of two axially parallel spindles of a numerically controlled machine tool, one of said cylindrical workpieces held on one of said two parallel spindles being a long cylindrical bar-like workpiece intermittently axially fed by a bar-feeder means through said chucking device of said one of said two parallel spindles in accordance with a numerical control program, and another of said cylindrical workpieces being a plurality of individual workpieces of a preselected axial length supplied intermittently from a workpiece supply means to said chucking device of said other of said two parallel spindles, the method comprising:

mounting two separate spaced groups of cutting tools on a single tool block;

positioning a selected cutting tool from each of the two groups in a predetermined fixed position spaced relative to one another in accordance with the distance between each of the workpieces and a predetermined cutting sequence of the two selected tools;

mounting the single tool block for movement in two mutually orthogonal directions corresponding to the plane in which the axes of the two spindles lie; and controlling the motion of the single tool block in the two orthogonal directions by a numerical control program for cutting both of the two workpieces in said predetermined cutting sequence as a function of the predetermined fixed positions of the selected cutting tools relative to one another and the numerical control.

9. The method according to claim 8, wherein said workpiece supply means comprises a workpiece supply chute for positioning each of said plurality of individual workpieces at a predetermined position adjacent to said chucking device of said other of said two parallel spindles, and a workpiece pusher to push each of said plurality of individual workpieces into said chucking device from said predetermined position.

10. The method according to claim 8, wherein said controlling step comprises, moving said single tool block means for cutting said long cylindrical bar-like workpiece on said one of said two parallel spindles into individual products by a cutting-off tool after machining said cylindrical outer face and/or inner cylindrical faces by one of said two groups of cutting tools, said individual products being supplied from said one of said two parallel spindles to said other of said two parallel spindles by said workpiece supply means to subject a cut end face to a finish machine on said other of said two parallel spindles.

11. A method of producing bearing outer races from hollow cylindrical workpieces held by respective chucking devices of two parallel spindles of a bi-spindle machine tool controlled by a numerical controller, comprising the steps of:

mounting a pair of form tools on a single tool block means, positioning each of the pair of form tools for forming a grooved track in an inner cylindrical face of each of said hollow cylindrical workpieces, separating centers of said pair of form tools a distance less than the distance existing between the axes of said two parallel spindles, moving the single tool block means in two mutually orthogonal directions along a plane corresponding to a plane on which the axes of said two spindles lie; and controlling the motion of said single tool block means under the control of said numerical controller, to provide said pair of form tools with predetermined sequential operations in accordance with a numerical control program, said step of controlling the motion comprising the substeps of:

positioning the single tool block means for placing said centers of said pair of form tools substantially in front of said two parallel spindles;

bringing a front cutting end of each of said form tools into each of said hollow cylindrical workpieces while adjusting positions of said front cutting ends of said form tools inside respective said hollow cylindrical workpieces;

advancing said pair of form tools to cut said grooved track in an inner cylindrical face of one of said hollow cylindrical workpieces by one of said pair of form tools while maintaining the other of said form tools at an idle position inside the other of said hollow cylindrical workpieces;

withdrawing said form tools to a predetermined non-cutting position after finishing said cutting of said grooved track in an inner cylindrical face of said one of said hollow cylindrical workpieces by said one of said pair of form tools;

re-positioning said front cutting end of said other of said pair of form tools inside said other of said hollow cylindrical workpieces;

advancing said pair of form tools to cut said grooved track in an inner cylindrical face of said other of said hollow cylindrical workpieces by said other of said pair of form tools while maintaining said one of said form tools at an idle position inside said one of said hollow cylindrical workpieces;

withdrawing said form tools to a predetermined non-cutting position after cutting said grooved track in an inner cylindrical face of said other of said hollow cylindrical workpieces by said other of said pair of form tools; and retracting said pair of form tools from inside said cut hollow cylindrical workpieces.

12. The method according to claim 11, wherein each of said hollow cylindrical workpieces is formed with two parallel grooved tracks in said inner face thereof during said cutting operation of said pair of form tools.

13. A method of producing bearing inner faces from hollow cylindrical workpieces held by respective chucking devices of two parallel spindles of a bi-spindle machine tool controlled by a numerical controller, comprising the steps of:

mounting a pair of form tools on a single tool block means; positioning each of the pair of form tools for forming a grooved track in an outer cylindrical face of each of said hollow cylindrical workpieces; separating said pair of form tools by a distance larger than a maximum distance between the outer faces of said hollow cylindrical workpieces;

moving said tool block means in two mutually orthogonal directions along a plane corresponding to a plane on which the axes of said two spindles lie; and controlling the motion of said single tool block means by said numerical controller, to provide said pair of form tools with predetermined sequential operations in accordance with a numerical control program, said controlling steps comprising the substeps of:

positioning said pair of form tools substantially in front of said two parallel spindles while maintaining said pair of form tools at positions remote from said outer faces of said hollow cylindrical workpieces held on said two parallel spindles, advancing said pair of form tools in a direction parallel with the axes of said two spindles to be positioned alongside said outer faces of said hollow cylindrical workpieces, bringing one of said pair of form tools into a position to start cutting said grooved track in said outer face of one of said hollow cylindrical workpieces while making a fine adjustment to a position of said one of form tools, advancing said pair of form tools toward a position at which one of said pair of form tools is in contact with said outer face of said one of said hollow cylindrical workpieces for cutting said grooved track in said outer face of said one of said hollow cylindrical workpieces while allowing the other of said pair of form tools to be idle, returning said pair of form tools to a predetermined non-cutting position in accordance with a numerical control program after cutting said grooved track in said outer face of said one of said hollow cylindrical workpieces by said one of said pair of form tools, bringing the other of said pair of form tools into a position to start cutting of said grooved track in said outer face of the other of said hollow cylindrical workpieces while making a fine adjustment to a position of said other of said pair of form tools, advancing said pair of form tools to place said other of said form tools in contact with said outer face of said other of said hollow cylindrical workpieces for cutting said grooved track in said outer face of said other of said hollow cylindrical workpieces held on said two parallel spindles while allowing said one of said pair of form tools to be idle, returning said pair of form tools to a predetermined non-cutting position after cutting said grooved track in said outer face of said other of said hollow cylindrical workpieces by said other of said pair of form tools, and simultaneously retracting said pair of form tools from said predetermined non-cutting positions to positions located alongside said hollow cylindrical workpieces after cutting said grooved tracks in said outer faces of said hollow cylindrical workpieces.

14. The method according to claim 13, wherein the cutting operation of each of said hollow cylindrical workpieces by said pair of form tools forms to parallel grooved tracks in said outer faces thereof.

15. A method of machining inner bores of hollow cylindrical workpieces held by respective chucking devices of two parallel spindles of a bi-spindle machine tool controlled by a numerical controller, each workpiece being used for producing a pair of inner and outer races of a bearing, comprising the steps of:

mounting a pair of bore-cutting tools on a single tool block means in a position for cutting an inner cylindrical face of each of said hollow cylindrical workpieces, held on said two parallel spindles and that separating centers of said pair of bore-cutting tools a distance less than the distance between the axes of said two parallel spindles;

moving said tool block means in two mutually orthogonal directions corresponding to a plane on which the axes of said two spindles lie; and controlling the motion of said single tool block means under the control of said numerical controller, to provide said pair of form tools with predetermined sequential operations in accordance with a numerical control program, the motion controlling step comprising the substeps of:

moving said pair of bore-cutting tools to a position in front of said hollow cylindrical workpieces, bringing said pair of bore-cutting tools inside a corresponding one of said hollow cylindrical workpieces while adjusting a position of the center of only one of said pair of bore-cutting tools for cutting the inner face of said corresponding one of said hollow cylindrical workpieces to a bore size predetermined in accordance with the numerical control program, feeding said one of said pair of bore-cutting tools in a direction parallel with the axes of said spindles for cutting said inner face of said one of said hollow cylindrical workpieces while maintaining the other of said pair of bore-cutting tools at an idle position until said predetermined bore size is established in said inner face of said corresponding one of said hollow cylindrical workpieces, withdrawing said pair of bore-cutting tools until said one of said pair of bore-cutting tools is restored to a predetermined non-cutting position after said cutting of said inner face of said one of said hollow cylindrical workpieces, shifting said pair of bore-cutting tools for positioning the center of only the other of said pair of bore-cutting tools for cutting the inner face of said corresponding one of said hollow cylindrical workpieces to a bore size predetermined in accordance with the numerical control program, feeding said other of said pair of bore-cutting tools in a direction parallel with the axes of said spindles to cut said inner face of said corresponding one of said hollow cylindrical workpieces while maintaining said one of said pair of bore-cutting tools at an idle position until said predetermined bore size is established in said inner face of said corresponding one of said hollow cylindrical workpieces, returning said other of said pair of bore-cutting tools to a predetermined non-cutting position after said cutting of said inner face of said corresponding one of said hollow cylindrical workpieces, and retracting said pair of bore-cutting tools from said cut bores of said corresponding hollow workpieces to positions predetermined in accordance with said numerical control program.

16. A numerically controlled machining system for sequentially producing cylindrical products from automatically supplied individual cylindrical workpieces comprising:

a bi-spindle machine tool provided with first and second parallel spindles mounted on a single headstock and driven by a common rotative drive source;

first and second workpiece holding devices mounted on said first and second spindles, respectively, for grasping said cylindrical workpieces;

a single tool block means mounted on a reciprocatively movable carriage via a cross slide to be moved in at least two mutually orthogonal directions on a plane which is the same as or in parallel with a plane on which the axes of said first and second parallel spindles lie;

a prime mover for moving said single tool block means in said mutually orthogonal directions;

a numerical controller for controlling the operation of said prime mover to thereby move said single tool block in accordance with a numerical control program; and first and second groups of cutting tools commonly mounted on said single tool block means for simultaneously cutting said individual cylindrical workpieces when said workpieces are held on and rotated by said first and second parallel spindles; and;

first and second supply chutes for supplying said individual cylindrical workpieces to predetermined positions adjacent to said first and second workpieces holding devices of said first and second parallel spindles;

first and second workpiece handling devices for inserting said individual cylindrical workpieces one by one from said predetermined positions adjacent to said first and second workpiece holding devices of said first and second parallel spindles into said first and second chucking devices of said first and second parallel spindles, respectively;

a conveyer for conveying said individual cylindrical workpieces after machining by said first spindle toward said second spindle; and a turning device for causing turning each of said workpieces through 180 degrees to thereby reverse an end face of each of said workpieces while conveying each of said individual cylindrical workpieces by said conveyer.

17. The numerically controlled machining system according to claim 16, further comprising first and second intermittent suppliers located between ends of said first and second supply chutes and said predetermined positions adjacent to said first and second workpiece holding devices of said first and second parallel spindles.

18. The numerically controlled machining system according to claim 16, wherein said conveyer comprises:

a receiving chute for receiving said individual cylindrical workpieces after machining by said first spindle;

an elevator arranged adjacent to an end of said receiving chute for elevating said individual cylindrical workpieces after machining by said first spindle to a predetermined high position; and a conveying chute for conveying said individual cylindrical workpieces after machining by said first spindle to said turning device, said turning device being connected to said second supply chute.

19. The numerically controlled machining system according to claim 16, wherein each of said first and second workpiece handling devices comprises:
- a cylinder-operated V block device for receiving each of said individual cylindrical workpieces from a corresponding one of said first and second supply chutes at said predetermined positions adjacent to said first and second workpiece holding devices of said first and second parallel spindles; and
- a cylinder-operated pusher for pushing each of said individual cylindrical workpiece from one of said predetermined positions into a corresponding one of said first and second workpiece holding devices.

20. The numerically controlled machining system according to claim 16, wherein the turning device for turning each of said workpieces through 180 degrees comprises a turntable arranged between said conveying chute and said second supply chute.

21. The numerically controlled machining system of claim 16 wherein the first and second workpiece holding devices comprise first and second chucking devices for grasping the cylindrical products.

22. The numerically controlled machining system of claim 21 wherein the first and second chucking devices of the first and second workpiece holding devices are for grasping cylindrical workpieces having different diameters.

23. The numerically controlled machining system of claim 16 wherein the first and second groups of cutting tools are disposed in juxtaposition to one another on the single tool block means.

24. The numerically controlled machining system of claim 16 wherein the single tool block means includes first and second rotatable turrets, and the first and second groups of cutting tools are mounted on the respective first and second turrets, each said group being separated from the other.

25. The numerically controlled system of claim 16 wherein the prime mover comprises at least one electric servo motor, and feed screw means operatively connecting the at least one electric servo motor to the single tool block means.

* * * * *

UNITED STATES PATENT AND TRADEMARK OFFICE
CERTIFICATE OF CORRECTION

PATENT NO. : 5,163,009
DATED : November 10, 1992
INVENTOR(S) : TATSUO YAMANE

It is certified that error appears in the above-identified patent and that said Letters Patent is hereby corrected as shown below:

item [73]
Title page, in the name of the Assignee, insert (--&--) an ampersand after "Electric".

Claim 4, column 32, line 66, "program:" should read --program;-- column 33, line 11, "of," should read --of:--.

Claim 5, column 33, line 25, "preliminary" should read --preliminarily--.

Claim 6, column 33, lines 36-37, "positions" should read --position--.

Claim 16, column 38, line 27, "and;" should read --and--;

UNITED STATES PATENT AND TRADEMARK OFFICE
CERTIFICATE OF CORRECTION

PATENT NO. : 5,163,009
DATED : November 10, 1992
INVENTOR(S) : Tatsuo Yamane

It is certified that error appears in the above-indentified patent and that said Letters Patent is hereby corrected as shown below:

Column 38, lines 30-31, "workpieces" should read --workpiece--.

Signed and Sealed this

Thirtieth Day of November, 1993

Attest:

BRUCE LEHMAN

Attesting Officer  Commissioner of Patents and Trademarks